United States Patent
Kato et al.

(10) Patent No.: US 7,643,559 B2
(45) Date of Patent: Jan. 5, 2010

(54) CODING METHOD, DECODING METHOD, CODING APPARATUS, DECODING APPARATUS, IMAGE PROCESSING SYSTEM, CODING PROGRAM, AND DECODING PROGRAM

(75) Inventors: Sadaatsu Kato, Kanagawa (JP); Minoru Etoh, Kanagawa (JP); Shunichi Sekiguchi, Kanagawa (JP); Hiroyuki Yamaguchi, Kanagawa (JP); Yasuhiro Ogiri, Tokyo (JP); Satoru Adachi, Kanagawa (JP); Mitsuru Kobayashi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 701 days.

(21) Appl. No.: 10/432,044

(22) PCT Filed: Sep. 12, 2002

(86) PCT No.: PCT/JP02/09368

§ 371 (c)(1),
(2), (4) Date: May 19, 2003

(87) PCT Pub. No.: WO03/026315

PCT Pub. Date: Mar. 27, 2003

(65) Prior Publication Data
US 2004/0028282 A1     Feb. 12, 2004

(30) Foreign Application Priority Data
Sep. 14, 2001 (JP) ............................. 2001-279266
Nov. 8, 2001 (JP) ............................. 2001-343540
Jan. 10, 2002 (JP) ............................. 2002-002944

(51) Int. Cl.
*H04N 7/18* (2006.01)

(52) U.S. Cl. ........................ 375/240.23; 375/240.25; 375/240.26

(58) Field of Classification Search ................................. 375/240.01–240.29
See application file for complete search history.

(56) References Cited

U.S. PATENT DOCUMENTS
5,576,767 A    11/1996    Lee et al.
(Continued)

FOREIGN PATENT DOCUMENTS
EP    0 771 119 A2    5/1997
(Continued)

OTHER PUBLICATIONS
H.26L Test Model Long Term No. 7 (TML-7) draft0. [online] May 11, 2001 [retrieval date Nov. 22, 2002] Internet <URL:http://standard.pictel.com//ftp/video-site/0104_Aus/VCEG-M81d0.doc>.
(Continued)

*Primary Examiner*—Andy S Rao
(74) *Attorney, Agent, or Firm*—Oblon, Spivak, McClelland, Maier & Neustadt, L.L.P.

(57) ABSTRACT

For the purpose of coding or decoding motion information in a picture with a small overhead, a coding method of performing compression coding of a moving picture by motion compensated prediction is configured to have a motion compensated prediction step (processing by motion detector 2, motion compensator 5, spatial predictor 9, etc.) of performing the motion compensated prediction while assigning one or more motion vectors (e.g., up to two motion vectors) in units of sub-blocks obtained by sub-dividing each of macroblocks resulting from division of each frame of the moving picture; and an assignment information coding step (processing by variable length encoder 23 and others) of outputting information about an assignment situation of the one or more motion vectors to the sub-blocks in a multiplexed form on a bitstream.

27 Claims, 44 Drawing Sheets

U.S. PATENT DOCUMENTS

| | | | | |
|---|---|---|---|---|
| 5,825,423 | A | * 10/1998 | Jung | 375/240.14 |
| 6,043,847 | A | 3/2000 | Kadono et al. | |
| 6,084,908 | A | 7/2000 | Chiang et al. | |
| 6,111,917 | A | 8/2000 | Tomita et al. | |
| 6,125,143 | A | 9/2000 | Suzuki et al. | |
| 6,229,854 | B1 | 5/2001 | Kikuchi et al. | |
| 6,295,376 | B1 * | 9/2001 | Nakaya | 382/236 |
| 6,724,821 | B1 * | 4/2004 | Sawada | 375/240.16 |
| 2004/0223612 | A1 * | 11/2004 | Kamijoh et al. | 380/201 |

FOREIGN PATENT DOCUMENTS

| | | |
|---|---|---|
| EP | 0 942 605 | 9/1999 |
| EP | 0 982 951 | 3/2000 |
| EP | 1 111 932 A2 | 6/2001 |
| JP | 2000-50279 | 2/2000 |
| JP | 2001-500688 | 1/2001 |
| JP | 2001-112006 | 4/2001 |
| JP | 2001-224036 | 8/2001 |
| JP | 2001-238220 | 8/2001 |
| KR | 0156958 | 5/1996 |
| WO | WO 99/23826 | 5/1999 |
| WO | WO 99/33274 | 7/1999 |

OTHER PUBLICATIONS

Ryolchl Kawada, et al, "An Integrated Scheme of Motion Estimation and Segmentation for Motion Compensated Predictive Coding", Technical Report of the Institute of Electronics, Information and Communication Engineers, vol. 94, No. 364 IE98-73, Oct. 23, 1998, pp. 35-42 (with English translation).

Video Coding Experts Group (VCEG)., H.26L Test Model Long Term No. 6 (TML-6) draft 0., Mar. 3, 2001, {retrieved from the Internet on Aug. 1, 2003}, pp. 1-36.

Steve Calzone et al: "Video Compression by Mean-Corrected Motion Compensation of Partial Quadtrees" IEEE Transactions on Circuits and Systems for Video Technology, vol. 7, No, 1, pp. 86-96, Feb. 1, 1997, XP011014342.

Haridasan R. et al: "Scalable coding of video objects", Circuits and Systems, 1998. ISCAS '98. Proceedings of the 1998 IEEE International Symposium on Monterey, vol. 4, May 31, 1998, pp. 289-292, XP010289442.

Touradj Ebrahimi, et al., "A Region Based Motion Compensated Video Codec for Very Low Bitrate Applications", Jan. 1, 1995; pp. 457-461.

Gary Sullivan, et al, " Detailed Algorithm Technical Description for ITU-T VCEG Draft H. 26L Algorithm in Response to Video and DCinema CfPs", ITU-T VCEG (Q.6/16), Internation Organisation for standardisation Organisation Internationale De Normailisation, ISO/IEC JTC1/SC29/WG11, Coding of Moving Pictures and Audio, Jul., 2001, p. 1-46.

Wiegand Thomas, et al., "Long-Term Memoriy Prediction Using Affine Motion Compensation", Telecommunications Laboratory University of Erlangen-Nuremberg, vol. 1 Oct. 24, 1999, pp. 51-55.

* cited by examiner

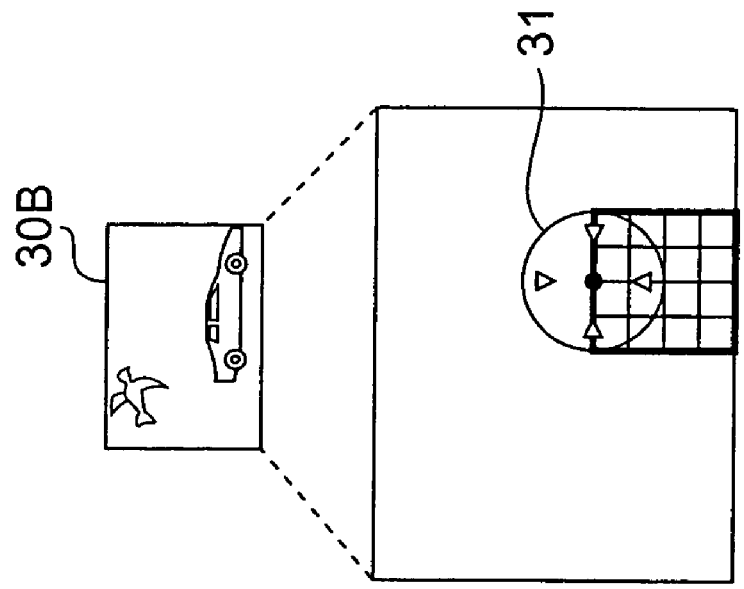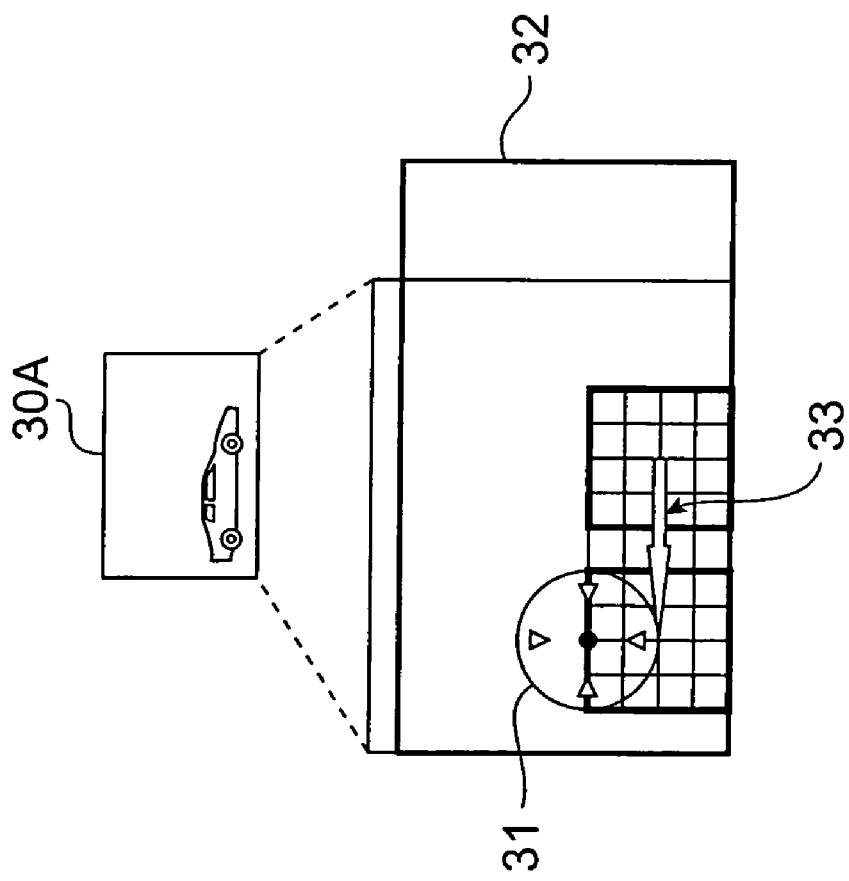

| 0 | 1 |

Fig.4C

| 0 | 1 |

Fig.4D

| 0 | 1 |
|---|---|
| 2 | 3 |

Fig.4E

| 0 | 1 | 2 | 3 |
|---|---|---|---|
| 4 | 5 | 6 | 7 |

Fig.4F

| 0 | 1 |
|---|---|
| 2 | 3 |
| 4 | 5 |
| 6 | 7 |

Fig.4G

| 0 | 1 | 2 | 3 |
|---|---|---|---|
| 4 | 5 | 6 | 7 |
| 8 | 9 | 10 | 11 |
| 12 | 13 | 14 | 15 |

Fig.5

| MODE | MODE BIT COUNT | MINIMUM MOTION VECTOR BIT COUNT | MINIMUM REQUISITE BIT COUNT |
|---|---|---|---|
| 1 | 1 | 2 | 3 |
| 2 | 3 | 4 | 7 |
| 3 | 3 | 4 | 7 |
| 4 | 5 | 8 | 13 |
| 5 | 5 | 16 | 21 |
| 6 | 5 | 16 | 21 |
| 7 | 5 | 32 | 37 |

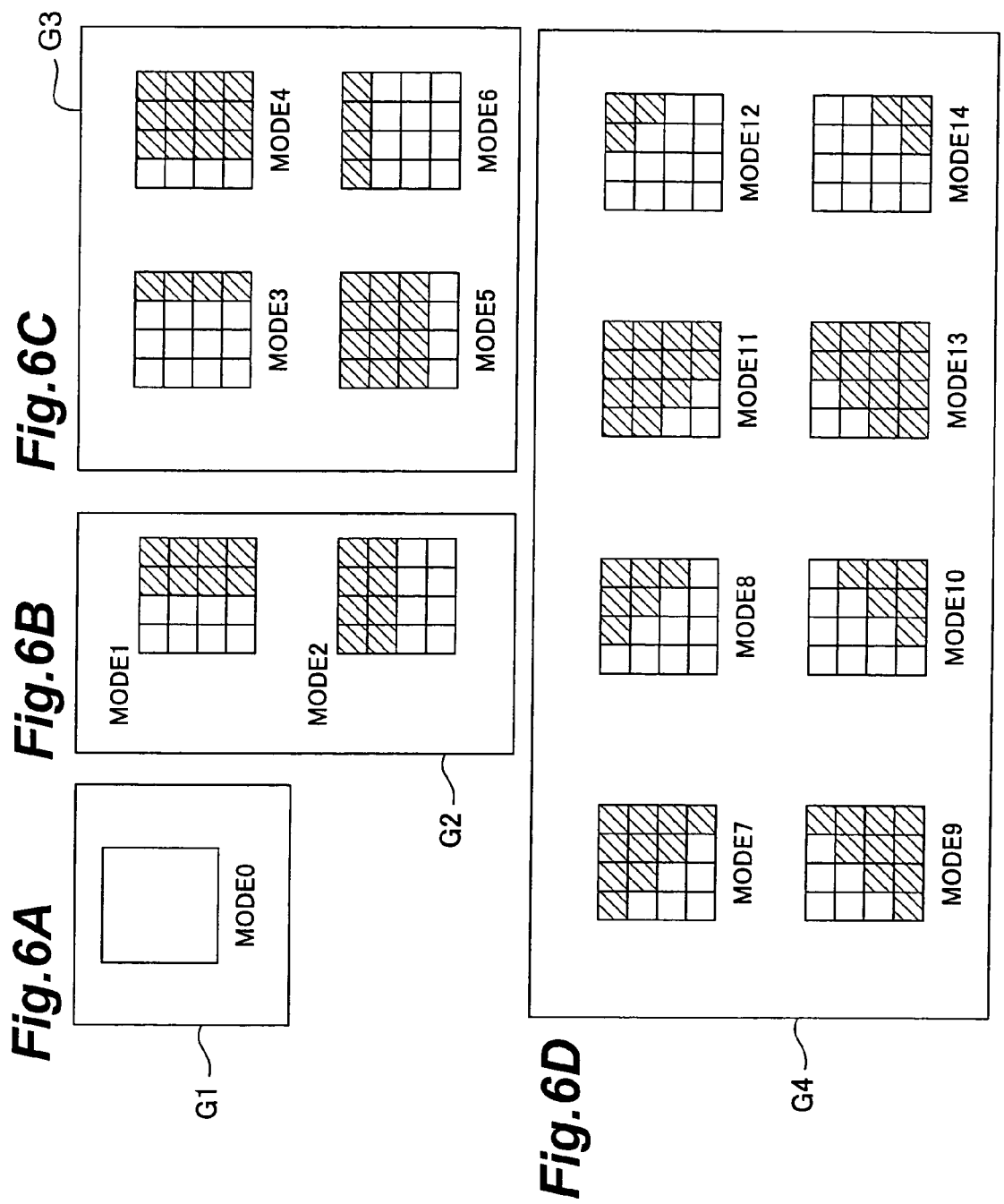

Fig.9

| MODE | UPPER PRIORITIES | LEFT PRIORITIES |
|---|---|---|
| MODE0 | 0,2,5,6,8,9,12,13 | 0,3,4,7,9,11,13 |
| MODE1 | 1,0,3,4,11,14 | 0,4,3,7,9,11,13 |
| MODE2 | 0,2,6,5,8,9,12,13 | 2,0,5,6,12,14 |
| MODE3 | 3,0,1,7 | 0,4,1,7,9,11,13 |
| MODE4 | 4,0,1,1014 | 0,4,1,7,9,11,13 |
| MODE5 | 0,6,2,8,9,12,13 | 5,0,2,8,12 |
| MODE6 | 0,5,2,8,9,12,13 | 6,0,2,10,14 |
| MODE7 | 0,6,2,12,8,13,9 | 6,0,10,2 |
| MODE8 | 0,4,1,10,9 | 0,4,1,13,11,7,9 |
| MODE9 | 0,3,1,7,12 | 5,0,2,7,12 |
| MODE10 | 0,6,2,12,13,8 | 0,4,1,13,11,7 |
| MODE11 | 0,6,2,13,12,9 | 2,12,0,14 |
| MODE12 | 1,11,0,14 | 0,4,13,11,9 |
| MODE13 | 1,3,14,0 | 2,14,12,0 |
| MODE14 | 0,6,2,12,13 | 0,4,11,13 |

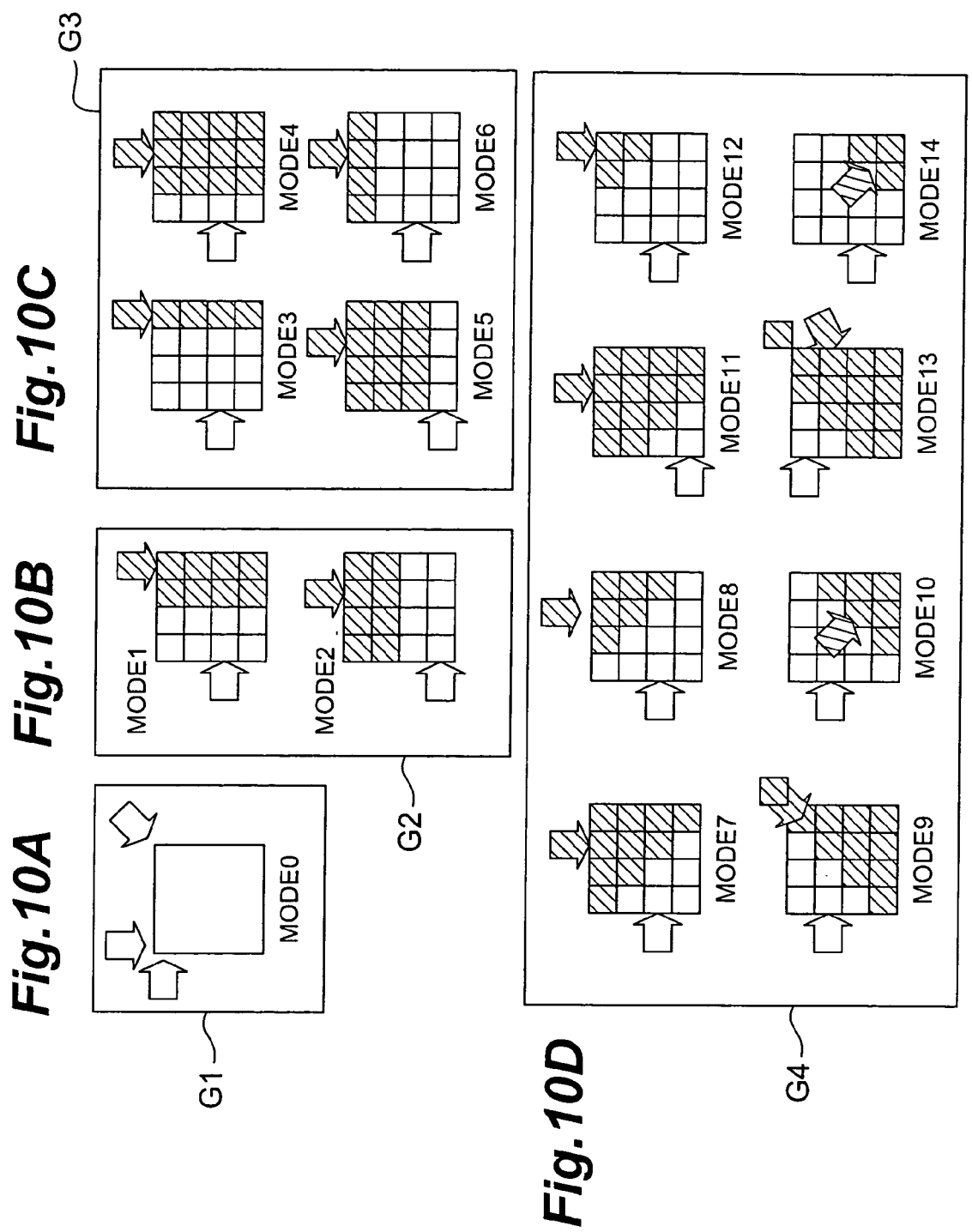

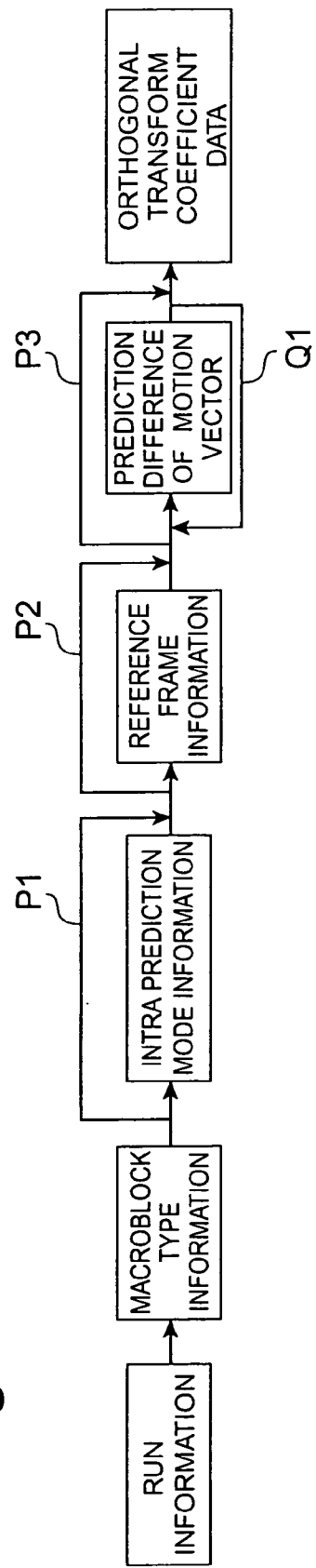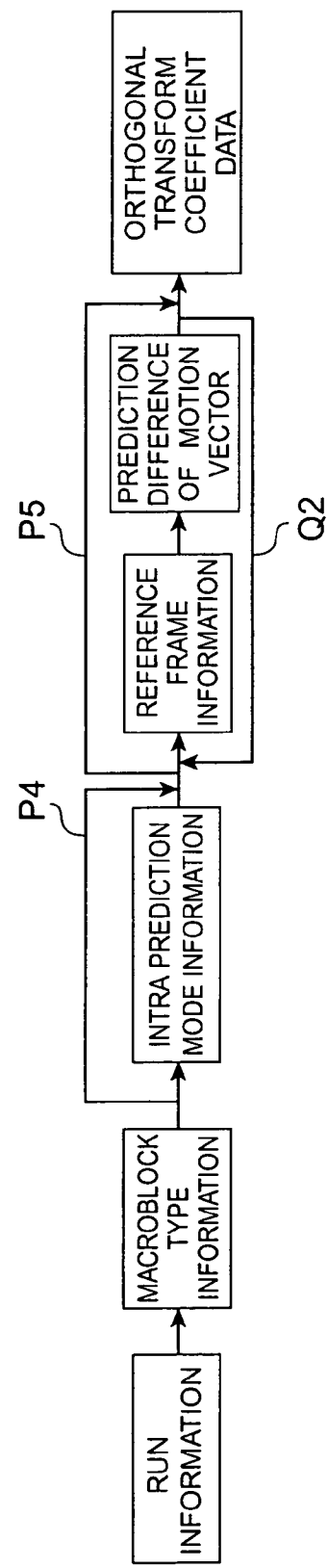

Fig.13A Fig.13B Fig.13C

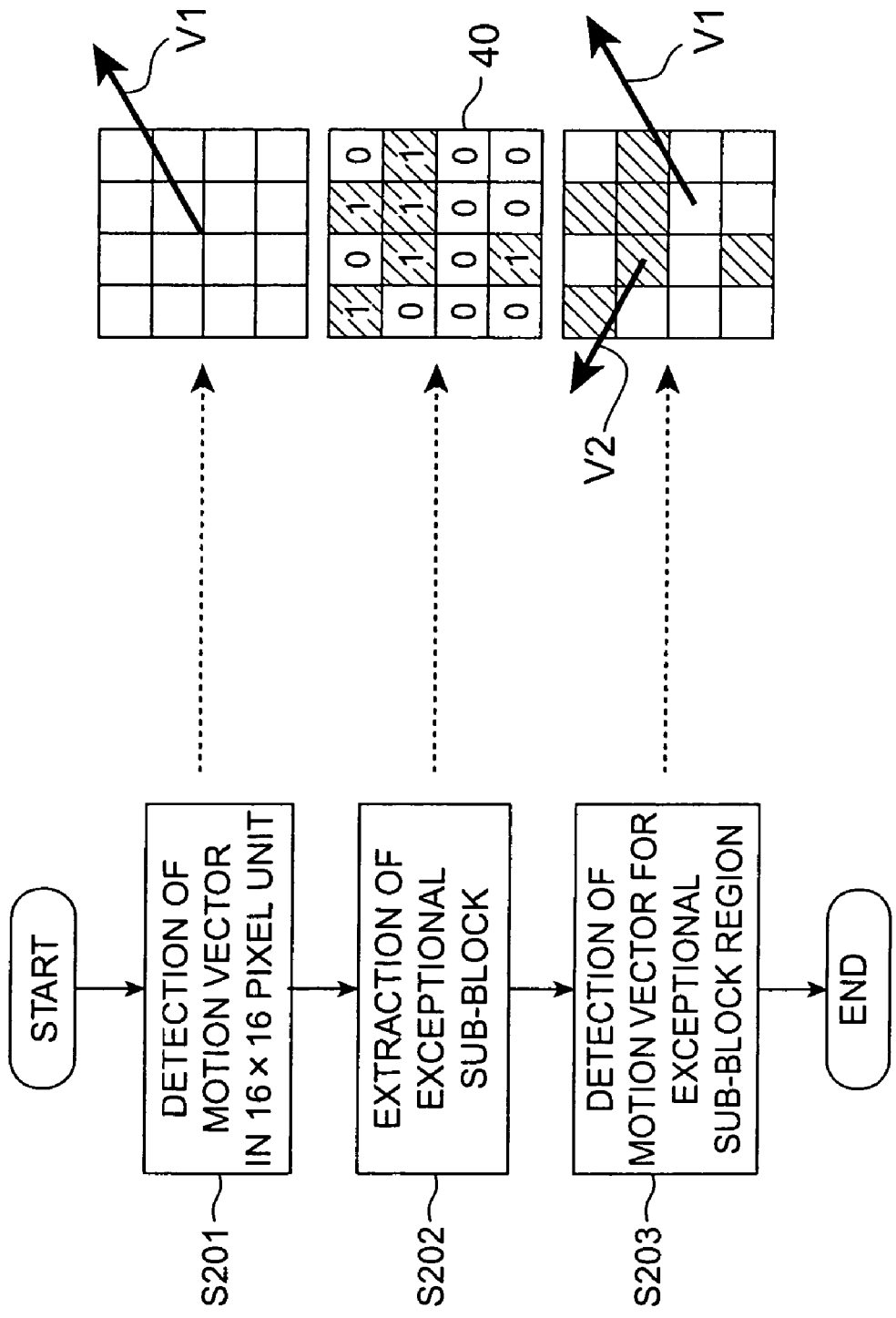

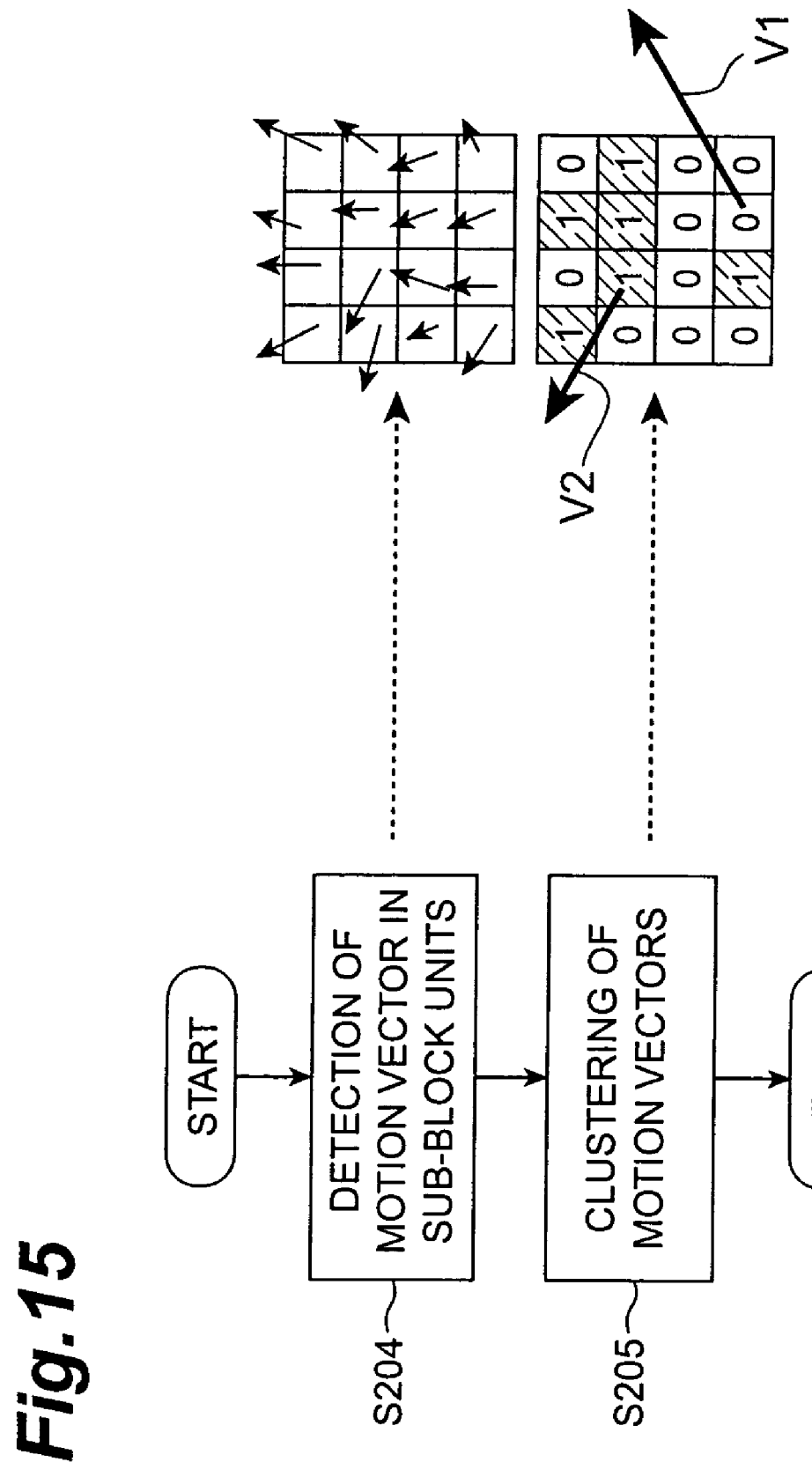

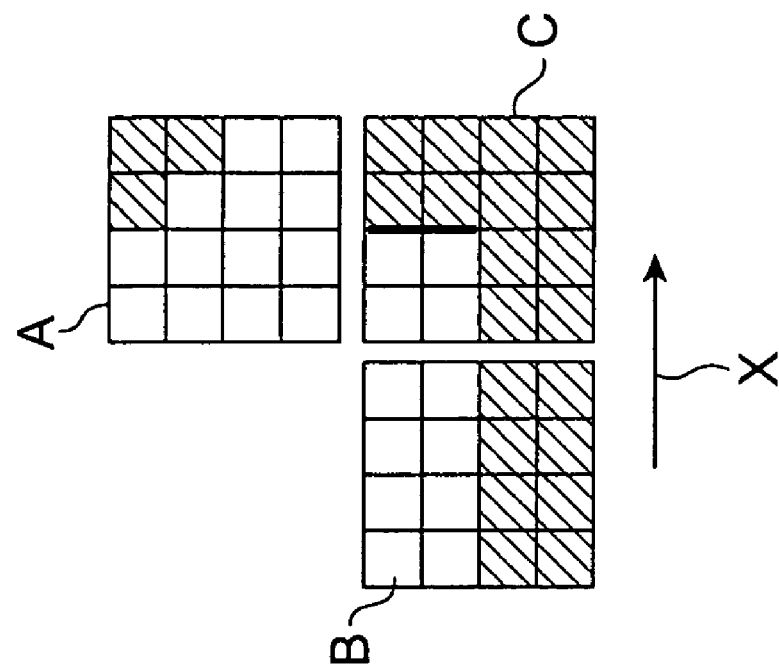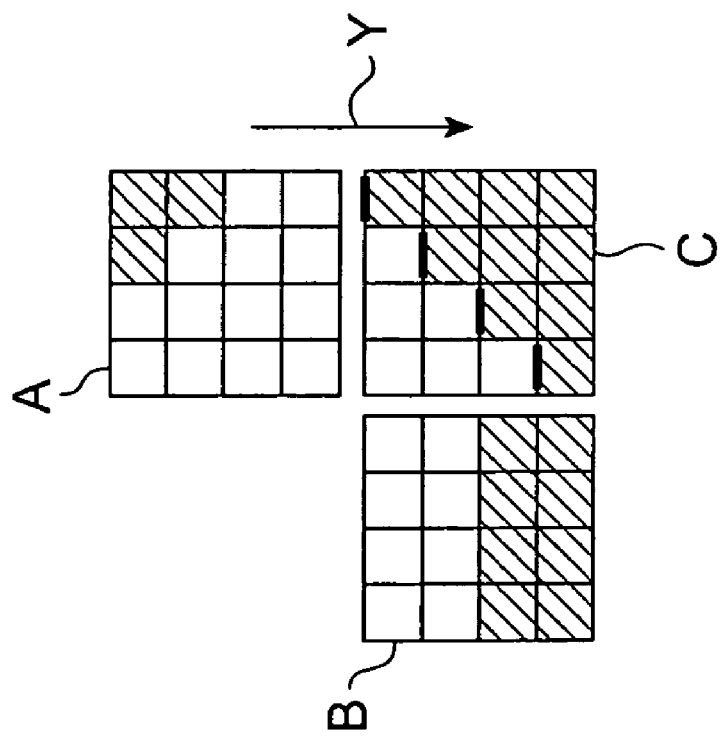

Fig.18A

| R | CODE | CODE LENGTH |
|---|---|---|
| 4 | 0 | 1 |
| 3 | 1 | 3 |
| 2 | 2 | 3 |
| 1 | 3 | 5 |
| INITIAL REVERSAL 0 | 4 | 5 |

Fig.18B

| R | CODE | CODE LENGTH |
|---|---|---|
| 3 | 0 | 1 |
| 2 | 1 | 3 |
| 1 | 2 | 3 |

Fig.18C

| R | CODE | CODE LENGTH |
|---|---|---|
| 2 | 0 | 1 |
| 1 | 1 | 3 |

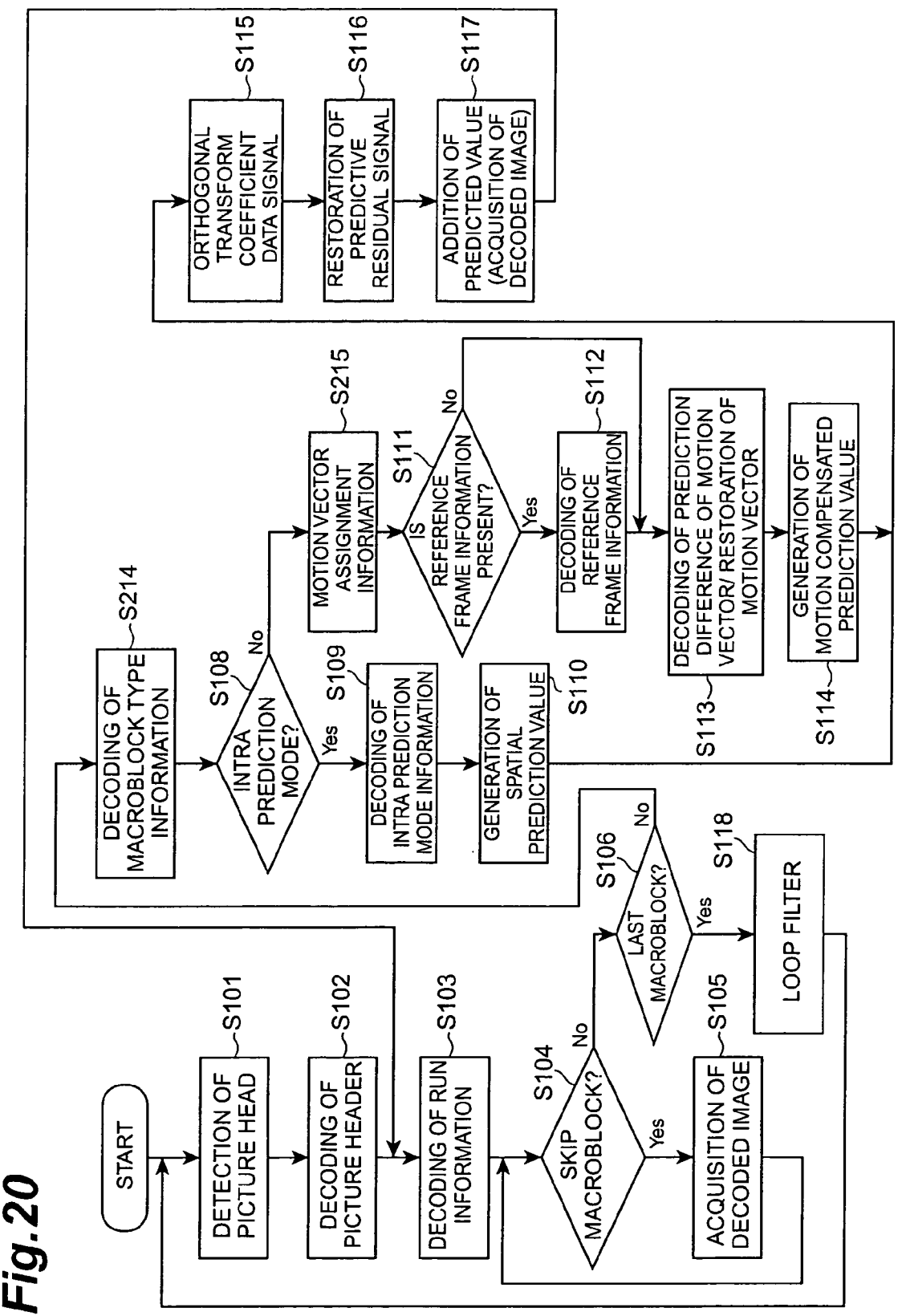

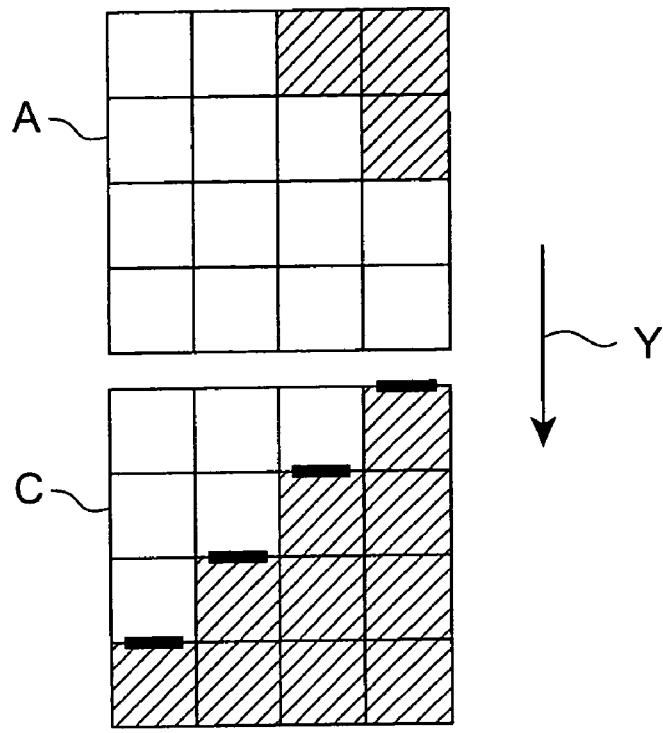

Fig.23A

| 1 | 2 | 6 | 7 |
|---|---|---|---|
| 3 | 5 | 8 | 13 |
| 4 | 9 | 12 | 14 |
| 10 | 11 | 15 | 16 |

Fig.23B

| 1 | 2 | 3 | 4 |
|---|---|---|---|
| 8 | 7 | 6 | 5 |
| 9 | 10 | 11 | 12 |
| 16 | 15 | 14 | 13 |

Fig.23C

| 1 | 2 | 15 | 16 |
|---|---|---|---|
| 4 | 3 | 14 | 13 |
| 5 | 8 | 9 | 12 |
| 6 | 7 | 10 | 11 |

Fig. 24A

| 4 | 1 |
|---|---|
| 1 | 1 |
| 1 | 1 |
| 1 | 1 |
| 2 | 1 |

| 1 | 7 | 7 | 8 |
| 1 | 7 | 7 | 8 |
| 1 | 1 | 7 | 7 |
| 2 | 1 | 7 | 7 |

| 1 | 2 | 1 | 1 |

Fig. 24B

| 1 | 1 | 1 | 3 |

| 2 | 1 | 3 | 4 |
| 2 | 1 | 3 | 6 |
| 2 | 3 | 3 | 7 |
| 7 | 7 | 7 | 7 |
| 7 | 7 | 7 | 7 |

| 2 | 2 | 7 | 7 |

| | | | |
|---|---|---|---|
| 1 | 1 | 0 | 0 |
| 0 | 1 | 0 | 0 |
| 1 | 0 | 0 | 0 |
| 0 | 0 | 0 | 0 |

INTRA PREDICTION MODE INFORMATION=1

| | | | |
|---|---|---|---|
| 0 | 0 | 0 | 0 |
| 0 | 0 | 0 | 0 |
| 0 | 1 | 0 | 0 |
| 0 | 0 | 0 | 0 |

INTRA PREDICTION MODE INFORMATION=2

| | | | |
|---|---|---|---|
| 0 | 0 | 0 | 0 |
| 0 | 0 | 0 | 0 |
| 0 | 0 | 0 | 0 |
| 0 | 0 | 0 | 0 |

INTRA PREDICTION MODE INFORMATION=3

| | | | |
|---|---|---|---|
| 0 | 0 | 0 | 0 |
| 0 | 0 | 0 | 0 |
| 0 | 0 | 0 | 0 |
| 0 | 0 | 0 | 0 |

INTRA PREDICTION MODE INFORMATION=4

| | | | |
|---|---|---|---|
| 0 | 0 | 0 | 0 |
| 0 | 0 | 0 | 0 |
| 0 | 0 | 1 | 0 |
| 0 | 0 | 0 | 0 |

INTRA PREDICTION MODE INFORMATION=5

| | | | |
|---|---|---|---|
| 0 | 0 | 0 | 0 |
| 0 | 0 | 0 | 0 |
| 0 | 0 | 0 | 0 |
| 0 | 0 | 0 | 0 |

INTRA PREDICTION MODE INFORMATION=6

| 0 | 0 | 0 | 0 |
|---|---|---|---|
| 0 | 1 | 7 | 0 |
| 0 | 7 | 0 | 0 |
| 7 | 0 | 8 | 0 |

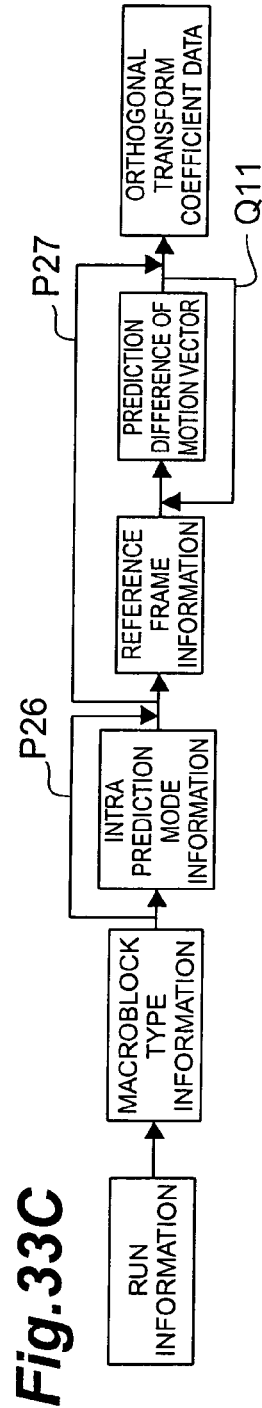

Fig.34A

| NUMBER | REFERENCE FRAME INFOMATION | BIT COUNT |
|---|---|---|
| 0 | 0 | 1 |
| 1 | 1 | 3 |
| 2 | 2 | 3 |
| 3 | 3 | 5 |
| 4 | 4 | 5 |

Fig.34B

| NUMBER | REFERENCE FRAME INFOMATION | BIT COUNT |
|---|---|---|
| 0 | 0 | 1 |
| 1 | 1 | 3 |
| 2 | 4 | 3 |
| 3 | 2 | 5 |
| 4 | 3 | 5 |

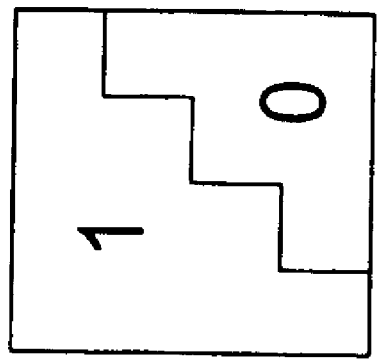
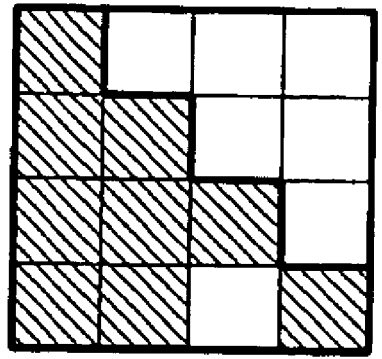
Fig.35A  Fig.35B  Fig.35C

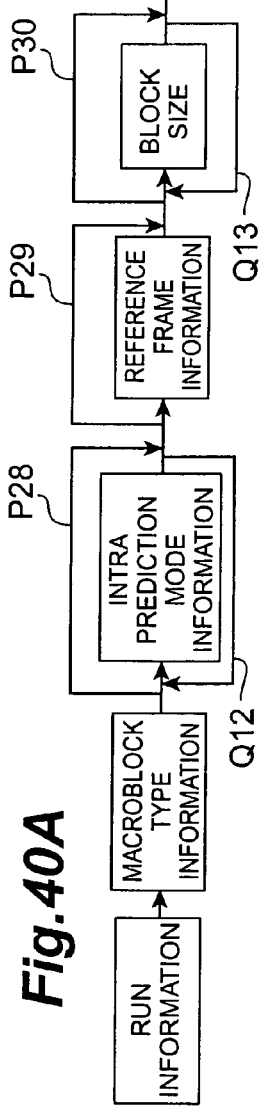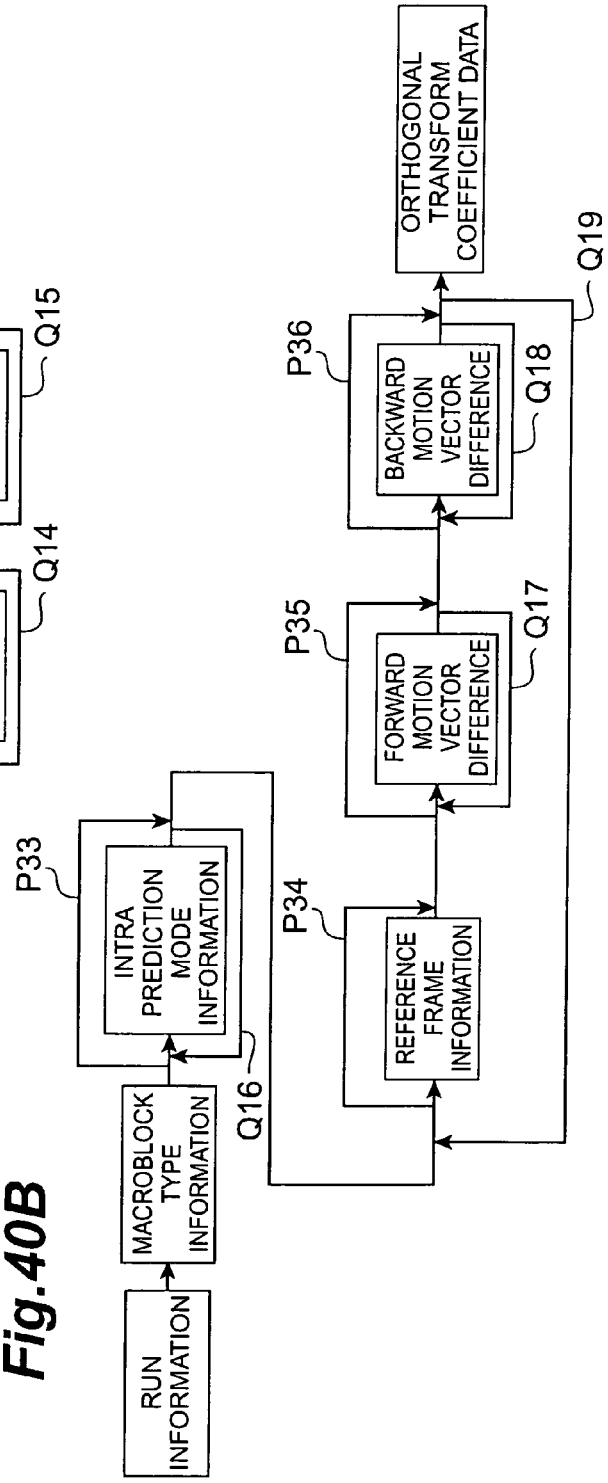
Fig.40A
Fig.40B

Fig.41

| CODE NUMBER | MACROBLOCK TYPE INFORMATION | INTRA PREDICTION MODE INFORMATION | REFERENCE FRAME INFORMATION |
|---|---|---|---|
| 0 | DIRECT | | X |
| 1 | MODE0 | | X(×2) |
| 2 | MODE1 | | X(×2) |
| 3 | MODE2 | | X(×2) |
| 4 | MODE3 | | X(×2) |
| 5 | MODE4 | | X(×2) |
| 6 | MODE5 | | X(×2) |
| 7 | MODE6 | | X(×2) |
| 8 | MODE7 | | X(×2) |
| 9 | MODE8 | | X(×2) |
| 10 | MODE9 | | X(×2) |
| 11 | MODE10 | | X(×2) |
| 12 | MODE11 | | X(×2) |
| 13 | MODE12 | | X(×2) |
| 14 | MODE13 | | X(×2) |
| 15 | MODE14 | | X(×2) |
| 16 | INTRA 4×4 | X | |
| 17 | (INTRA 16×16) | | |
| ... | ... | | |

*Fig.42*

| CODE NUMBER | REFERENCE FRAME INFORMATION AND PREDICTION DIRECTION | FORWARD MOTION VECTOR DIFFERENCE | BACKWARD MOTION VECTOR DIFFERENCE |
|---|---|---|---|
| 0 | FORWARD (REFERENCE FRAME NUMBER OF FORWARD PREDICTION: 1) | X | |
| 1 | BACKWARD | | X |
| 2 | BIDIRECTIONAL (REFERENCE FRAME NUMBER OF FORWARD PREDICTION: 1) | X | X |
| 3 | FORWARD (REFERENCE FRAME NUMBER OF FORWARD PREDICTION: 2) | X | |
| 4 | BIDIRECTIONAL (REFERENCE FRAME NUMBER OF FORWARD PREDICTION: 2) | X | X |
| 5 | FORWARD (REFERENCE FRAME NUMBER OF FORWARD PREDICTION: 3) | X | |
| 6 | BIDIRECTIONAL (REFERENCE FRAME NUMBER OF FORWARD PREDICTION: 3) | X | X |
| 7 | FORWARD (REFERENCE FRAME NUMBER OF FORWARD PREDICTION: 4) | X | |
| 8 | BIDIRECTIONAL (REFERENCE FRAME NUMBER OF FORWARD PREDICTION: 4) | X | X |
| 9 | FORWARD (REFERENCE FRAME NUMBER OF FORWARD PREDICTION: 5) | X | |
| 10 | BIDIRECTIONAL (REFERENCE FRAME NUMBER OF FORWARD PREDICTION: 5) | X | X |
| ... | ... | | |

CODING METHOD, DECODING METHOD, CODING APPARATUS, DECODING APPARATUS, IMAGE PROCESSING SYSTEM, CODING PROGRAM, AND DECODING PROGRAM

TECHNICAL FIELD

The present invention relates to a coding method, coding apparatus, and coding program of performing compression coding of a moving picture by motion compensated prediction, a decoding method, decoding apparatus, and decoding program of performing decompression and decoding of compressed moving picture data by motion compensated prediction, and an image processing system comprised of the coding apparatus and decoding apparatus.

BACKGROUND ART

The image coding and decoding method based on the H.26L coding method is known as a case example of the conventional video coding methods, which is described in International Standardization Working Document ITU-T SG16 VCEG-M81, "H.26L Test Model Long Term Number 7 (TML-7)" draft0 (http://standard.pictel.com/ftp/video-site/0104_$_{Aus/VCEG-M}$81d0.doc).

In this H.26L video coding, many motion division patterns shown in FIG. 4A to FIG. 4G are prepared as inter prediction modes so as to enable elaborate motion compensation. This ingenuity presents such effect that it is feasible to efficiently capture motions in a case where fine motions occur inside macroblocks, and to increase prediction efficiency.

However, the method of preparing the many motion division patterns as inter prediction modes has the problem that more motion vector information needs to be transmitted with increase in the number of motion divisions, so as to result in increase of the overhead. FIG. 5 shows the volume of transmitted information necessary for each of the modes of FIG. 4A to FIG. 4G. In this FIG. 5 "mode bit" represents a code length of a variable length code for expressing each prediction mode, "minimum motion vector bit" represents the minimum information amount that can be taken as the amount of information about motion vectors to be transmitted in each macroblock unit, and "minimum requisite bit count" represents the sum of the mode bit and the minimum motion vector bit. The motion vector bit is the total bit count of two values in the horizontal and vertical directions, and the case yielding the minimum is one wherein the motion vector agrees with a motion vector predicted value in both the horizontal and vertical directions (a predicted value of a motion vector is calculated from near motion vectors according to a predetermined rule and the difference between the motion vector value and the motion vector predicted value is coded). However, that is normally a rare case, and it is necessary to transmit more information than the bit count. It is seen from this FIG. 5 that the overhead becomes very large in Mode 4 or 5 or higher.

On the other hand, in the case of ordinary images, it is believed that there exist cases wherein sufficient motion compensation can be achieved by a comprehensive way of capturing the motions by division into two segments or so, without elaborate motion detection based on segmentalization of each macroblock region into four or more segments. However, the fixed motion assignment in the 16×8 and 8×16 pixel units prepared in the H.26L coding method had the problem that it was not possible to accurately express motion divisions inside each macroblock, which was the reason why the seven inter prediction modes of FIG. 4A to FIG. 4G were prepared.

The present invention has been accomplished in order to solve the above problem and an object of the present invention is to provide a coding method, a decoding method, a coding apparatus, a decoding apparatus, an image processing system, a coding program, and a decoding program enabling coding or decoding of motion information in a picture with the overhead being small.

DISCLOSURE OF THE INVENTION

In order to achieve the above object, a coding method according to the present invention is a coding method of performing compression coding of a moving picture by motion compensated prediction, the coding method comprising: a motion compensated prediction step of performing the motion compensated prediction while assigning one or more motion vectors in units of second blocks obtained by sub-dividing each of first blocks resulting from division of a frame of the moving picture; and an assignment information coding step of outputting information about an assignment situation of the one or more motion vectors to the second blocks in a multiplexed form on a bitstream.

The first blocks herein can be, for example, 16×16 pixel blocks, while the second blocks, for example, 4×4 pixel blocks. In this coding method, the motion compensated prediction step is configured to perform the motion compensated prediction while assigning one or more motion vectors in units of the second blocks obtained by sub-dividing each of the first blocks resulting from division of each frame of a moving picture, and the assignment information coding step is configured to output the information about the assignment situation of the one or more motion vectors to the second blocks in a multiplexed form on a bitstream; it thus becomes feasible to accurately capture various motions in the first block with a small overhead and to implement efficient video transmission, recording, and playback.

In this case, the motion compensated prediction step may be configured to assign the motion vectors, regardless of locations and the number of the second blocks. Namely, the coding method can be configured so that the motion compensated prediction step is configured to perform the motion compensated prediction while assigning the one or more motion vectors in units of second blocks, regardless of locations and the number of second blocks in a first block, and so that the assignment information coding step is configured to use information about the locations of the second blocks and the one or more motion vectors assigned to the second blocks, as the information about the assignment situation of the one or more motion vectors.

The motion compensated prediction step may be configured to assign the motion vectors in units of the second blocks in accordance with a predetermined assignment pattern. Namely, the coding method can be configured so that the motion compensated prediction step is configured to perform the motion compensated prediction while assigning the one or more motion vectors in units of second blocks in accordance with an assignment pattern preliminarily determined by grouping one or more second blocks, and so that the assignment information coding step is configured to use identification information of the assignment pattern, as the information about the assignment situation of the one or more motion vectors.

As an aspect according to the predetermined assignment pattern as described above, it is possible to employ a configuration wherein the motion compensated prediction step is configured to select one of a plurality of pattern groups obtained by preliminarily grouping motion vector assignment patterns to second blocks defined in each first block unit and to perform the motion compensated prediction while assigning the one or more motion vectors to the second blocks on the basis of an assignment pattern included in the selected pattern group, and wherein the assignment information coding step is configured to output the information about the assignment situation of the one or more motion vectors coded in each first block unit, as identification information of the motion vector assignment pattern specified out of the selected pattern group.

Since the information about the motion vector assignment situation is outputted as identification information of the motion vector assignment pattern with lower data volume as described above, it becomes feasible to accurately capture various motions in the first block with a small overhead and to implement efficient video transmission, recording, and playback.

It is also possible to employ a configuration wherein the assignment information coding step is configured to determine a predicted value of a motion vector according to a shape of a motion vector assignment pattern for a first block as an object of coding and to code a prediction difference based on the predicted value, as motion vector information.

Since the assignment information coding step is configured to determine the predicted value of the motion vector according to the shape of the motion vector assignment pattern and to code the prediction difference as motion vector information based on the predicted value with lower data volume as described above, it becomes feasible to accurately capture various motions in the first block with a small overhead and to implement efficient video transmission, recording, and playback.

Preferably, the assignment information coding step is configured to determine prediction candidate locations for the one or more motion vectors according to the shape of the motion vector assignment pattern for the first block as an object of coding, to define one of the prediction candidate locations as a predicted value in accordance with a shape of an assignment pattern for a first block located in the vicinity of the first block as an object of coding, and to code a prediction difference of the predicted value as motion vector information.

As an aspect according to the predetermined assignment pattern, it is possible to employ a configuration wherein the motion compensated prediction step is configured to determine a predicted value of a motion vector in accordance with a shape of a motion vector assignment pattern for a first block as an object of coding and to detect a motion vector while providing a motion vector search window centered around the predicted value, and wherein the assignment information coding step is configured to code a prediction difference between the detected motion vector and the motion vector predicted value as motion vector information.

Since the prediction difference between the detected motion vector and the motion vector predicted value, which has lower data volume, is coded as motion vector information as described above, it becomes feasible to accurately capture various motions in the first block with a small overhead and to implement efficient video transmission, recording, and playback.

In the above various aspects according to the predetermined assignment pattern, it is desirable to employ a configuration wherein the motion compensated prediction step is configured to set the maximum number of motion vectors assignable in units of second blocks to two, and to perform the motion compensated prediction while assigning the one or more motion vectors to the second blocks, on the basis of one of predetermined assignment patterns determined in each first block unit and indicating an assignment situation to second blocks included in the first block, and the assignment information coding step is configured to output information about the assignment situation of the one or more motion vectors determined in each first block unit, as identification information of the assignment pattern.

In a preferred configuration, the assignment patterns herein include a pattern in which the first block is unevenly divided horizontally or vertically, and a pattern in which the first block is divided obliquely.

Preferably, the assignment information coding step is configured to assign a variable length code to each assignment pattern, based on a shape of each assignment pattern, and to code identification information of the assignment pattern.

Preferably, the assignment information coding step is configured to, on the basis of a situation of an assignment pattern for a first block located in the vicinity of a first block as an object of coding, assign a variable length code to each assignment pattern for the first block as an object of coding and to code identification information of the assignment pattern.

Preferably, the assignment information coding step is configured to assign a variable length code to each assignment pattern, based on video contents, and to code identification information of the assignment pattern.

In the above various aspects according to the predetermined assignment pattern and in the aspect of assignment regardless of the locations and the number of second blocks, it is possible to employ a configuration further comprising a residual signal coding step of coding a predictive residual signal obtained in the motion compensated prediction step, in block units of the same size as that of the second blocks.

Namely, it is possible to employ a configuration comprising a motion compensated prediction step of performing motion compensated prediction while assigning one or more motion vectors in units of second blocks obtained by subdividing each of first blocks resulting from division of a frame of a moving picture; an assignment information coding step of outputting information about an assignment situation of the one or more motion vectors to the second blocks in a multiplexed form on a bitstream; and a residual signal coding step of coding a predictive residual signal obtained in the motion compensated prediction step, in block units of the same size as that of the second blocks. In this configuration, since the prediction residual signal obtained in the motion compensated prediction step is coded in block units of the same size as the size of the second blocks, the volume of coded data can be controlled to a low level, and it thus becomes feasible to accurately capture various motions in the first block with a small overhead and to implement efficient video transmission, recording, and playback.

In the various aspects according to the predetermined assignment pattern and in the aspect of assignment regardless of the locations and the number of second blocks, it is possible to employ a configuration wherein the assignment information coding step is configured to code information to identify whether there is a predictive residual signal to be coded in a motion vector assignment region consisting of one or more second blocks, based on the assignment situation of the one or more motion vectors. In this configuration, the information to identify whether there is a predictive residual signal to be coded in a motion vector assignment region consisting of one or more second blocks is coded based on the assignment situation of motion vectors; the volume of coded data can be controlled to a low level, and it thus becomes feasible to accurately capture various motions in the first block with a small overhead and to implement efficient video transmission, recording, and playback.

In the aspect of assignment regardless of the locations and the number of second blocks, it is possible to employ a configuration wherein the assignment information coding step is configured to, on the basis of assignment situation of motion vectors in a first block as an object of coding and a first block adjacent thereto, output information indicating a change point of motion vector assignment in the assignment situation, as the information about the assignment situation of the one or more motion vectors in a multiplexed form on a bitstream.

In the various aspects according to the predetermined assignment pattern, and in the aspect of assignment regardless of the locations and the number of second blocks, it is possible to employ a configuration wherein the motion compensated prediction step is configured to perform the motion compensated prediction, including a case where an inter prediction mode or an intra prediction mode is set in a unit consisting of one or more second blocks, in addition to a case where the inter prediction mode or the intra prediction mode is set in each first block unit.

In order to achieve the above object, a coding method according to the present invention is a coding method of performing compression coding of a moving picture by motion compensated prediction, the coding method comprising: a compensated prediction step of performing the motion compensated prediction while selecting one reference frame out of a plurality of reference frames retained for the motion compensated prediction, in a unit consisting of one or more second blocks obtained by sub-dividing each of first blocks resulting from division of a frame of the moving picture; and a reference frame information coding step of outputting information about a selection situation of the reference frame for the one or more second blocks in a multiplexed form on a bitstream.

In this coding method, the information about the selection situation of the reference frame for one or more second blocks has low data volume, so that the volume of coded data can be controlled to a low level; it thus becomes feasible to accurately capture various motions in the first block with a small overhead and to implement efficient video transmission, recording, and playback.

It is possible to employ a configuration wherein the reference frame information coding step is configured to code combinational information of selection situations of reference frames for the one or more second blocks included in a unit of the first block.

It is also possible to employ a configuration wherein the reference frame information coding step is configured: to determine a predicted value of a reference frame for one or more second blocks, from selection situations of reference frames in the first block, or one or more second blocks located in the vicinity; and to use difference information between the predicted value and the selected reference frame, as information about the selection situation of the reference frame.

In order to achieve the above object, a coding method according to the present invention is a coding method of performing compression coding of a moving picture by motion compensated prediction, the coding method comprising: a motion compensated prediction step of performing the motion compensated prediction while selecting a prediction direction used in bidirectional inter prediction, in a unit consisting of one or more second blocks obtained by sub-dividing each of first blocks resulting from division of a frame of the moving picture; and a prediction information coding step of outputting information about a selection situation of the prediction direction for the one or more second blocks in a multiplexed form on a bitstream.

This coding method makes it feasible to accurately capture various motions in the first block with a small overhead, to apply appropriate bidirectional inter prediction to every one or more second blocks capturing respective different motions, and to implement efficient video transmission, recording, and playback.

In order to achieve the above object, a coding method according to the present invention is a coding method of performing compression coding of a moving picture by motion compensated prediction, the coding method comprising: a prediction step of selecting an inter prediction mode or an intra prediction mode and performing inter prediction or intra prediction, in a unit consisting of one or more second blocks obtained by sub-dividing each of first blocks resulting from division of a frame of the moving picture; and a prediction mode information coding step of outputting information about a selection situation of the inter prediction mode or the intra prediction mode for the one or more second blocks in a multiplexed form on a bitstream.

This coding method makes it feasible to accurately capture various motions in the first block with a small overhead, to apply appropriate inter prediction or intra prediction to every one or more second blocks capturing respective different motions, and to implement efficient video transmission, recording, and playback.

It is possible to employ a configuration wherein the prediction information coding step or prediction mode information coding step is configured to code the information about the selection situation as combinational information with information about an assignment situation of one or more motion vectors to the first blocks, included in each unit of the first block, and to output the information in a multiplexed form on a bitstream.

It is also possible to employ a configuration wherein the prediction information coding step or prediction mode information coding step is configured to code the information about the selection situation, as combinational information with information about selection situation of reference frames from a plurality of reference frames for the one or more second blocks, included in the unit of one or more second blocks, and to output the information in a multiplexed form on a bitstream.

In order to achieve the above object, a decoding method according to the present invention is a decoding method of performing decompression and decoding of compressed moving picture data by motion compensated prediction, the decoding method comprising: an assignment information decoding step of decoding motion vector assignment information indicating which of one or more motion vectors decoded in each unit of the first block, a motion vector assigned in units of second blocks obtained by sub-dividing each of first blocks resulting from division of a frame of the moving picture corresponds to; and a motion compensation step of performing motion compensation using motion vectors specified in units of the second blocks on the basis of the motion vector assignment information and generating a predicted image.

In this decoding method, the assignment information decoding step is configured to decode the motion vector assignment information indicating which of one or more motion vectors decoded in each unit of the first block, a motion vector assigned in units of second blocks obtained by sub-dividing each of first blocks resulting from division of a frame of the moving picture corresponds to; and the motion compensation step is configured to generate a predicted image while performing the motion compensation using the motion vectors specified in units of the second blocks on the basis of the motion vector assignment information. Therefore, the motion vector assignment information about the motion vectors assigned in units of the second blocks is decoded, the motion compensation is performed using the motion vectors specified in units of the second blocks on the basis of the motion vector assignment information, and the predicted image is generated based thereon. This makes it feasible to implement accurate decoding with a small overhead and to implement efficient video transmission, recording, and playback.

In this case, it is possible to employ a configuration wherein the assignment information decoding step is configured to, regardless of locations and the number of second blocks as objects of assignment, decode the motion vector assignment information as information about the locations of the second blocks and the motion vectors assigned to the second blocks.

It is also possible to employ a configuration wherein the assignment information decoding step is configured to decode the motion vector assignment information as identification information of an assignment pattern preliminarily determined by grouping one or more second blocks.

As an aspect of decoding the motion vector assignment information as identification information of the predetermined assignment pattern as described above, it is possible to employ a configuration wherein the assignment information decoding step is configured to decode the motion vector assignment information as information to identify a motion vector assignment pattern to second blocks preliminarily determined in each first block unit, to, on the occasion of specifying the assignment pattern from the assignment pattern identification information, decode information to identify a pattern group to which the assignment pattern belongs, and to determine motion vector assignment to the second blocks from the assignment pattern identification information in accordance with a definition of the pattern group specified by the pattern group identification information. In this configuration, it becomes feasible to accurately decode the motion vector assignment information as the information to identify the predetermined motion vector assignment pattern to the second blocks, with a small overhead, and to implement efficient video transmission, recording, and playback.

As an aspect of decoding the motion vector assignment information as identification information of the predetermined assignment pattern, it is possible to employ a configuration wherein the assignment information decoding step is configured to decode motion vector information obtained by coding a prediction difference based on a predicted value of a motion vector determined according to a shape of a motion vector assignment pattern for a first block as an object of decoding. In this configuration, the assignment information decoding step is to decode the motion vector information obtained by coding the prediction difference based on the predicted value of the motion vector determined according to the shape of the motion vector assignment pattern for the first block as an object of decoding, so that it is feasible to decode the motion vector information obtained by coding the prediction difference with low data volume and to implement efficient video transmission, recording, and playback.

In this case, the decoding method is preferably configured so that the assignment information decoding step is configured to determine one of prediction candidate locations for the motion vector determined according to the shape of the motion vector assignment pattern for the first block as an object of decoding, as a predicted value according to a shape of an assignment pattern for a first block located in the vicinity, and to decode the motion vector information obtained by coding the prediction difference of the predicted value.

In the above aspect of decoding as identification information of the predetermined assignment pattern, it is desirable to employ a configuration wherein the maximum number of motion vectors to be decoded in each first block unit is set to two, and wherein the motion vector assignment information is decoded as information to identify one of predetermined assignment patterns defined in each first block unit and indicating an assignment state of one or more motion vectors to the second blocks included in the first block.

In this case, it is desirable to employ a configuration wherein the assignment patterns include a pattern in which the first block is unevenly divided horizontally or vertically, and a pattern in which the first block is divided obliquely.

It is also desirable to employ a configuration wherein the assignment information decoding step is configured to decode a variable length code assigned to each assignment pattern on the basis of a shape of each assignment pattern, as identification information of each assignment pattern.

It is also desirable to employ a configuration wherein the assignment information decoding step is configured to decode a variable length code assigned to each assignment pattern on the basis of a situation of an assignment pattern for a first block located in the vicinity of a first block as an object of decoding, as identification information of each assignment pattern for the first block as an object of decoding.

It is also desirable to employ a configuration wherein the assignment information decoding step is configured to decode a variable length code assigned to each assignment pattern on the basis of video contents, as identification information of each assignment pattern.

In the above aspect of decoding as identification information of the predetermined assignment pattern and in the aspect of decoding the motion vector assignment information regardless of the locations and the number of the second blocks, it is possible to employ a configuration further comprising a residual signal decoding step of decoding a predictive residual signal of the motion compensated prediction obtained by coding processing in block units of the same size as that of the second blocks.

Namely, it is possible to employ a configuration comprising an assignment information decoding step of decoding motion vector assignment information indicating which of one or more motion vectors decoded in each unit of the first block, a motion vector assigned in units of second blocks obtained by sub-dividing each of first blocks resulting from division of a frame of the moving picture corresponds to; and a motion compensation step of performing motion compensation using motion vectors specified in units of the second blocks on the basis of the motion vector assignment information and generating a predicted image; and a residual signal decoding step of decoding a predictive residual signal of the motion compensated prediction obtained by coding processing in block units of the same size as that of the second blocks. In this case, the residual signal decoding step is to decode the predictive residual signal of motion compensated prediction obtained by the coding processing in block units of the same size as the size of the second blocks, whereby it becomes feasible to decode the predictive residual signal with low volume of data to be coded, and to implement efficient video transmission, recording, and playback.

In the above aspect of decoding as identification information of the predetermined assignment pattern and in the aspect of decoding the motion vector assignment information regardless of the locations and the number of second blocks, it is desirable to employ a configuration wherein the assignment information decoding step is configured to decode information to identify whether there is a predictive residual signal to be decoded in a motion vector assignment region consisting of one or more second blocks, on the basis of a shape of a motion vector assignment pattern for a first block as an object of decoding. In this case, it becomes feasible to decode the prediction residual signal with low volume of data to be coded, and to implement efficient video transmission, recording, and playback.

In the above aspect of decoding the motion vector assignment information regardless of the locations and the number of the second blocks, it is preferable to employ a configuration wherein the assignment information decoding step is configured to decode information indicating a change point of motion vector assignment, outputted as information about an assignment situation of the motion vectors.

In the above aspect of decoding as identification information of the predetermined assignment pattern and in the aspect of decoding the motion vector assignment information regardless of the locations and the number of second blocks, it is desirable to employ a configuration wherein the motion vectors are motion vectors obtained by the motion compensated prediction including a case where an inter prediction mode or an intra prediction mode is set in a unit consisting of one or more second blocks, in addition to a case where the inter prediction mode or the intra prediction mode is set in each first block unit.

In order to achieve the above object, a decoding method according to the present invention is a decoding method of performing decompression and decoding of compressed moving picture data by motion compensated prediction, the decoding method comprising: a reference frame information decoding step of decoding information about a selection situation of a reference frame used in the motion compensated prediction, assigned in a unit of consisting of one or more second blocks obtained by sub-dividing each of first blocks resulting from division of a frame of a moving picture; and a compensation step of selecting one reference frame out of a plurality of reference frames retained for motion compensation, based on the reference frame information, and performing the motion compensation to generate a predicted image.

According to this aspect, the information about the selection situation of the reference frame for the one or more second blocks has low volume of data, and it thus becomes feasible to decode the information about the selection situation of the reference frame with low data volume and to implement efficient video transmission, recording, and playback.

In this case, it is desirable to employ a configuration wherein the reference frame information decoding step is configured to decode the reference frame information for the one or more second blocks, from combinational information of the selection situation of the reference frame for the one or more second blocks, included in each unit of the first block.

It is also desirable to employ a configuration wherein the reference frame information decoding step is configured: to determine a predicted value of a reference frame for one or more second blocks from the selection situation of the reference frame in the first block, or one or more second blocks located in the vicinity; and to perform the decoding on the basis of difference information of the reference frame outputted as the information about the selection situation of the reference frame, and the determined predicted value.

In order to achieve the above object, a decoding method according to the present invention is a decoding method of performing decompression and decoding of compressed moving picture data by motion compensated prediction, the decoding method comprising: a prediction information decoding step of decoding information about a selection situation of a prediction direction used in bidirectional inter prediction, assigned in a unit consisting of one or more second blocks obtained by sub-dividing each of first blocks resulting from division of a frame of a moving picture; and a motion compensation step of performing motion compensation to generate a predicted image, while, on the basis of the prediction information, selecting the prediction direction used in bidirectional interframe motion compensation, out of reference frames retained for both forward and backward directions.

According to this aspect, it becomes feasible to accurately capture various motions in the first block with a small overhead, to apply appropriate bidirectional inter prediction to every one or more second blocks capturing respective different motions, and to implement efficient video transmission, recording, and playback.

In order to achieve the above object, a decoding method according to the present invention is a decoding method of performing decompression and decoding of compressed moving picture data by motion compensation prediction, the decoding method comprising: a prediction mode information decoding step of decoding information about a selection situation of an inter prediction mode or an intra prediction mode assigned in a unit consisting of one or more second blocks obtained by sub-dividing each of first blocks resulting from division of a frame of a moving picture; and a predicted image generating step of selecting the inter prediction mode or the intra prediction mode, based on the prediction information, and performing inter prediction or intra prediction to generate a predicted image.

According to this aspect, it becomes feasible to accurately capture various motions in the first block with a small overhead, to apply appropriate inter prediction or intra prediction to every one or more second blocks capturing respective different motions, and to implement efficient video transmission, recording, and playback.

It is possible to employ a configuration wherein the prediction information decoding step or prediction mode information decoding step is configured to decode the information about the selection situation for the one or more second blocks, from combinational information between information about an assignment situation of one or more motion vectors to the first block and information about the selection situation, included in each unit of the first block.

It is also possible to employ a configuration wherein the prediction information decoding step or prediction mode information decoding step is configured to decode the information about the selection situation for the one or more second blocks, from combinational information between information about a selection situation of a reference frame out of a plurality of reference frames and the information about the selection situation for the one or more second blocks, included in the unit consisting of the one or more second blocks.

Incidentally, the present invention can also be grasped from various aspects of the invention associated with a coding apparatus using the coding method, a decoding apparatus using the decoding method, an image processing system comprised of these coding apparatus and decoding apparatus, a decoding program executed in the coding apparatus, and a decoding program executed in the decoding apparatus, while ensuring like action and effect. Namely, the invention can be described as follows.

In order to achieve the above object, a coding apparatus according to the present invention is a coding apparatus for performing compression coding of a moving picture by motion compensated prediction, the coding apparatus comprising: motion compensated prediction means for performing the motion compensated prediction while assigning one or more motion vectors in units of second blocks obtained by sub-dividing each of first blocks resulting from division of a frame of the moving picture; and assignment information coding means for outputting information about an assignment situation of the one or more motion vectors to the second blocks in a multiplexed form on a bitstream.

In this case, it is possible to employ a configuration wherein the motion compensated prediction means is configured to perform the motion compensated prediction while assigning the one or more motion vectors in units of second blocks, regardless of locations and the number of second blocks in a first block, and wherein the assignment information coding means is configured to use information about the locations of the second blocks and the one or more motion vectors assigned to the second blocks, as the information about the assignment situation of the one or more motion vectors.

It is also possible to employ a configuration wherein the motion compensated prediction means is configured to perform the motion compensated prediction while assigning the one or more motion vectors in units of second blocks in accordance with an assignment pattern preliminarily determined by grouping one or more second blocks, and wherein the assignment information coding means is configured to use identification information of the assignment pattern as the information about the assignment situation of the one or more motion vectors.

In order to achieve the above object, a decoding apparatus according to the present invention is a decoding apparatus for performing decompression and decoding of compressed moving picture data by motion compensated prediction, the decoding apparatus comprising: assignment information decoding means for decoding motion vector assignment information indicating which of one or more motion vectors decoded in each unit of the first block, a motion vector assigned in units of second blocks obtained by sub-dividing each of first blocks resulting from division of a frame of the moving picture corresponds to; and motion compensation means for performing motion compensation using motion vectors specified in units of the second blocks on the basis of the motion vector assignment information and generating a predicted image.

In this case, it is possible to employ a configuration wherein the assignment information decoding means is configured to decode the motion vector assignment information as information about a location of a second block as an object of assignment and a motion vector assigned to the second block.

It is also possible to employ a configuration wherein the assignment information decoding means is configured to decode the motion vector assignment information as identification information of an assignment pattern preliminarily determined by grouping one or more second blocks.

In order to achieve the above object, an image processing system according to the present invention is an image processing system comprising a coding apparatus for performing compression coding of a moving picture by motion compensated prediction, and a decoding apparatus for performing decompression and decoding of compressed moving picture data by the motion compensated prediction, wherein the coding apparatus comprises: motion compensated prediction means for performing the motion compensated prediction while assigning one or more motion vectors in units of second blocks obtained by sub-dividing each of first blocks resulting from division of a frame of the moving picture; and assignment information coding means for outputting information about an assignment situation of the one or more motion vectors to the second blocks in a multiplexed form on a bitstream; and wherein the decoding apparatus comprises: assignment information decoding means for decoding motion vector assignment information indicating which of one or more motion vectors decoded in each unit of the first block, a motion vector assigned in units of second blocks obtained by sub-dividing each of first blocks resulting from division of a frame of the moving picture corresponds to; and motion compensation means for performing motion compensation using motion vectors specified in units of the second blocks on the basis of the motion vector assignment information and generating a predicted image.

In this case, it is possible to employ a configuration wherein the motion compensated prediction means in the coding apparatus is configured to perform the motion compensated prediction while assigning the one or more motion vectors in units of second blocks, regardless of locations and the number of the second blocks in a first block; wherein the assignment information coding means is configured to use information about the locations of the second blocks and the one or more motion vectors assigned to the second blocks, as the information about the assignment situation of the one or more motion vectors; and wherein the assignment information decoding means in the decoding apparatus is configured to decode the motion vector assignment information as information about a location of a second block as an object of assignment and a motion vector assigned to the second block.

It is also possible to employ a configuration wherein the motion compensated prediction means in the coding apparatus is configured to perform the motion compensated prediction while assigning the one or more motion vectors in units of second blocks in accordance with an assignment pattern preliminarily determined by grouping one or more second blocks; wherein the assignment information coding means is configured to use identification information of the assignment pattern as the information about the assignment situation of the one or more motion vectors; and wherein the assignment information decoding means in the decoding apparatus is configured to decode the motion vector assignment information as identification information of an assignment pattern preliminarily determined by grouping one or more second blocks.

In order to achieve the above object, a coding program according to the present invention is configured to let a computer, which is incorporated in a coding apparatus for performing compression coding of a moving picture by motion compensated prediction, execute each of the steps in each of the aspects of the invention associated with the aforementioned coding methods.

In order to achieve the above object, a decoding program according to the present invention is configured to let a computer, which is incorporated in a decoding apparatus for performing decompression and decoding of compressed moving picture data by motion compensated prediction, execute each of the steps in each of the aspects of the invention associated with the aforementioned decoding methods.

The above object and other features and advantages of the present invention will become apparent to those skilled in the art by referring to the following detailed description with reference to the accompanying drawings.

BRIEF DESCRIPTION OF THE DRAWINGS

FIG. 3A is a diagram showing the contents of a previous frame used in the description of motion compensated inter prediction.

FIG. 3B is a diagram showing the contents of a present frame used in the description of motion compensated inter prediction.

FIG. 4A is a diagram showing Mode 1 among the inter prediction modes in H.26L.

FIG. 4B is a diagram showing Mode 2 among the inter prediction modes in H.26L.

FIG. 4C is a diagram showing Mode 3 among the inter prediction modes in H.26L.

FIG. 4D is a diagram showing Mode 4 among the inter prediction modes in H.26L.

FIG. 4E is a diagram showing Mode 5 among the inter prediction modes in H.26L.

FIG. 4F is a diagram showing Mode 6 among the inter prediction modes in H.26L.

FIG. 4G is a diagram showing Mode 7 among the inter prediction modes in H.26L.

FIG. 5 is a table showing the minimum transmitted information amount necessary for each Mode of the inter prediction modes.

FIG. 6A is a diagram showing a first group of fixed division patterns in an embodiment of the invention.

FIG. 6B is a diagram showing a second group of fixed division patterns in an embodiment of the invention.

FIG. 6C is a diagram showing a third group of fixed division patterns in an embodiment of the invention.

FIG. 6D is a diagram showing a fourth group of fixed division patterns in an embodiment of the invention.

FIG. 9 is a table showing an example of upper priorities and left priorities defined for each of the prediction modes in consideration of continuity of motion from neighboring macroblocks.

FIG. 10A is a diagram showing predicted values of motion vectors fixedly given to each prediction mode in the first group of fixed division patterns.

FIG. 10B is a diagram showing predicted values of motion vectors fixedly given to each prediction mode in the second group of fixed division patterns.

FIG. 10C is a diagram showing predicted values of motion vectors fixedly given to each prediction mode in the third group of fixed division patterns.

FIG. 10D is a diagram showing predicted values of motion vectors fixedly given to each prediction mode in the fourth group of fixed division patterns.

FIG. 11A is a diagram showing a syntax of macroblock data of a compressed stream in H.26L.

FIG. 11B is a diagram showing a syntax of macroblock data of a compressed stream in the first embodiment.

FIG. 13A is a diagram showing a first definition example of a prediction mode expressed as 4×4 binary map information for designating an arbitrary assignment situation.

FIG. 13B is a diagram showing a second definition example of a prediction mode expressed as 4×4 binary map information for designating an arbitrary assignment situation.

FIG. 13C is a diagram showing a third definition example of a prediction mode expressed as 4×4 binary map information for designating an arbitrary assignment situation.

FIG. 14 is a diagram showing a procedure of motion vector detection in the second embodiment.

FIG. 15 is a diagram showing another procedure of motion vector detection.

FIG. 16A is a diagram for explaining an example where the degree of continuity of motion from macroblock A is high, among the coding methods of prediction mode information in the second embodiment.

FIG. 16B is a diagram for explaining an example where the degree of continuity of motion from macroblock B is high, among the coding methods of prediction mode information in the second embodiment.

FIG. 18A is a table showing an example of code length CB(4).

FIG. 18B is a table showing an example of code length CB(3).

FIG. 18C is a table showing an example of code length CB(2).

FIG. 20 is a flowchart showing the processing contents of the decoding apparatus in the second embodiment.

FIG. 22 is a diagram to explain the processing contents of the coding apparatus in the third embodiment.

FIG. 23A is a diagram showing an example of zigzag scan of a scan table.

FIG. 23B is a diagram showing an example of horizontal scan of a scan table.

FIG. 23C is a diagram showing an example of Hilbert scan of a scan table.

FIG. 24A is a diagram showing a definition example of a prediction mode wherein discrimination of intra/inter is made along a diagonal direction and two motion vectors are used in an inter predicted segment in the fourth embodiment.

FIG. 24B is a diagram showing a definition example of a prediction mode in which a macroblock is divided into upper and lower segments, the upper segment being predicted by intra prediction while the lower segment by inter prediction, in the fourth embodiment.

FIG. 25A is a diagram showing a plane of intra/inter classification.

FIG. 25B is a diagram showing planes of intra prediction methods.

FIG. 25C is a diagram showing a plane of motion vector assignment.

FIG. 26A is a diagram showing a plane of intra/inter classification.

FIG. 26B is a diagram showing planes of intra prediction methods where only sub-blocks corresponding to intra or inter prediction are converted into bit plane data.

FIG. 26C is a diagram showing a plane of motion vector assignment where only sub-blocks corresponding to intra or inter prediction are converted into bit plane data.

FIG. 27 is a diagram showing an example in which the case of FIG. 24A is converted by the coding method 2 in the fourth embodiment.

FIG. 33A is a table showing a code configuration of reference frame information in H.26L.

FIG. 33B is a table showing an example of codes assigned to combinations of reference frame information.

FIG. 33C is a diagram showing a syntax of macroblock data corresponding to FIG. 33B.

FIG. 34A is a table showing codes switched according to the predicted value in the case where a value before a change or a predicted value was 0.

FIG. 34B is a table showing codes switched according to the predicted value in the case where the predicted value was 4.

FIG. 35A is a diagram showing a division example of a macroblock for explaining promotion of efficiency in coding of orthogonal transform coefficient data.

FIG. 35B is a diagram showing an example of transmitting the presence or absence of a significant coefficient in each 8×8 block unit.

FIG. 35C is a diagram showing an example of transmitting the presence or absence of a significant coefficient in each segmental region.

FIG. 40A is a diagram showing a syntax upon bidirectional motion compensated prediction in H.26L.

FIG. 40B is a diagram showing a syntax of macroblock data of a compressed stream in the sixth embodiment.

FIG. 41 is a code table of macroblock type information in the sixth embodiment.

FIG. 42 is a code table of reference frame information in the sixth embodiment.

BEST MODE FOR CARRYING OUT THE INVENTION

Various embodiments of the present invention will be described below in order.

First, the first embodiment of the present invention will describe the video coding apparatus configured to implement coding in macroblock units, particularly, the video coding apparatus and decoding apparatus configured to perform the motion compensated prediction while assigning up to two motion vectors to sub-blocks obtained by dividing a macroblock in 4×4 pixel units.

The configurations and operations of the image coding and decoding apparatus based on the H.26L coding method to which the present invention is applied will be described below.

Figure 1:
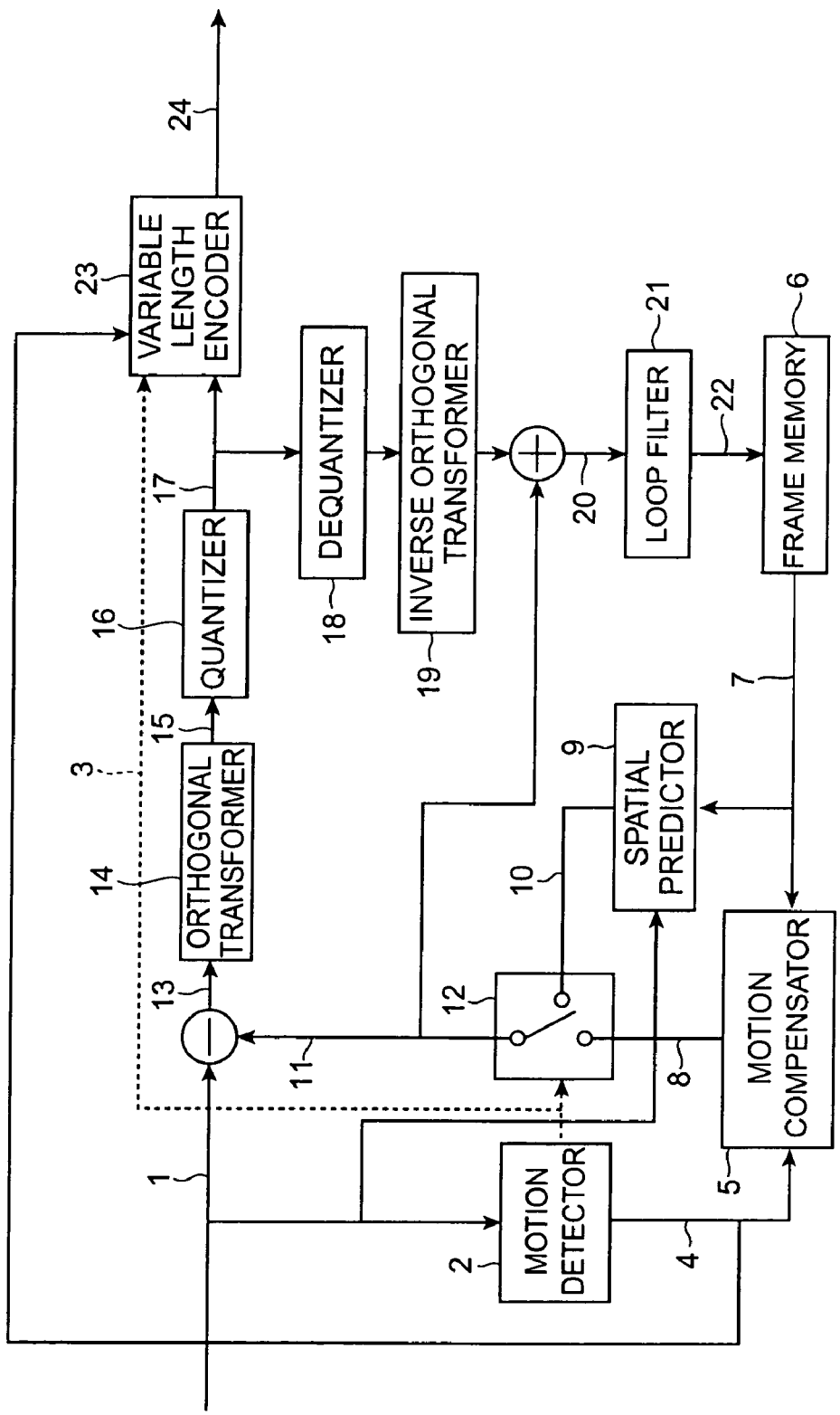
FIG. 1 is a configuration diagram of a coding apparatus.
Figure 2:
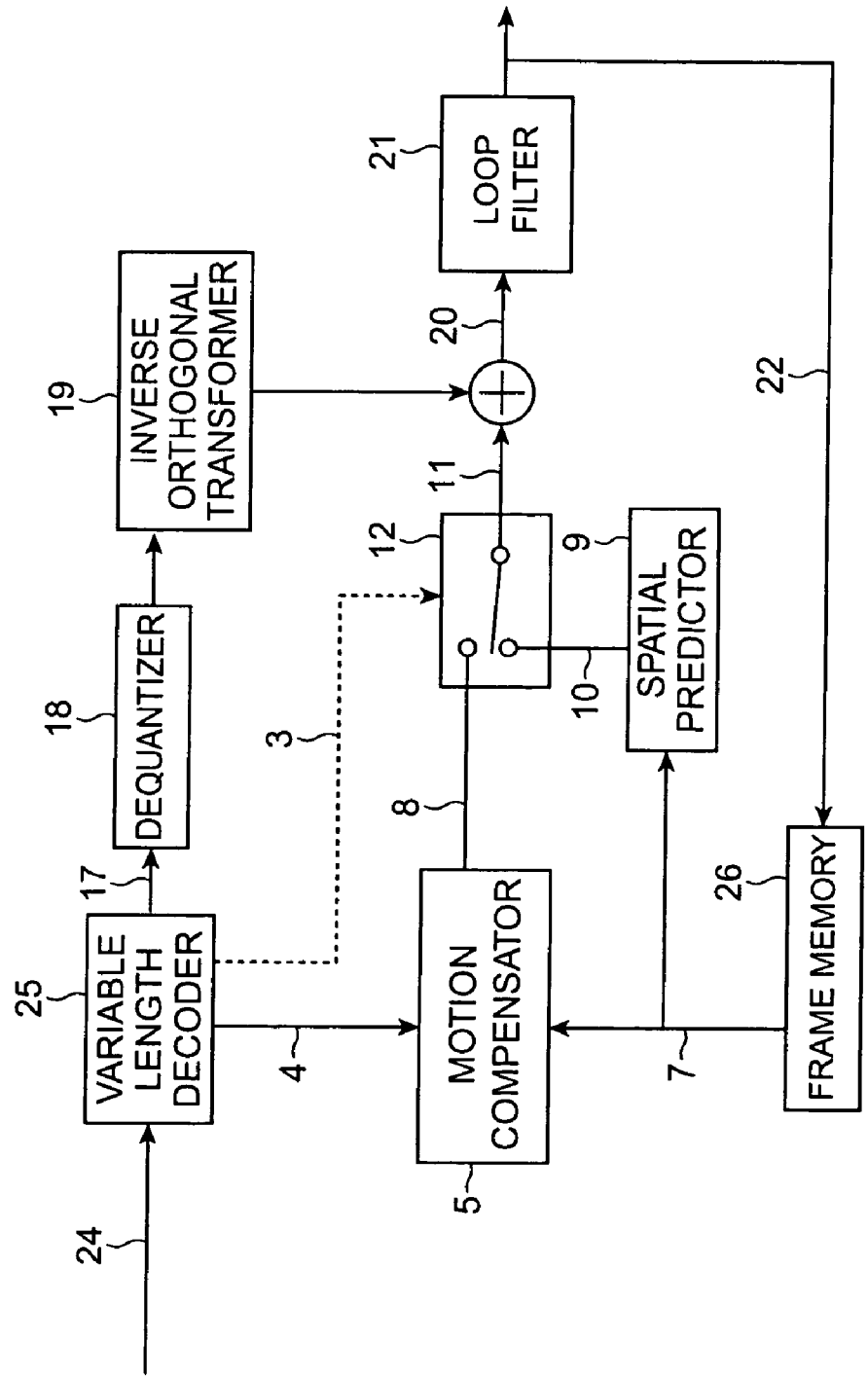
FIG. 2 is a configuration diagram of a decoding apparatus.
Figure 43:
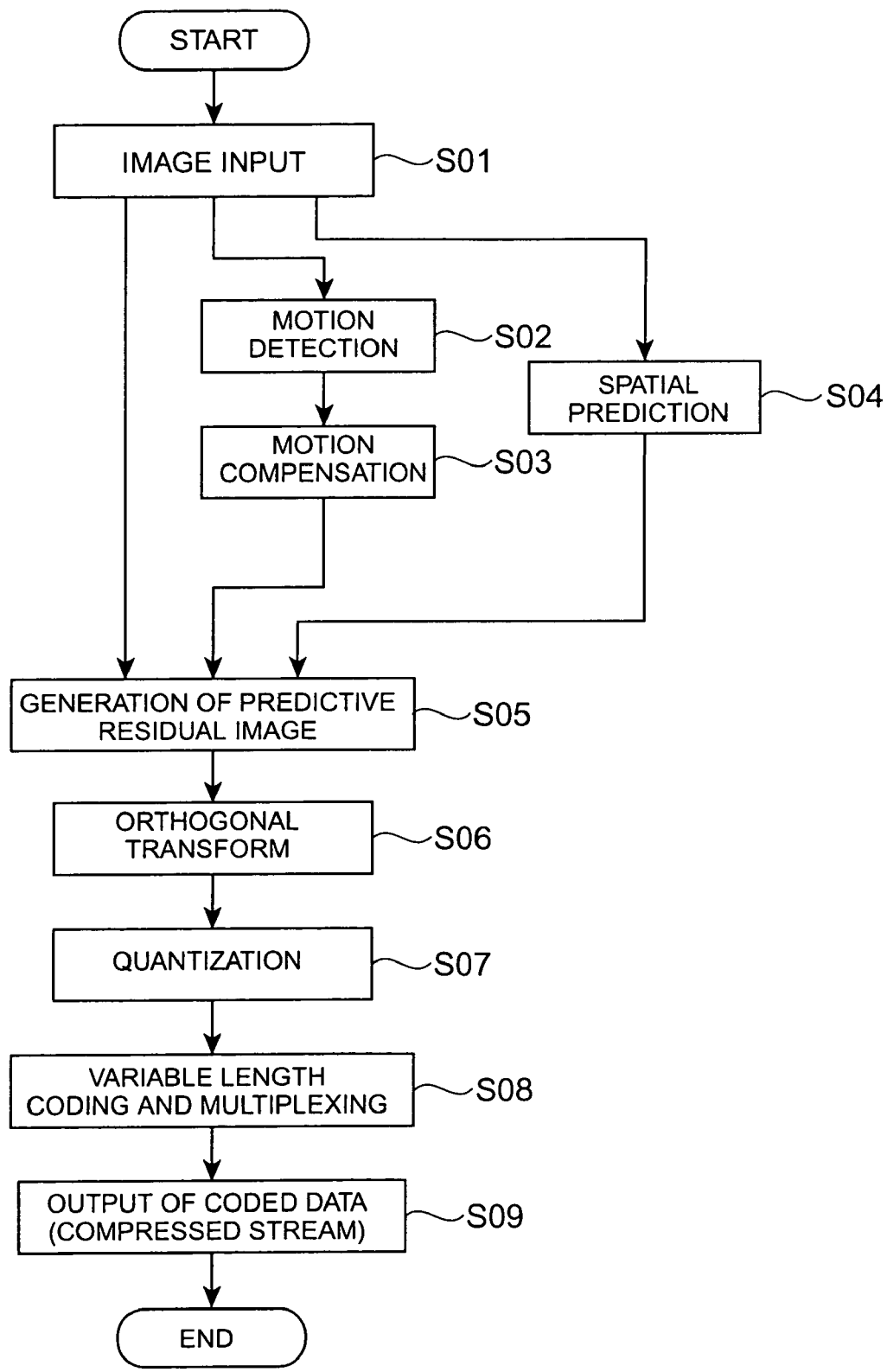
FIG. 43 is a flowchart showing the basic operation of the coding apparatus.

FIG. 1 shows the configuration of the coding apparatus and FIG. 2 the configuration of the decoding apparatus. In the coding apparatus of FIG. 1, information compression of video signal is implemented by reducing the redundancy present in the temporal direction by motion compensated inter prediction and further reducing the redundancy remaining in the spatial direction by orthogonal transform. FIGS. 3A and 3B provide illustrations to explain the motion compensated inter prediction and FIG. 4A to FIG. 4G the scheme of the block matching processing. FIG. 43 is a flowchart showing the basic operation of the coding apparatus and FIG. 44 a flowchart showing the basic operation of the decoding apparatus.

The operations of the coding and decoding apparatus shown in FIG. 1 and FIG. 2 will be described below with reference to these drawings.

An input video signal 1 in FIG. 1 is a time sequence of frame images, and in the description hereinafter it will represent a signal of a frame image unit. A frame image as a coding object is represented by a present frame 30B in FIG. 3B. The present frame 30B is divided into fixed square regions of 16 pixels×16 lines (called macroblocks), and the following coding processing is carried out in each unit of a square region.

Each macroblock of the present frame 30B is first fed to motion detector 2, which performs determination of prediction mode 3 and detection of motion vectors 4 the number of which corresponds to the prediction mode determined. In the H.26L coding method, the prediction modes 3 prepared include an intra prediction mode of performing spatial prediction using coded neighboring pixels on the same space and a plurality of inter prediction modes of performing motion compensated prediction using a temporally different coded frame image (e.g., a previous frame 30A in FIG. 3A), and the coding scheme is arranged to switch between these modes in macroblock units according to local properties of the video signal so as to be able to perform efficient information compression.

Namely, in the flowchart of FIG. 43, the input video signal 1 is fed into the coding apparatus (S01), motion detection (S02) and motion compensation (S03) are then carried out, and spatial prediction (S04) described hereinafter is carried out by the spatial predictor 9.

The motion compensated prediction is a technique of searching a decoded image of the previous frame 30A for a signal pattern (predicted value) similar to an input image of the present frame 30B within a predetermined search range 32, detecting a spatial displacement amount in the form of a motion vector (e.g., detecting a spatial displacement amount of wheel 31 as a motion vector 33), and transmitting a predictive residual signal and the motion vector as coding information, as shown in FIG. 3A and FIG. 3B. H.26L provides the seven types of inter prediction modes as shown in FIGS. 4A to 4G. More precisely, H.26L also provides a prediction mode of copying pixels (skip mode) at identical locations of the previous frame as they are, which is useful in the case of still images, but it will be omitted herein for convenience' sake of description. The motion vector is detected in a 16×16 pixel unit in Mode 1 of FIG. 4A, in each 8×16 pixel unit in Mode 2 of FIG. 4B, in each 16×8 pixel unit in Mode 3 of FIG. 4C, in each 8×8 pixel unit in Mode 4 of FIG. 4D, in each 4×8 pixel unit in Mode 5 of FIG. 4E, in each 8×4 pixel unit in Mode 6 of FIG. 4F, and in each 4×4 pixel unit in Mode 7 of FIG. 4G. These seven types of prediction modes enable segmentization of motion detection units inside the macroblock and are intended for accurately capturing various motions that can exist in the macroblock.

The motion detector 2 evaluates each macroblock as to all the inter prediction modes of FIGS. 4A to 4G and selects a mode judged as one to present the highest coding efficiency. The coding efficiency is also evaluated similarly as to the intra prediction mode, and the intra prediction mode is selected if it provides the higher efficiency than the inter prediction modes. When an inter prediction mode is selected, it results in detecting and transmitting a motion vector or motion vectors 4 by the number defined in the prediction mode 3 selected (up to sixteen motion vectors per macroblock). No motion vector 4 is transmitted when the intra prediction mode is chosen.

When an inter prediction mode is chosen, the determined prediction mode 3 and motion vectors 4 are sent to motion compensator 5, which extracts a motion compensated predictive image 8 of each macroblock with reference to a coded image signal 7 of a previous frame in frame memory 6 with use of the motion vectors 4.

When the intra prediction mode is chosen, the spatial predictor 9 generates a predicted value 10 with reference to the neighboring coded image signal 7. A finally used, predicted value 11 is selected out of the motion compensated predictive image 8 and the predicted value 10 on the basis of the prediction mode 3, at switch 12.

A predictive residual signal 13 is generated as a signal indicating a difference between the foregoing predicted value 11 and input video signal 1 (S05 in FIG. 43), and the predictive residual signal 13 is fed to orthogonal transformer 14 to be transformed into orthogonal transform coefficients 15 by orthogonal transform (S06). The orthogonal transform coefficients 15 are fed to quantizer 16 to be converted into quantized orthogonal transform coefficients 17 by quantization (S07), and the quantized orthogonal transform coefficients 17 are fed to variable length encoder 23. Entropy coding is carried out herein to multiplex coded data on a compressed stream 24 (S08).

Although omitted from FIG. 43, the quantized orthogonal transform coefficients 17 are locally decoded via dequantizer 18 and inverse orthogonal transformer 19 on the other hand and the resultant is added to the predicted value 11 to yield a locally decoded image 20. The locally decoded image 20 is fed to loop filter 21 for removing degradation of block distortion and others on the boundary of the orthogonal transform block, and the loop filter 21 filters the boundary pixels to obtain a filtered, locally decoded image 22, which is put into the frame memory 6. The image data stored in the frame memory 6 is used as reference data 7 for the motion compensated prediction of subsequent frames.

The prediction mode 3 is also subjected to the entropy coding in each macroblock unit in the variable length encoder 23 and the resultant is multiplexed on the compressed stream 24 (S08). The compressed stream 24 yielded in this way is outputted (S09).

Figure 44:
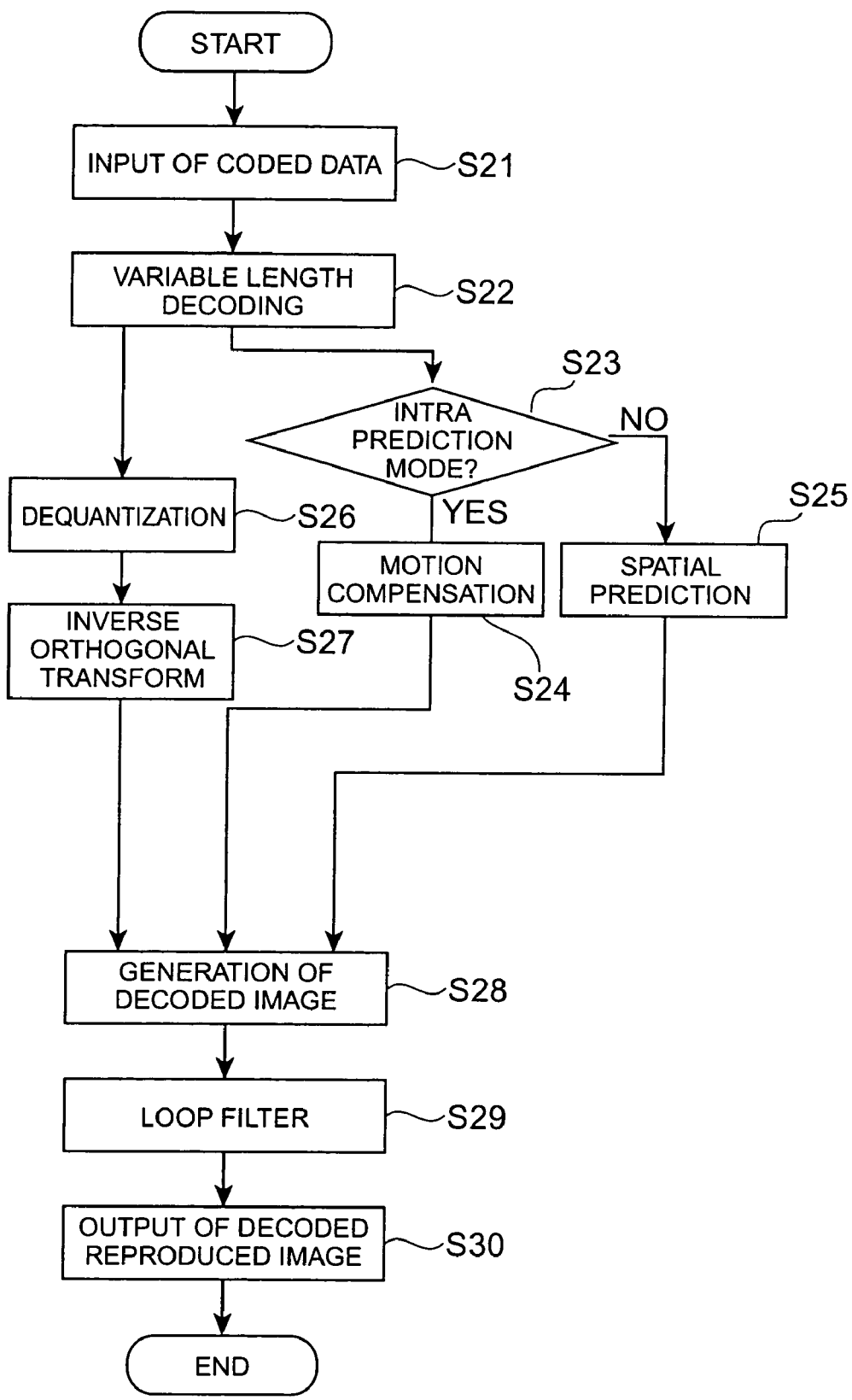
FIG. 44 is a flowchart showing the basic operation of the decoding apparatus.

The operation of the decoding apparatus will be described next on the basis of FIG. 2 and FIG. 44. In the decoding apparatus, the compressed stream 24 as coded data is first received (S21 in FIG. 44), variable length decoder 25 then detects a synchronization word indicating the head of each frame, and thereafter the prediction mode 3, motion vector(s) 4, and quantized orthogonal transform coefficients 17 are decoded in each macroblock unit (S22).

When the prediction mode 3 is an inter prediction mode (in the case of the affirmative judgment in S23), each motion vector 4 is fed to motion compensator 5 and the motion compensator 5 extracts an image portion having moved by the motion vector 4, as a motion compensated predictive image 8 from frame memory 26 (which is used in similar fashion to the frame memory 6) (S24), as in the case of the operation of the coding apparatus. On the other hand, when the prediction mode 3 is the intra prediction mode (in the case of the negative judgment in S23), the spatial predictor 9 generates the predicted value 10 with reference to the neighboring coded image signal 7 (S25).

In tandem with S23 to S25, dequantizer 18 dequantizes the predictive residual signal (S26) and inverse orthogonal transformer 19 performs inverse orthogonal transform (S27) in order, thereby generating a decoded value of the predictive residual signal.

On the other hand, a final predicted value 11 is determined according to the prediction mode 3 at switch 12, and it is added to the above decoded value of the predictive residual signal thus generated to yield a decoded image 20 (S28). It is further fed through loop filter 21 to obtain a final, decoded, reproduced image 22 (S29), and the reproduced image is outputted in predetermined display timing to a display device (S30) to reproduce the picture. The decoded, reproduced image 22 is also put into the frame memory 26 at the same time in order to be used in the motion compensation of subsequent frames. Here the image data 20, 22 takes the same values as the data of the same numbers in the coding apparatus.

The description will transfer to the detailed description of the present embodiment, and it is noted that the present embodiment is characterized by the definitions of the prediction modes 3 (particularly, the inter prediction modes) and motion vectors 4 included in the compressed stream 24 and the operations of the motion detector 2 and the motion compensator 5 in the aforementioned coding apparatus and decoding apparatus shown in FIG. 1 and FIG. 2. For this reason, the description hereinafter will be given with focus on the operation of the motion detector 2 and the definitions of the prediction modes 3 and motion vectors 4 about the coding apparatus and with focus on the procedure of decoding the video signal from the prediction modes 3 and motion vectors 4 about the decoding apparatus.

① Definitions of Fixed Motion Vector Assignment Patterns

The motion detector 2 evaluates each macroblock as to all the prediction modes prepared and detects a mode with the highest coding efficiency and a corresponding motion vector or motion vectors. In the H.26L coding method of the conventional example, the patterns shown in FIG. 4 are investigated as the inter prediction modes, whereas the present embodiment employs a configuration wherein the fixed division patterns shown in FIGS. 6A to 6D are prepared as inter prediction modes and a mode with the best coding efficiency is chosen among these, as a method of assigning up to two motion vectors in 4×4 block (sub-block) units. The reason why the patterns of FIGS. 6A to 6D are used as the fixed division patterns is that it is expected that these patterns are of the highest usage frequency as a division rule, for dividing the interior of the macroblock into two segments. For example, a pattern in which vectors are assigned to a central region and a peripheral region is a case including an extremely local motion within 16 pixels×16 lines, and such a case rarely occurs in images. On the other hand, the division patterns prepared in FIGS. 6A to 6D indicate patterns in which a typical motion in the horizontal, vertical, or oblique direction is continuous to the outside of the macroblock, and it is expected that they have high usage frequency. In FIGS. 6B to 6D among these, white regions and gray regions represent discrimination of motion vector assignment and permit the interior of the macroblock to be motion-divided in these patterns and to be subjected to the motion compensated prediction based thereon.

In Mode 0 of FIG. 6A, the macroblock (16×16 pixel) region is predicted by one motion vector. This is exactly the same definition as Mode 1 of the inter prediction modes in the H.26L coding method. In Modes 1 and 2 of FIG. 6B, the macroblock is divided into two regions of 16×8 pixels or 8×16 pixels, and these are also equivalent to Modes 2 and 3 in FIGS. 4B and 4C. On the other hand, Mode 3 and the subsequent modes of FIGS. 6C and 6D are mode definitions specific to the present embodiment, and Modes 3 to 6 of FIG. 6C permit uneven division of the macroblock in the horizontal and vertical directions. The uneven horizontal and vertical division is highly useful, particularly, at portions where a new image pattern gradually appears as at the screen edge. Furthermore, Mode 7 and the subsequent modes of FIG. 6D permit division of the interior of the macroblock in the oblique direction. The oblique division is highly useful in capturing discontinuity of motion along a boundary portion of an object or in predicting a new image pattern appearing from a screen corner. As described above, only two motion vectors are assigned in all the modes except for Mode 0 of FIG. 6A, and the preparation of the various motion division patterns enables motions in the macroblock that can not be captured by only even division like Modes 1 and 2 of FIG. 6B, to be accurately captured by the small number of motion vectors.

The grouping of Modes 0-14 of FIGS. 6A to 6D into four groups (group G1 of FIG. 6A, group G2 of FIG. 6B, group G3 of FIG. 6C, and group G4 of FIG. 6D) indicates the difference in the amount of codes in transmission of each prediction mode. Since the present embodiment has the number of modes being twice the number of the H.26L prediction mode information of FIGS. 4A to 4G, variable length coding by variable code length assignment is performed according to the number of divisions, the division direction, or the area ratio of divided regions in each mode, in order to implement efficient coding of the overhead. From the viewpoint of the number of divisions, the shortest code is first assigned to Mode 0 with the smallest number of motion vector and with the small overhead among all the modes. In general, video signals have very high temporal correlation, and thus the need for division of the interior of the macroblock according to motion is lower than in the case of the motion compensation (Motion Compensation: MC) in each macroblock unit. Concerning the bisected patterns, it is considered that the frequency of horizontal and vertical division patterns is higher than that of oblique division patterns, from the property of video signals. Furthermore, the code lengths of the even division are set shorter from the viewpoint that it is easy to reduce the average predictive residual power by MC in even block size and in units of the same area of the two segments. On the other hand, the uneven division is considered to suit uses where a new image pattern appears, particularly, at the screen edge and where a better prediction is made for an image pattern portion already existing in the frame. It is considered that the oblique division is suitable for uses where a motion that cannot be captured by only horizontal and vertical motions is captured on a contour of a moving object in an image and that the frequency of occurrence thereof is generally lower than those of the other modes.

However, this variable length coding method is nonunique, and, for performing the variable length coding of a prediction mode of a certain macroblock, it is also possible to employ a method of performing the code length assignment in consideration of situations (contexts) of prediction modes in the neighborhood thereof. For example, in the case of coding of a prediction mode of a certain macroblock, supposing the left macroblock is Mode 0 and the left upper macroblock is Mode 9, it can be contemplated that motion division inheriting the pattern of Mode 9 tends to appear in the present macroblock. Namely, it is conceivable in this case to employ such an ingenuity as to change a code table according to parameters of prediction mode situations (contexts) of neighboring macroblocks like the left, upper, and right upper macroblocks, e.g., as to shorten the code length of Mode 9. By defining versatile contexts independent of types of images, it becomes feasible to implement effective code assignment. At the same time, the finding of such contexts also offers the prospect of redundancy reducing effect based on employment of arithmetic coding instead of the fixed code assignment and based on the coding with switching between probability tables of the arithmetic coding dependent upon the contexts.

The variable length coding tables for the prediction mode coding may be switched one from another according to the contents of motion of image. For example, a frame including an image of extremely quick motion or a scene change is considered to have many irregular patterns such as the oblique division and the uneven division like Modes 3 to 14 in FIGS. 6C and 6D, while such prediction modes are considered to rarely occur in quiet images. Namely, it is conceivably natural that the rate of effective prediction modes should considerably vary in units of frames or sequences. In order to make a distinction, it can be contemplated, for example, that part of header information at the head of a frame or a frame group is multiplexed with flag information for determining a variable length coding table for the prediction mode coding used in that frame or for determining a context definition used therein. The distribution of prediction mode values is also considered to depend upon the coding compression rate, and it is thus possible to employ a configuration wherein a plurality of variable length coding tables of prediction mode values are prepared and are used as switched one from another according to the initial values of quantization parameters in each frame unit.

Since the prediction modes that can appear can be limited to some extent by setting the contexts of the prediction modes according to the local property of the video signal as described above, it is feasible to keep low the overhead resulting from the coding of the prediction mode information even in the case where much more prediction modes than those shown in FIGS. 6C and 6D are prepared. For example, it is possible to use a configuration in which the prediction mode variations of FIGS. 6C and 6D are added to the variations of FIGS. 4A to 4G. However, the variable length coding based on the contexts has the problem that if the compressed data of the neighboring regions is not correctly decoded because of transmission errors or the like, the present prediction mode information cannot be independently correctly decoded. In order to avoid this problem, it is possible, for example, to employ a configuration wherein the interior of the frame image is divided into units of finer independent coding image regions (slices) as used in the MPEG-2 video coding scheme and use of a context across slices is avoided at boundaries of the slices. This method slightly lowers the coding efficiency at the boundaries of the slices, but can improve the resistance to errors, as a trade-off thereof.

Furthermore, a number of prediction mode information may be arranged so as to switch according to coding conditions. In the case of the conventional prediction coding methods based on motion compensation as in the older standard coding schemes (MPEG-1, MPEG-2, etc.) than H.26L described in the conventional example, each macroblock was assigned one motion vector and the amount of codes was adjusted by the accuracy of DCT coefficients being the result of residual coding. The recent coding schemes (H.263 and MPEG-4) were, however, provided with the prediction modes in which the interior of one macroblock was divided into multiple blocks, and the amount of codes has been adjusted by a balance of the amount of codes for prediction to the DCT coefficients. In the H.26L scheme thereafter, more prediction modes were prepared, and there is an increasing tendency that the code amount is adjusted by the accuracy of motion compensation according to the number of motion vectors used. In H.26L, the code amount is adjusted by elaboration of motion compensation with use of the modes permitting utilization of the greater number of motion vectors out of the modes of FIGS. 4A to 4G, in the high rate range. In the low rate range, however, since the adjustment of the code amount is achieved by the number of motion vectors, there will conceivably arise a problem that the modes to be selected out of the modes of FIGS. 4A to 4G are limited to one or two (Modes 1 to 3) per macroblock in most cases and increase of the coding efficiency cannot be expected by the elaboration of motion compensation.

From the viewpoint of optimization of code amount to error (Rate-Distortion), optimal motion compensation models should differ depending upon given coding speeds (code rates). Namely, a motion compensation model used at low rates should be different from that used at high rates. It is thus necessary to adopt an approach of elaborating the motion compensation in a sense of conservation of waveform by many modes and many motion vectors at high coding rates and performing the motion compensation with better efficiency by the limited number of motion vectors at low coding rates. This approach of switching between the motion compensation models according to the rates has never been adopted in the coding standards heretofore.

Now, let us consider a motion compensation model in which a single motion is present in one macroblock or in which no single motion is present but a boundary between objects of different motions is present (i.e., the number of motion vectors per macroblock is limited to 2), as shown in FIGS. 6A to 6D, at low rates. As cases in which the number of motion vectors per macroblock is limited to 2, the division of the macroblock into two segments is expanded from the simple horizontal and vertical division to horizontal, vertical, oblique, and phase-added division, thereby preparing for the cases wherein a border between objects of different motions exists in one macroblock. On the other hand, the motion compensation model to permit the greater number of motion vectors as shown in FIGS. 4A to 4G is also permitted at high rates. Namely, a useful scheme is one that permits switching between such motion compensation models according to video coding conditions. For example, identification information for dynamic change of the motion compensation model used (i.e., the definition of the set of prediction modes) is arranged to be multiplexed on part of the header information at the head of a frame or a frame group, in each unit thereof (for example, it is equivalent to a sequence or a GOP in the MPEG-2 video coding system, or a video object layer, a video object plane, or the like in the MPEG-4 video coding system).

Figure 32A:
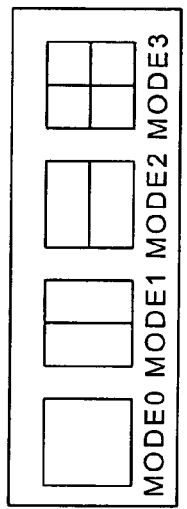
FIG. 32A is a diagram showing a definition example of a prediction mode set using the minimum number of prediction modes.
Figure 32B:
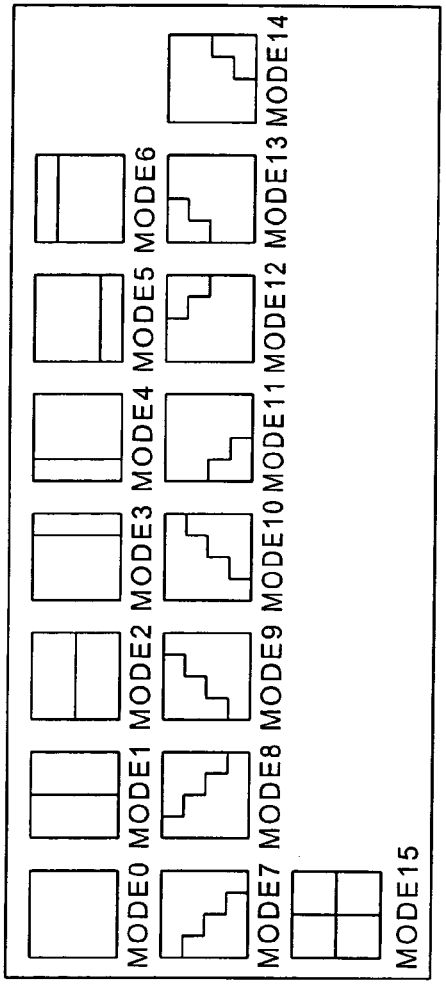
FIG. 32B is a diagram showing a definition example of a prediction mode set using the smaller number of motion vectors presented in the first embodiment.
Figure 32C:
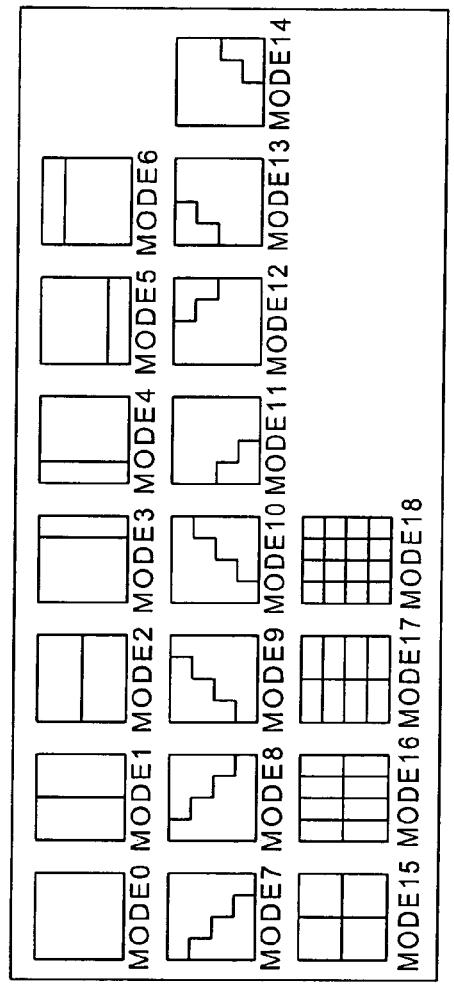
FIG. 32C is a diagram showing a definition example of a prediction mode set using many divisions and many motion vectors.

Such change of the motion compensation model can improve convenience in implementation as a scalable configuration and in use of coded data. For example, let us define three sets of prediction modes as shown in FIGS. 32A to 32C. In FIG. 32A minimal prediction modes are used, and in FIG. 32B the prediction modes using the small number of motion vectors, presented in the present embodiment, are used in addition thereto. In FIG. 32C, the set further includes the prediction modes using many divisions and many motion vectors.

By defining such sets, it is feasible to switch between the motion compensation models according to coding conditions in the following manner: the prediction mode set of FIG. 32A is used where the top priority is given to reduction of calculated amount load; the prediction mode set of FIG. 32C is used where the pursuit of more elaborate motion compensation with many modes and many motion vectors is required at high coding rates; the prediction mode set of FIG. 32B is used where there are no such special requirements. In the architecture of FIGS. 32A to 32C, each set of prediction modes is a sub-set of a set including the greater number of prediction modes. For example, the prediction mode set of FIG. 32B is a sub-set of the set of FIG. 32C. Accordingly, coded data encoded based on each prediction mode set can be made decodable in implementation based on a higher set.

It can also contemplated that such change of the motion compensation model is defined as a profile in the video coding system and motion compensation models available to respective uses are prescribed based thereon. The profile is a scheme of striking a balance between implementation-calculated amount load and coding efficiency by defining sub-sets of coding functions essential to respective uses, in a coding system in which a number of coding functions are prescribed. Each of the sets of prediction modes shown in FIGS. 32A to 32C can be handled as a prediction mode set utilized in an individual profile and a scalable profile structure can be made in such a manner each profile is defined as a sub-set of a higher profile.

At this time, it is convenient in terms of implementation of an encoder and decoder to handle the units of change of motion compensation model and residual coding independently of each other. In the H.26L case, the residual coding is carried out in 4×4 pixel units, and thus the division models of macroblocks also consist of 4×4 pixel unit blocks. This permits the change of motion compensation model to be handled as reassignment of attribution of residual coding blocks to respective motion vectors, so as to achieve significant effect in terms of implementation efficiency.

② Predictive Coding of Motion Vector Information

In general, the overhead ratio of the motion vector information becomes higher at low bit rates, and it is thus necessary to efficiently encode the detected motion vector information. Normally, motions are quite unlikely to become random in magnitude and direction in units of macroblocks, and in that sense, motion vectors usually take close values to those in neighboring macroblocks. From this point of view, a predicted value of a motion vector is determined from neighboring motion vectors and its predictive residual data is coded. The motion vector coding method in the present embodiment will be described below.

The H.26L coding system is provided with a scheme of storing a plurality of past coded frame images as reference images in the frame memory 6 and performing the motion compensated prediction based on one of those designated. This allows us to expect effective prediction, particularly, in the case of images in which a moving region is present in front of the still background and in which the background appears and disappears depending upon the motion of the moving region. The present embodiment can also make use of this scheme in the motion detector 2 and can be configured in such a manner that, where two motion vectors are present in a macroblock, the reference frames thereof can be changed individually.

Although the interior of the macroblock was motion-divided in the inter prediction modes of the H.26L video coding system, the motion vectors had to be obtained from the same reference frame because of the great number of motion vectors. In contrast, the present embodiment permits assignment of reference frame switchover information to each motion vector by the decrease of the overhead without using the large number of motion vectors, thereby further increasing the efficiency of motion compensated prediction. In this case, the reference frame switchover information often takes values similar to those in the same macroblock or in adjacent macroblocks or sub-blocks. The amount of codes necessary for the reference frame switchover information can be reduced by utilizing that fact to estimate the switchover information or encode it all together.

It is a matter of course that the reference frame switchover information itself has to be transmitted as additional information and, in the case of a simple image without need for such switchover, the system may be arranged so as to be able to select a rule of using the same reference frame in each macroblock. In this case, it is conceivable, for example, to multiplex flag information for identifying whether the reference frame change in the macroblock is permitted, in each frame or frame group unit. This allows the decoding apparatus to operate so as to decode only one reference frame switchover information per macroblock, where the reference frame is unchanged within each macroblock.

On the other hand, in the case where the change of reference frame is permitted in units of motion detection, there arises a problem that if different reference frames are used between adjacent motion detection units the correlation becomes lower between their motion vectors. Namely, the accuracy of prediction of motion vectors becomes degraded in that case.

Figure 7B:
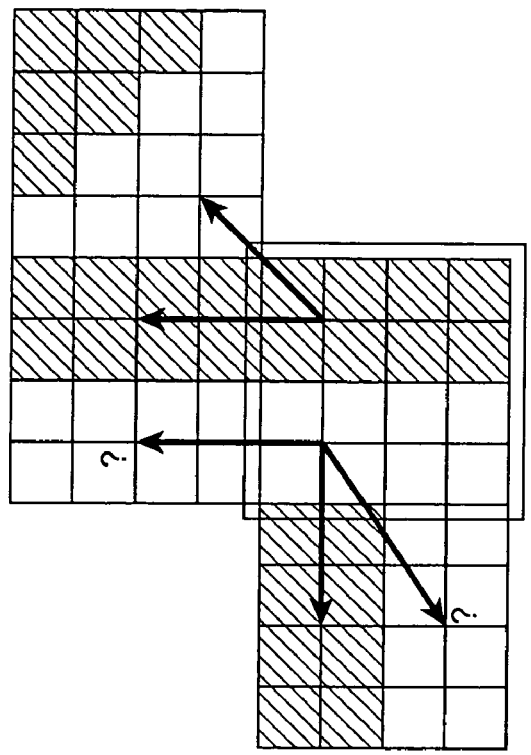
FIG. 7B is a diagram showing a case where the upper macroblock uses a reference frame different from that of the present macroblock.
Figure 7A:
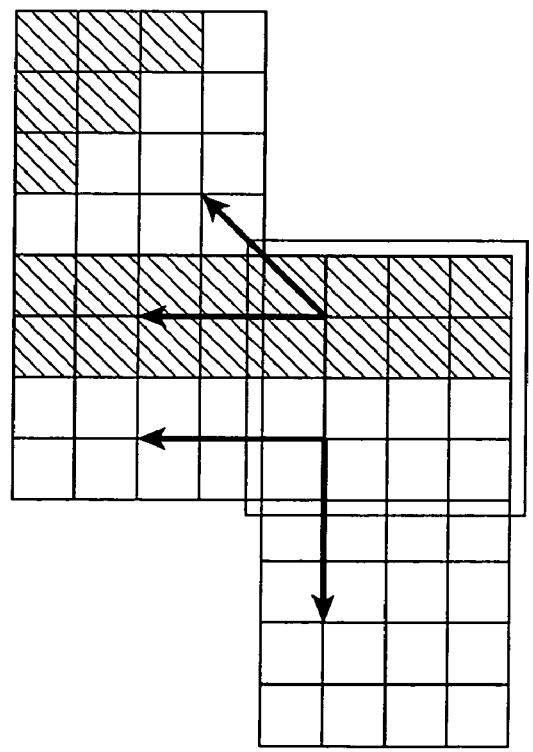
FIG. 7A is a diagram showing a case where a present macroblock is Mode 1 and the left, upper, and right upper macroblocks thereof are Modes 0, 1, and 8, respectively.

For example, FIG. 7A shows a case in which the present macroblock is Mode 1 and the left, upper, and right upper macroblocks are Modes 0, 1, and 8, respectively. In this case, it is anticipated from the contexts of the neighboring prediction modes, i.e., the continuity of motion division that the motion vector of the left segment will have high correlation with the both left and upper macroblocks and that the motion vector of the right segment will have high correlation with the both upper and right upper macroblocks, as indicated by arrows in the same figure. Namely, it is considered that if the same reference frame is referred to by the present, left, upper, and right upper macroblocks in FIG. 7A, the prediction can be achieved with accuracy by use of any predicted value. However, for example, in the case where the two motion vectors of the upper macroblock use the reference frame different from that for the motion vectors of the present macroblock and where the left macroblock refers to the same reference frame as that of the present macroblock, it is expected that the motion vector of the left macroblock should ensure higher prediction accuracy.

On the other hand, in FIG. 7B, supposing that the upper macroblock uses the reference frame different from that of the present macroblock, there is no continuity of motion from the upper macroblock and it cannot be settled whether either of the motion vectors of the left macroblock should be used for the prediction, from the context. Therefore, continuity of motion cannot be expected and thus high prediction accuracy can no longer be expected.

In order to solve this problem, the present embodiment adopts a method of assigning priorities to respective prediction candidates on the basis of the contexts of neighboring prediction modes and adaptively determining the motion vector predicted values. Since the neighboring prediction mode information and reference frame switchover information itself uses the already decoded information, there is no need for providing special additional information for this motion vector predicted value determining process. The flow of specific motion vector predicted value determining processing will be described below.

Figure 8C:
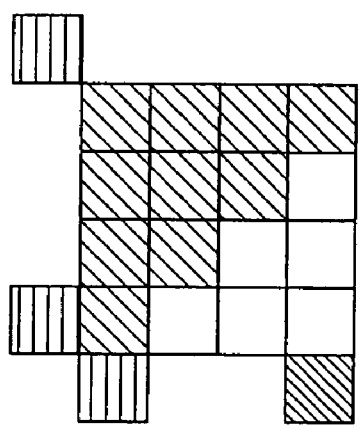
FIG. 8C is a diagram for explaining the flow of motion vector predicted value determining processing in a case of Mode 7.
Figure 8B:
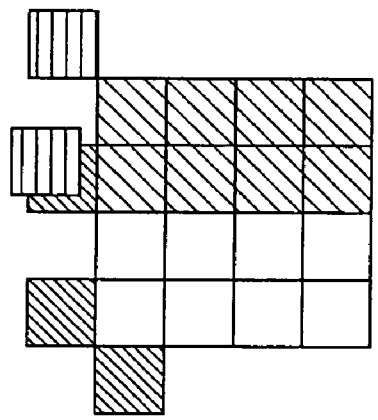
FIG. 8B is a diagram for explaining the flow of motion vector predicted value determining processing in a case of Mode 1.
Figure 8A:
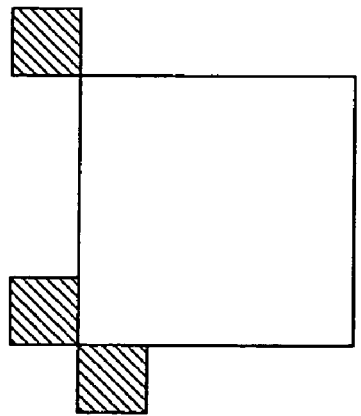
FIG. 8A is a diagram for explaining the flow of motion vector predicted value determining processing in a case of Mode 0.

1) For each segment, neighboring motion vectors as candidates for predicted value are determined. FIG. 8A to FIG. 8C show examples of Modes 0, 1, and 7. In Mode 0 of FIG. 8A there is only one motion vector and thus the motion vectors at the block locations shaded by hatching are selected as candidates. In Mode 1 of FIG. 8B there exist motion vectors for a white region and a gray region (a region hatched in the macroblock of FIG. 8B), respectively, and thus candidates for the predicted value are settled so that the motion vectors at the locations of the blocks shaded by hatching are used for the motion vector of the white region and so that the motion vectors at the locations of the blocks shaded by horizontal stripes are used for the motion vector of the gray region. In FIG. 8B of this Mode 1, a shaded block of hatching overlaps a shaded block of horizontal stripes in the central region above the macroblock. In Mode 7 of FIG. 8C, a white region has little continuity of motion from the upper region and thus only the motion vector at the location of the left shaded block of hatching is selected as a candidate for the predicted value.

For the gray region, the motion vectors at the locations of the shaded blocks of horizontal stripes are selected as candidates for the predicted value. These prediction candidate locations are preliminarily determined for each of the modes and are shared between the coding apparatus and the decoding apparatus.

2) Macroblocks with predicted values using the same reference frame are specified out of the macroblocks including the predicted value candidates. Determination on whether the neighboring macroblocks use the same reference frame can be implemented by retaining the already decoded information of the neighboring macroblocks.

3) Among the macroblocks specified in 2), the macroblock and the motion vector with the highest prediction usage priority are specified based on the prediction mode information, and the motion vector is adopted as a predicted value. The prediction usage priorities are fixedly defined for each of the prediction modes in consideration of the continuity of motion from the neighboring blocks, as shown in FIG. 9, and are shared between the coding apparatus and the decoding apparatus. In FIG. 9, for example, in the case of Mode 5 as an example, where the prediction mode of the macroblock as a present object for prediction of motion vector is Mode 5, the priorities about the continuity of motion for the macroblock above it are defined in the order of 0, 6, 2, 8, 9, 12, and 13 of the mode values named from the highest. The priorities for the left macroblock are also defined in the order of 5, 0, 2, 8, and 12 of the mode values named from the highest. The priorities are also similarly defined for the right upper macroblock. For example, if the upper and left macroblocks have the same priority rank, either one of them will be assertively determined as a predicted value. Namely, in this example, where the prediction mode of the macroblock itself is Mode 5 and where the motion vector of the gray region is predicted, supposing that the motion vectors at the locations of the upper and left prediction candidates use the same reference frame, that the right upper macroblock uses a different reference frame, and that Mode 13 appears in the upper macroblock and Mode 5 in the left macroblock, the motion vector of the left block is selected as the predicted value with the highest priority.

4) If there is only one prediction candidate location as in the case of the white region of Mode 7 in FIG. 8C and if it uses the same reference frame, the motion vector therein is used as a predicted value as it is. If it uses a different reference frame the predicted value is determined using a plurality of predicted value candidates at predetermined locations (for example, using median prediction).

5) If continuity of motion cannot be expected from any neighboring macroblock, in spite of the presence of a plurality of predicted value candidate locations (i.e., in the case of the prediction modes being not included in the priority order of FIG. 9), the predicted value is determined using all the predicted value candidates (e.g., median prediction).

6) If all the motion vectors of the predicted value candidates use reference frames different from that of the motion vector to be predicted, the predicted value is determined using all the predicted value candidates (e.g., median prediction).

The coding of the motion vectors is implemented by variable length coding of predictive residual data using the predicted values obtained as a consequence of the above processing.

The predicted values of motion vectors may also be fixedly given as shown in FIGS. 10A to 10D. In these figures, white arrows indicate directions of prediction for the motion vectors of the white regions, and black arrows directions of prediction for the motion vectors of the black regions. In the case of Mode 4 of FIG. 10C as an example, for the prediction of the motion vector of the white region in Mode 4, the predicted value is determined using the motion vector of the sub-block located to the left of the third sub-block from the top in the white region. This rule fails to give sufficient consideration to the continuity of motion from the neighborhood, but has the merit of relieving instrumental implementation associated with the motion vector prediction processing because of the fixed assignment of the prediction locations. In FIGS. 10A to 10D, if a block intended to be used for the predicted value uses a different reference frame, it is desirable to switch to the technique of median prediction or the like, assuming that the continuity of motion is lost.

③ Compressed Stream Syntax

The syntax of macroblock data of the compressed stream 24 outputted from the coding apparatus of the present embodiment is presented in FIG. 11B in comparison with the H.26L current syntax of FIG. 11A.

The RUN information (RUN) in these figures is coded data to indicate the number of macroblocks judged as the aforementioned skip mode; supposing that the blocks from the nth macroblock to the (n+5)th macroblock are a skip and the (n+6)th macroblock is not a skip, coded data of run information=5 is given to the head of the (n+6)th macroblock data. The macroblock type information (MB_Type) indicates the prediction mode 3 in FIG. 1.

The seven types shown in FIGS. 4A to 4G are discriminated herein as inter prediction modes. The intra prediction mode information (Intra_pred_mode) in FIG. 11A is information used for discriminating a plurality of spatial prediction methods from each other in the intra prediction mode, and is omitted if the inter prediction mode is chosen (arrow P1 in FIG. 11A). The reference frame information (Ref_frame) is data to designate a number of a reference frame indicated by the motion vector when the inter prediction mode is chosen, and is omitted when only one immediately preceding frame is used as a reference frame (arrow P2). The motion vector difference (MVD) is a difference of the motion vector from the predicted value and the horizontal and vertical components thereof are multiplexed in the order named. Since the maximum number of motion vectors is sixteen in H.26L as shown in FIG. 4G, data of up to sixteen motion vector differences is multiplexed (i.e., arrow Q1 represents up to sixteen loops). The number of motion vector differences is determined by the macroblock type information. It is omitted when the intra prediction mode is chosen (arrow P3). Subsequent to the above data, the orthogonal transform coefficient data (Texture Coding Syntax) of the predictive residual signal is multiplexed.

On the other hand, in the syntax of the present embodiment shown in FIG. 11B, the macroblock type information is used to identify the fourteen types of inter prediction modes shown in FIGS. 6A to 6D (while the intra prediction mode is assumed to be the same as in H.26L). Since one reference frame information is made correspondent to one motion vector, the reference frame information and the motion vector difference are always multiplexed as a set. The number of sets of reference frame information and motion vector difference is determined by the macroblock type information. The maximum number is 2 (i.e., arrow Q2 in FIG. 11B indicates up to two loops). When the inter prediction mode is chosen, the intra prediction mode information is omitted as indicated by arrow P4, and when the intra prediction mode is chosen, the reference frame information and motion vector difference are omitted as indicated by arrow P5.

Since the reference frame information often takes values similar to those of the reference frame information in the same macroblock or in neighboring macroblocks or sub-blocks, coding may be implemented by making use of it. For example, by assigning one code to a combination of two reference frame information values in the same macroblock and making codes on the basis of probabilities of occurrence of combination patterns, it is feasible to reduce the amount of codes for frequently appearing combinations.

FIG. 33A shows a code configuration of the reference frame information in H.26L, and FIG. 33B shows an example of codes assigned to combinations of reference frame information. For example, if the reference frame information is often 0 in the both blocks within the same macroblock, the code configuration of FIG. 33A requires two bits for the two reference frame information values, whereas the code configuration of FIG. 33B requires only one bit for coding of the reference frame information, so as to be able to reduce the amount of codes. In this case, different from the syntax of FIG. 11B, only one code about the reference frame information is multiplexed per macroblock without being paired with the motion vector difference, as shown in FIG. 33C. Arrows P26, P27 in FIG. 33C indicate jumping with omission of corresponding processing, and arrow Q11 indicates up to two loops.

It is also possible to perform the prediction based on the reference frame information in adjacent macroblocks or sub-blocks and switch the codes. For example, just as in the case of the aforementioned prediction of motion vector, the prediction locations may be fixedly assigned as in FIGS. 10A to 10D and the reference frame information associated with the prediction locations is used as predicted values. Since there are also cases with no reference frame information associated, as in the case where no fixed prediction location is assigned as in Mode 0, in the case where the intra prediction mode is adopted at the prediction location, etc., a default predicted value is used in such cases. Codes are arranged based on probabilities of occurrence of reference frame information values in acquisition of the predicted value, and codes are switched according to the predicted value.

For example, let us suppose that the codes of FIG. 34A are used as codes before change or when the predicted value is 0, and that the codes configured as shown in FIG. 34B are used as codes when the predicted value is 4 as an example. In the case where the reference frame information often takes the same value as the predicted value and where if the predicted value is 4, the probability of the reference frame information becoming 4 is higher than the probability of the reference frame information becoming 2, the code amount of the reference frame information can be reduced by using the codes of FIG. 34B, instead of using the codes of FIG. 34A as they are. In this case, the reference frame information is always multiplexed as a set with the motion vector difference in the same manner as in FIG. 11B.

Although not illustrated, the orthogonal transform coefficient data contains significant coefficient presence identification information (CBP: abbreviation of Coded Block Pattern) indicating whether data to be coded exists in 8×8 block units in the macroblock, and use of this data permits omission of transmission of the entire information in each 8×8 block without any significant coefficient, thereby achieving efficient coding of orthogonal transform coefficient data. FIGS. 35A to 35C show examples thereof. Let us suppose that a macroblock is divided and coded as shown in FIG. 35A and that each sub-block (4×4 block) indicated as a white block has no significant coefficient. In this case, the presence or absence of significant coefficient is coded and transmitted in units of 8×8 blocks, as shown in FIG. 35B, to preliminarily indicate the presence or absence of orthogonal transform coefficient data in each 4×4 block included in 8×8 blocks, whereby the code amount can be reduced by omission of transmission of information in each 4×4 block.

With use of the prediction modes in the present embodiment, in cases where a pattern using two motion vectors is chosen, it is expected that the coefficient data to be coded is reduced for the predictive residual signal located at the division boundary, because of the increase of the prediction efficiency by the division. Particularly, in the case of the uneven division and oblique division in and after Mode 3, a division boundary can exist inside an 8×8 block, and it is considered that this portion has a high probability that there exists no coefficient data to be coded. Therefore, depending upon the circumstances, it is possible to employ a configuration to change variable length coding tables of significant coefficient presence identification information or probability tables of arithmetic coding according to the prediction modes. This enables implementation of efficient coding of significant coefficient presence identification information according to the prediction modes.

With use of the prediction modes according to the present embodiment, it is also conceivable that a macroblock is divided into a portion without change and a portion with great change and the presence or absence of significant coefficient data becomes constant in each segmental region. In this case, if the significant coefficient presence identification information is configured and coded so as to indicate the presence or absence of significant coefficient data in each segmental region, instead of designating the presence or absence of significant coefficient data in each 8×8 block as used in H.26L, the code amount necessary for the significant coefficient presence identification information can also be reduced. FIG. 35C shows an example of that case. When the presence or absence of significant coefficient data is transmitted in 8×8 block units as shown in FIG. 35B, the number of patterns thereof becomes large; whereas, in the case where the presence or absence of significant coefficient data is sent in units of the segmental regions as shown in FIG. 35C, the number of patterns can be made smaller whereby the code amount necessary for the significant coefficient presence identification information can be reduced.

Figure 12:
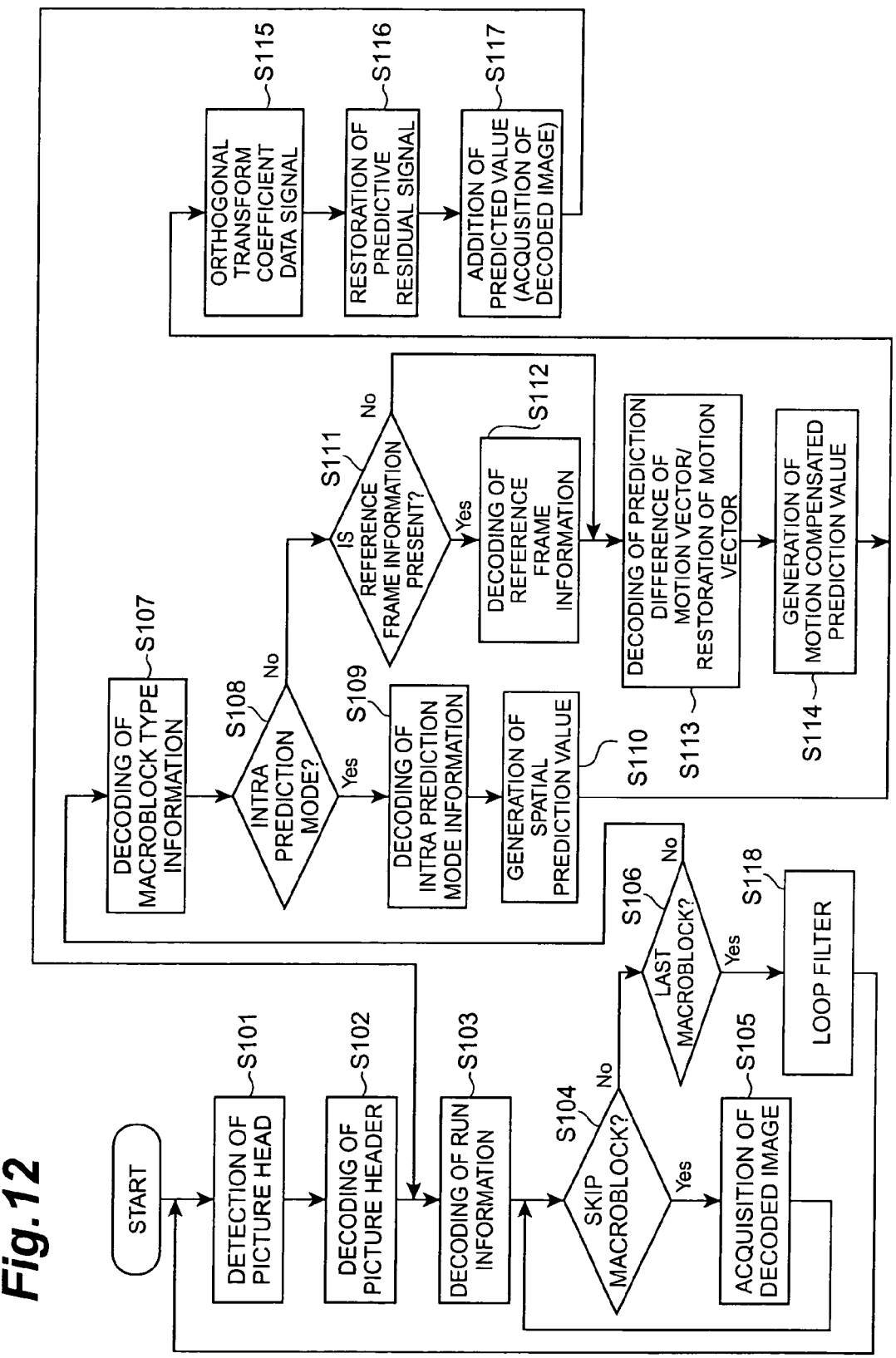
FIG. 12 is a flowchart showing the processing contents of the decoding apparatus in the first embodiment.

The decoding processing procedure in the decoding apparatus will be described below. FIG. 12 shows the processing flow of the decoding apparatus.

The variable length decoder 25 first detects the synchronization word indicating the head of a picture (i.e., decoded data of each frame of an image) (S101) to decode the picture header (S102). The picture header contains the picture type information to identify whether the picture is an intra coded picture (which is a picture all macroblocks of which are coded by intra prediction and which will be called an I picture) or a picture using inter prediction (which will be called a P picture), and values including the quantization parameters of orthogonal transform coefficient data and others. Subsequently, the flow proceeds to decoding of individual macroblock data formed in the syntax of FIG. 11B. The run information is first decoded in the macroblock layer (S103). The definition of data of the run information is as described previously, and skip macroblocks occur by the number of the run information. For each of the skip macroblocks, data of the 16×16 pixel region at the same location on the predetermined reference frame stored in the frame memory 26 is acquired as decoded image data as it is (S104 and S105). The process of acquiring the decoded image is conducted by giving the motion vector of zero and the predetermined reference frame number to the motion compensator 5. When the run information indicates the last macroblock of the picture (S106), the variable length decoding of that picture is terminated at that point, the loop filter 21 performs the block distortion removing process (S118), and then the flow transfers to the variable length decoding processing of the next picture.

With an ordinary coded macroblock, the flow proceeds to step S107 to decode the macroblock type information. This settles the prediction mode 3. If the prediction mode 3 is the intra prediction mode (in the case of the affirmative judgment in S108), the intra prediction mode information is decoded (S109). Precisely, H.26L involves two types of intra prediction modes: an intra 4×4 mode of performing the intra prediction in sub-block (4×4 block) units and an intra 16×16 mode of performing the intra prediction in 16×16 pixel units, among which only the intra 4×4 mode requires the intra prediction mode information. However, it departs from the spirit of the invention and thus detailed description of the difference between these processes is omitted from the description of the present embodiment. After the intra prediction mode information is settled, the spatial predictor 9 generates intra prediction values from neighboring image data (S110).

On the other hand, if the prediction mode 3 is an inter prediction mode (in the case of the negative judgment in S108), it must be a value indicating one of the modes shown in FIGS. 6. Accordingly, how many sets of reference frame information and motion vector difference should be decoded is settled at this point (i.e., one set in Mode 0 and two sets in the other modes). Each set of reference frame information and motion vector difference is decoded according to this information. However, since whether the reference frame information is multiplexed is integrated into the aforementioned picture type information, it is necessary to make a decision on whether the reference frame information is present, based on the value of the picture type (S111).

Although not illustrated in the figure, where the reference frame information was coded by making use of the values of reference frame information in the same macroblock or in adjacent macroblocks or sub-blocks as described previously, the reference frame information is decoded on the basis of the combinational information of the reference frame information according to those, or after switchover of codes according to the predicted value.

With the reference frame information, the value thereof is first decoded and then the motion vector difference is decoded (S112 and S113); without the reference frame information, only the motion vector difference is decoded (S113). The predicted value of each motion vector is determined based on the reference frame information, motion vector difference, prediction mode indicated by the macroblock type information, and neighboring prediction mode information, and based on the same predicted value candidate locations and prediction usage priorities as in the coding apparatus, shown in FIGS. 8A to 8C and FIG. 9, to decode each motion vector information corresponding to every sub-block in the macroblock. This motion vector information 4 is fed to the motion compensator 5, and the motion compensator 5 generates a motion compensated prediction value for every individual sub-block, based on the designated reference frame information and motion vector (S114).

After completion of the above processing, the variable length decoder 25 decodes the orthogonal transform coefficient data 17 of the predictive residual signal of the macroblock (S115), and the dequantizer 18 and inverse orthogonal transformer 19 decode the predictive residual signal (S116). Finally, the predicted value obtained in S110 or S114 is added thereto to acquire a decoded image of the macroblock (S117). Thereafter, the flow transfers to the decoding processing of the next macroblock.

The coding apparatus and decoding apparatus described above made it feasible to accurately capture various motions in the macroblock, within a small overhead and to implement efficient video transmission, recording, and playback. Since in the present embodiment the interior of the macroblock is motion-divided in various shapes to increase the prediction efficiency and each region as a motion compensated prediction target is comprised of a combination of sub-blocks, no division boundary of prediction exists inside the sub-blocks on the occasion of performing the predictive residual signal coding in sub-block units as in the H.26L video coding system, thus presenting the advantage of producing no discontinuous wave. This presents the advantage that in application of DCT to the predictive residual signal coding, occurrence of excess high-frequency coefficients can be avoided, and in application of vector quantization, efficient coding can also be implemented in that peculiar signal waveforms are reduced, so as to allow expression with only general-purpose waveforms specified by a code book.

The second embodiment will be described below. The present embodiment will describe the video coding apparatus configured to perform coding in macroblock units, particularly, the video coding apparatus and decoding apparatus configured to use up to two motion vectors per macroblock and to perform the motion compensated prediction while assigning the two motion vectors, in units of sub-blocks obtained by dividing a macroblock into 4×4 pixel units. The first embodiment described that the motion vectors were assigned in units of sub-blocks according to the fixed patterns, whereas the present embodiment will describe the coding apparatus and decoding apparatus configured to permit arbitrary designation of motion vector assignment to each sub-block.

The present embodiment can be described with the same members and operations except for differences in the definitions of the prediction mode 3 (particularly, the inter prediction modes) and the motion vector 4 in the compressed stream 24, and the operations of the motion detector 2 and motion compensator 5, as in the coding apparatus and decoding apparatus shown in FIG. 1 and FIG. 2 in the conventional example. The description below will be given with focus on the operation of the motion detector 2 and the definitions of the prediction mode 3 and motion vector 4 about the coding apparatus and with focus on the procedure of decoding the video signal from the prediction mode 3 and motion vector 4 about the decoding apparatus.

Figures 13A, 13B, 13C:
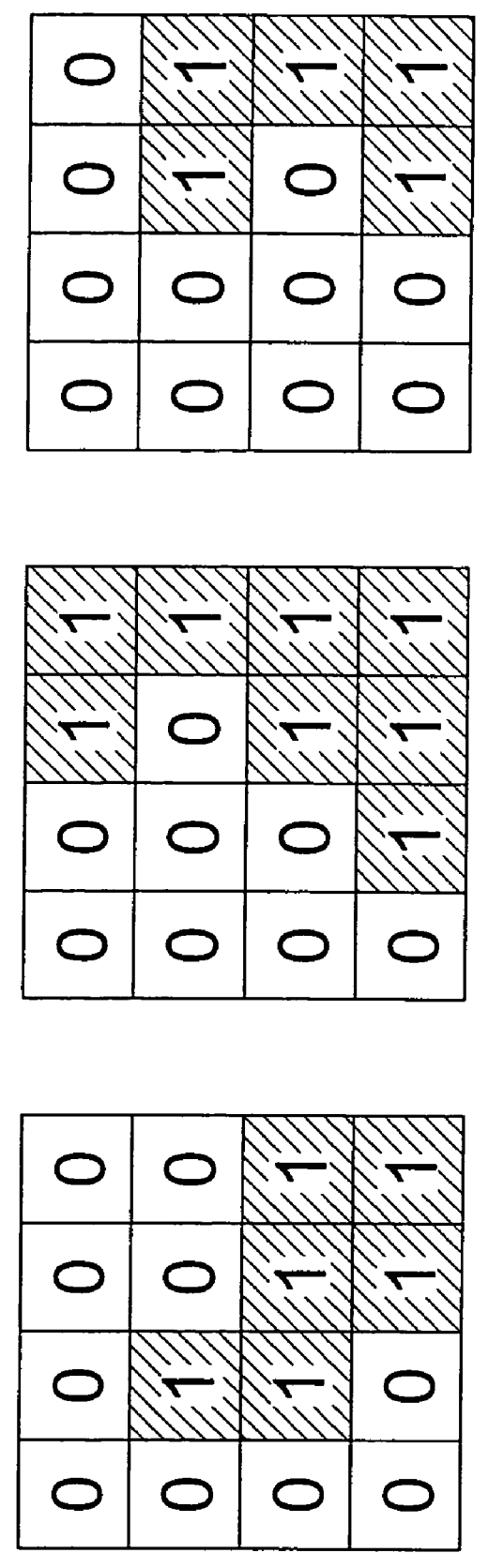

First, the processing of the coding apparatus and the configuration of the compressed stream transmitted to the decoding apparatus will be described with focus on the configuration of the prediction mode 3 and the detection procedure of motion vector 4 in connection therewith in the present embodiment. The prediction mode 3 in the present embodiment is defined as information extended so as to enable designation of an arbitrary assignment situation in addition to the aforementioned fixed motion vector assignment of FIGS. 6A to 6D, as shown in FIGS. 13A to 13C. Namely, supposing IDs of two motion vectors are 0 and 1, the prediction mode can be expressed as binary map information of 4×4 as shown in FIGS. 13A to 13C. Here the arrangement of IDs has the meaning as a transmission order in the compressed stream, for example.

The following will describe a method of determining the motion vectors 4 assignable as shown in FIGS. 13A to 13C (which is executed in the motion detector 2) and a coding method of prediction mode 3 based on the expression of FIGS. 13A to 13C. The first embodiment was configured simply to evaluate the plurality of patterns of the fixed motion vector assignment and fixedly execute the detection of motion vector in each of regions, whereas in the present embodiment the motion vector detection has to be carried out in consideration of optimization of motion vector assignment.

FIG. 14 shows a procedure of an example of the detection. First, S201 is to carry out the motion vector detection in a unit of 16×16 pixels. This can be much the same motion vector detection as in the case of Mode 1 of FIG. 4A or Mode 0 of FIG. 6A. The resultant motion vector is referred to as a first motion vector V1. Then, using the predicted value obtained as a consequence, a predictive evaluation value (SAD: Sum of Absolute Difference herein) is calculated for each 4×4 sub-block, and a sub-block with the predictive evaluation value over a predetermined value is extracted as an exceptional sub-block region (S202). This results in obtaining a motion vector assignment map 40 in which hatched portions indicate exceptional sub-block regions. The exceptional sub-block regions represent regions that cannot be satisfactorily predicted by the first motion vector V1, and by specifying the exceptional sub-block regions, it becomes feasible to implement motion vector assignment based on prediction efficiency. Then the motion vector detection is carried out for an object of only the exceptional sub-block regions, to detect a second motion vector V2 (S203).

In the above processing procedure, the detection process may also be configured to be performed in consideration of not only the predictive evaluation values but also the motion vector value and the code amount of motion vector assignment information (i.e., the prediction mode 3 of FIG. 1) determined in the exceptional sub-block regions. The first and second motion vectors may also be detected with reference to their respective reference frames different from each other, as in the first embodiment.

FIG. 15 shows a procedure of another detection example. In this example, a motion vector is first detected in every sub-block unit to acquire sixteen vectors (S204). Then the sixteen vectors are clustered into two vectors V1, V2 so as to be optimal in terms of the code amount and prediction efficiency of the entire macroblock (S205). Particularly, if the vector assignment is done in consideration of the code amount of prediction mode 3, it becomes feasible to detect such motion vectors as to achieve an optimal rate distortion balance in coding of the macroblock. The motion detector 2 determines the prediction mode 3 and motion vectors 4 on the basis of the method as described above.

Figure 17:
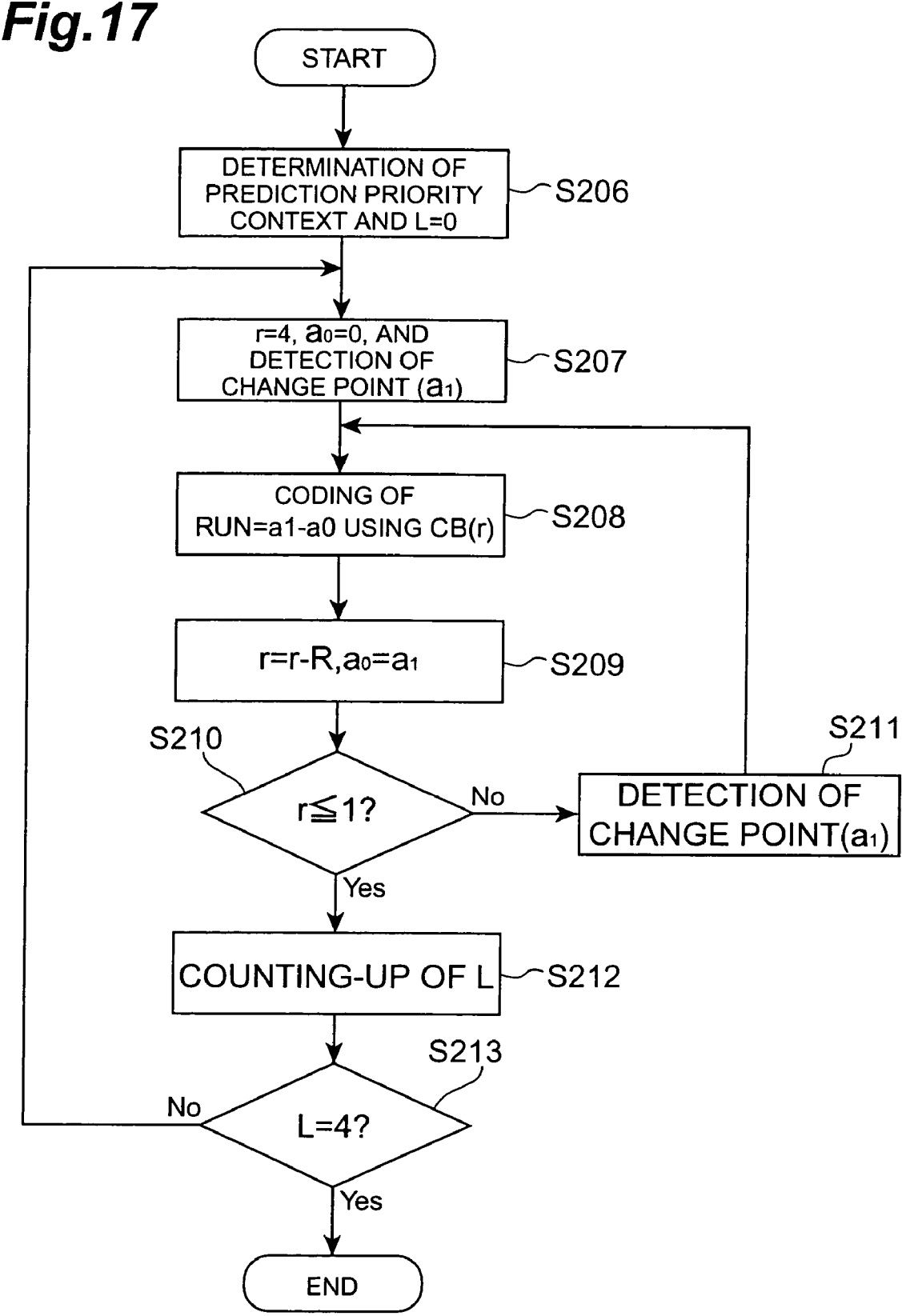
FIG. 17 is a flowchart showing the contents of the coding processing in the second embodiment.

A coding method of information of the prediction mode 3 will be described below using FIGS. 16A and 16B. The procedure of coding is presented in the flowchart of FIG. 17. Let us suppose that the macroblock C in FIGS. 16A and 16B is a macroblock as an object of coding, the macroblock A a macroblock located immediately above C, and the macroblock B a macroblock located to the left of C. Each macroblock is divided into 4×4 sub-block units and states of motion vector assignment (prediction mode 3 in FIG. 1) are indicated by the difference of white and gray. The coding is conducted in such a manner that change points of motion vector assignment in the sub-blocks are coded on the basis of the situations of the prediction modes in the macroblocks A and B. First, which should be inherited between the situations of the prediction modes, A or B, (prediction priority context) is determined from the prediction mode situations of the macroblocks A and B (S206 in FIG. 17). In addition, a line counter L is. reset to zero. It is obvious in FIG. 16A that the continuity of motion is higher from the macroblock A, and thus changes of motion vector assignment in the vertical direction as indicated by an arrow shall be defined as objects of detection. Hereinafter, this will be called a vertical prediction priority context. Conversely, in the case where the continuity of motion is judged higher from the macroblock B, as shown in FIG. 16B, changes of motion vector assignment in the horizontal direction shall be defined as objects of detection. Hereinafter, this will be called a horizontal prediction priority context. In FIGS. 16A and 16B, change points are indicated by bold lines in the cases where the macroblock C is assumed to be coded by the respective prediction priority contexts. The description below will be given concerning the case example of FIG. 16A.

For processing of line L, first settled are a remaining run count r, a run start point a0, and a run end point a1 (S207). The run end point a1 represents a location of a sub-block assigned a motion vector different from that assigned to the nearest sub-block in the macroblock designated by the prediction priority context (the macroblock A in the case of FIG. 16A).

However, it is practically less common to continuously detect the same motion vector across the macroblocks A and C, and it is thus necessary to adopt some means, for example, a method of starting the processing on the assumption that the motion vector assignment situation (0 or 1) of the nearest sub-block in the macroblock designated by the prediction priority context is the same as the assignment situation at the initial run start point a0 of the macroblock as an object of coding.

Another potential method is a method of applying the prediction priority context as closed within the macroblock C. Specifically, among the sixteen sub-blocks, the value of 0 or 1 is left as it is, for the left upper corner sub-block, a change point from a left adjacent sub-block is defined as 1 for the four sub-blocks in the uppermost line, and a change point from an immediately above sub-block is always defined as 1 for the four sub-blocks in the leftmost line. In addition to the determination above, change points of the remaining sub-blocks are determined on the basis of the prediction priority context.

It is seen that r=4 and a0=0 at the head of line L and in the example of FIG. 16A a1 is 3 in L=0. From this, the number of sub-blocks continuously assigned the same motion vector in the line L is given by R=a1-a0. This value is subjected to variable length coding using a code length CB(r) determined by the remaining run cont r (S208). Examples of the code length CB(r) are presented in FIG. 18A to FIG. 18C. Since situations of occurrence of remaining R are restricted depending upon progress of operation in coding of R, the coding efficiency can be increased by switching between the code lengths according to the remaining run count r in this way. For example, in the case of L=0 in FIG. 16A, r=4 and R=3 are first obtained, and thus R=3 is coded using CB(4) (code 1 is assigned and the code length is 3 bits). Then the remaining run count r is updated according to r=r−R and the run start point a0 is transferred to a1 (S209). This results in obtaining r=1, and the remaining run count of 1 means that the motion vector assignment in the line L is all settled at that point. Therefore, there is no need for transmission of a code in particular. This is the reason why CB(1) is not defined. Accordingly, in the case of r≦1, L is counted up and the processing is transferred to the next line (S210 and S212). If r>1 on the other hand, a new change point is detected (S211) and the above processing is repeated. In the final line L=3 of the macroblock C shown in FIG. 16A, the initial sub-block suddenly becomes the run end point and the code of "initial reversal 0" of CB(4) is encoded. Thereafter, the processing is advanced with the remaining run information count r=3. The coding processing is terminated when the time count L reaches 4.

As described above, in the case of FIG. 16A, 3 bits are necessary for L=0, 4 bits for L=1, and 6 bits for L=2, 3 and by further adding the code length of the prediction priority context (three bits in either of the horizontal and vertical cases herein) thereto, the coding of the prediction mode 3 is done by 18 bits. In the case of FIG. 16B, the coding can be done with four bits each for L=0, 1 and 1 bit each for L=2, 3, and with addition of the context, the prediction mode can be coded by 13 bits. Since the binary information itself can be expressed by 16 bits, a case of expression over 16 bits can be arranged to be coded by a 16-bit fixed length code with some device such as an escape code or the like. Furthermore, it is also possible to employ a configuration wherein patterns expected to have high frequencies of occurrence as division patterns (the cases as shown in FIGS. 6B to 6D) like the case of FIG. 16A are preliminarily assigned fixed short codes and wherein the codes by the above coding are used for expressing arbitrary division patterns other than those. The above coding processing procedure makes it feasible to efficiently code and transmit the information of the prediction mode 3 of FIG. 1 indicating the arbitrary motion vector assignment situation in sub-block units.

Figure 19A:
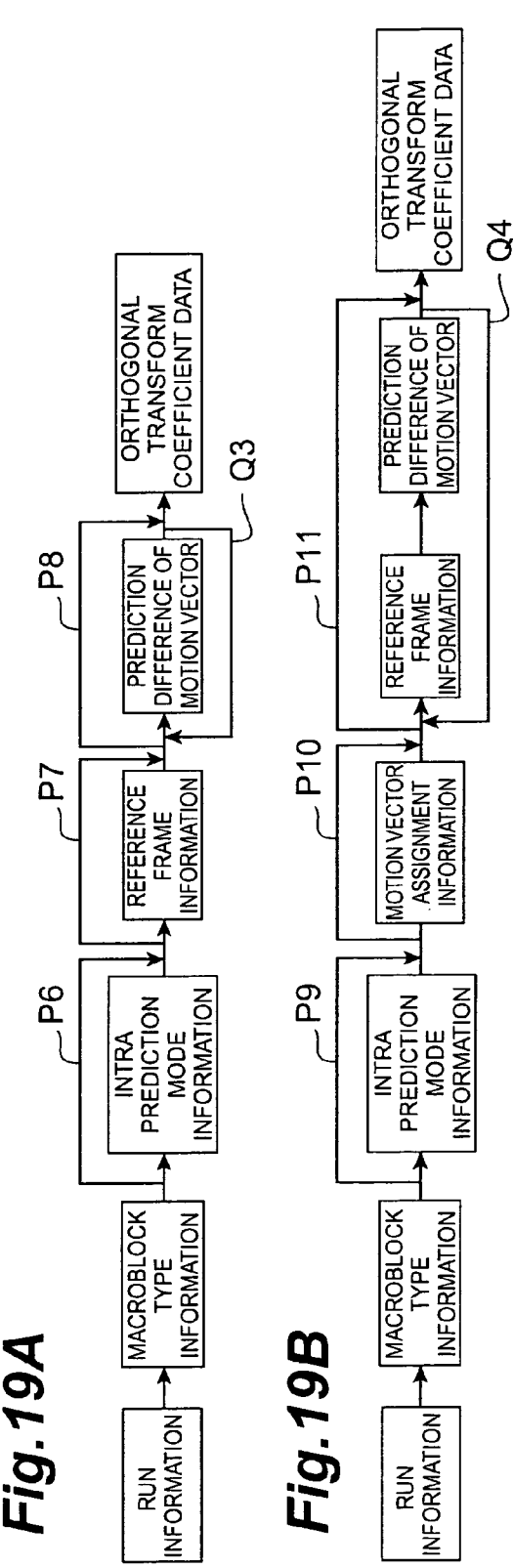
FIG. 19A is a diagram showing a syntax of macroblock data of a compressed stream in H.26L.
Figure 19B:
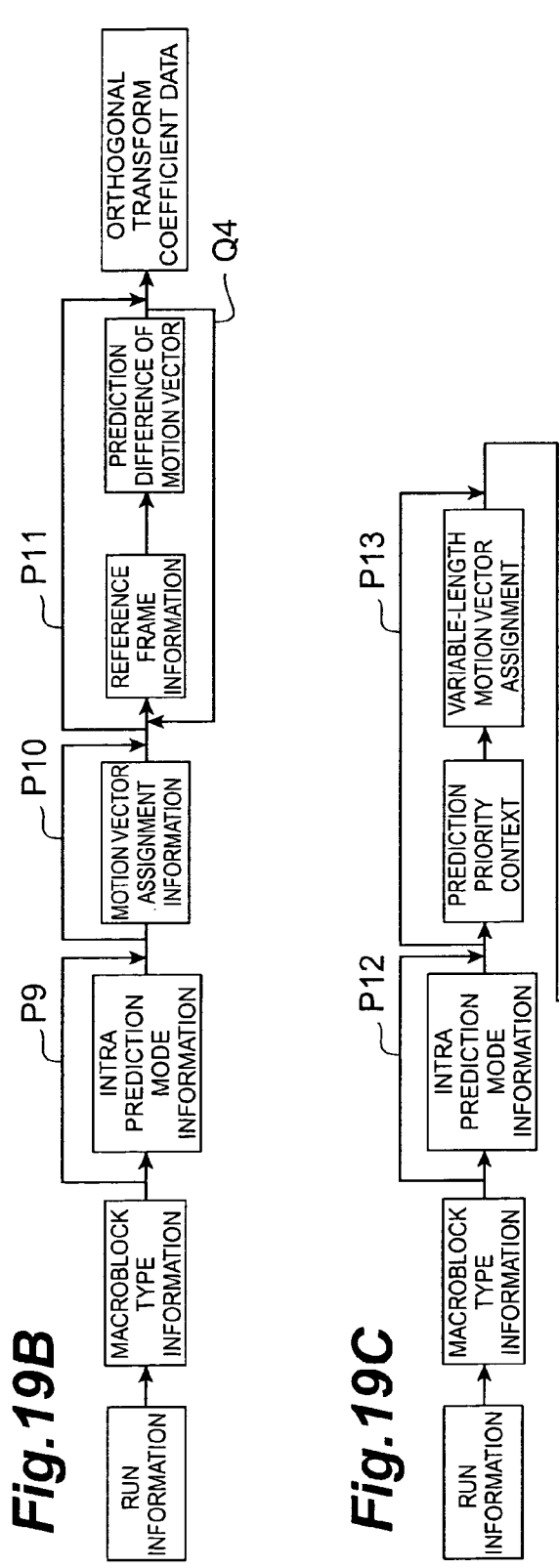
FIG. 19B is a diagram showing a simplest syntax example of macroblock data of a compressed stream in the second embodiment.
Figure 19C:
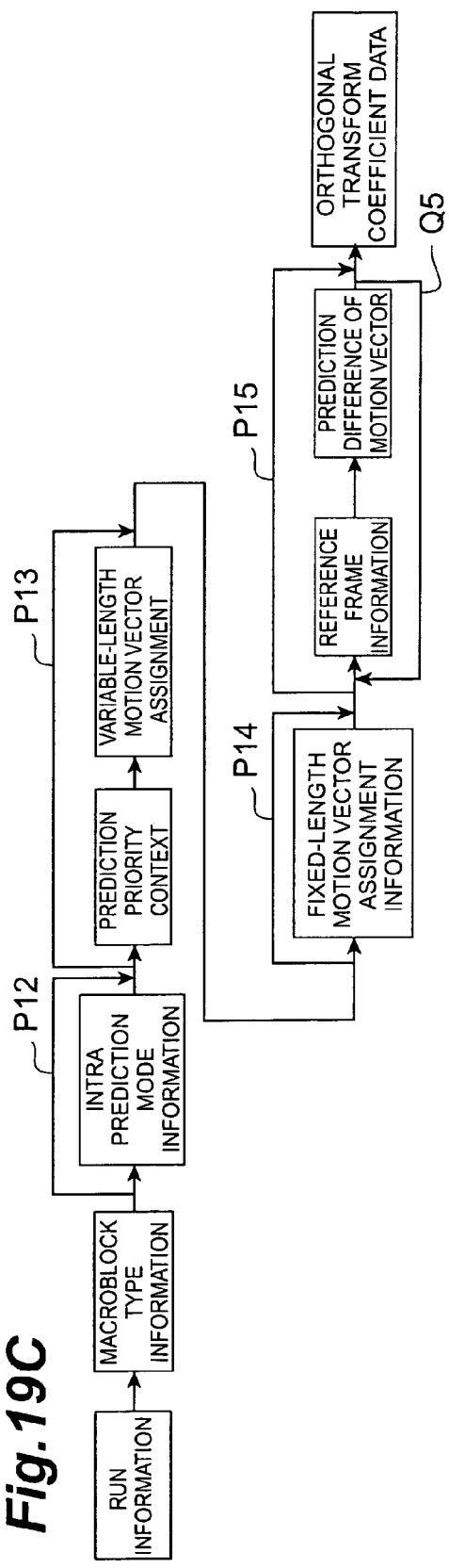
FIG. 19C is a diagram showing another syntax example of macroblock data of a compressed stream in the second embodiment.

In light of the above description, syntaxes of macroblock data of the compressed stream 24 outputted from the coding apparatus of the present embodiment are presented in FIGS. 19B, 19C in comparison with the H.26L syntax (FIG. 19A). FIG. 19B shows the simplest syntax example of the present embodiment, in which the macroblock type information contains only discrimination of either intra prediction or inter prediction and in which as to the inter prediction the shortest code is assigned to the case of the 16×16 pixel unit motion compensation while the information of the prediction priority context is assigned the next shortest code. The prediction priority context information means that the mode is the inter prediction mode by an arbitrary division pattern.

In general, the intra prediction appears at lower frequency of occurrence than the inter prediction, and is thus assigned a longer code than that of the prediction priority context information. For example, on the basis of the H.26L variable length code definition, code "1" (1 bit) is assigned to the 16×16 pixel unit motion compensation mode and code "001" or "011" (3 bits) to the prediction priority context information. When the intra prediction mode is chosen, the intra prediction mode information is decoded as in H.26L (in the case of the inter prediction mode, the intra prediction mode information is omitted as indicated by arrow P9). The motion vector assignment information in sub-block units as coded by the above coding method is multiplexed at the next location. This may be a 16-bit fixed length code. In the case of the intra prediction mode, this information is omitted to skip the corresponding processing as indicated by arrow P10. The information thereafter is as described in the first embodiment.

FIG. 19C shows another syntax configuration, in which, instead of expressing the prediction priority context by the macroblock type information, the code "001"o or "011" (3 bits) is used as identification information to identify whether the mode information of inter predication by an arbitrary division pattern is sent by variable length or by fixed length (16 bits). When it indicates the variable length, the motion vector assignment information (Pattern_info) is multiplexed subsequent to the prediction priority context (pred_ctx). When the fixed length is indicated on the other hand, the motion vector assignment information is multiplexed with a 16-bit fixed length code. In FIG. 19B, it is also possible to define the macroblock type information so as to express the information indicating the specific division patterns with high frequencies of occurrence as shown in FIGS. 6B to 6D and the escape code indicating the other patterns. In this case, the motion vector assignment information shall contain the value of the prediction priority context. This permits the division patterns with high occurrence frequencies to be coded more efficiently, without need for additional information for the motion vector assignment. In FIGS. 19A to 19C, arrows P6 to P15 indicate omission of pertinent information, an arrow Q3 up to sixteen loops, and arrows Q4 and Q5 up to two loops.

FIG. 20 shows the operation flow of the decoding apparatus. The decoding apparatus in the present embodiment operates in the same manner as the decoding apparatus of the first embodiment, except for the difference in the decoding procedure of the prediction mode information 3, and thus only the decoding processing part of the prediction mode information 3 will be described below.

In FIG. 20, S101 to S118 are the same processing steps as those in the decoding apparatus of the first embodiment shown in FIG. 12. When S108 in FIG. 20 ends up indicating the inter prediction mode, the flow proceeds to S215 to decode the motion vector assignment information in FIG. 19B. On this occasion, since the prediction priority context information has already been obtained from the macroblock type information, this step is arranged to perform the decoding processing using CB(r) on the basis of the prediction priority context information decoded in the process of S214. Since this can be carried out by common variable length decoding processing, the detailed description thereof is omitted herein. After the motion vector assignment is settled for all the sixteen sub-blocks, the process of S215 is terminated and the flow transfers to the decoding process of the reference frame information and the motion vector difference. The processing hereinafter is carried out as described in the first embodiment.

The decoding processing based on the syntax of FIG. 19C can also be explained with FIG. 20. In this case, step S214 is configured to determine whether the motion vector assignment information is a variable length code or a fixed length code, instead of the prediction priority context information. On the basis of this information, step S215 is arranged to execute the decoding of the motion vector assignment information based on the syntax of FIG. 19C. In the case of the variable length code, the decoding processing of the prediction priority context information is first carried out. Furthermore, where the macroblock type information contains the identification information indicating one of some division patterns with high occurrence frequencies (e.g., Modes 1 to 14 in FIGS. 6B to 6D), the division pattern is settled in the step of S214, and thus the flow can be configured to skip the step of S215 except when the escape code indicating an arbitrary division pattern is detected.

The coding apparatus and decoding apparatus described above make it feasible to capture various motions in the macroblock by the arbitrary division in sub-block units and to implement efficient video transmission, recording, and playback with a small overhead.

Figure 21:
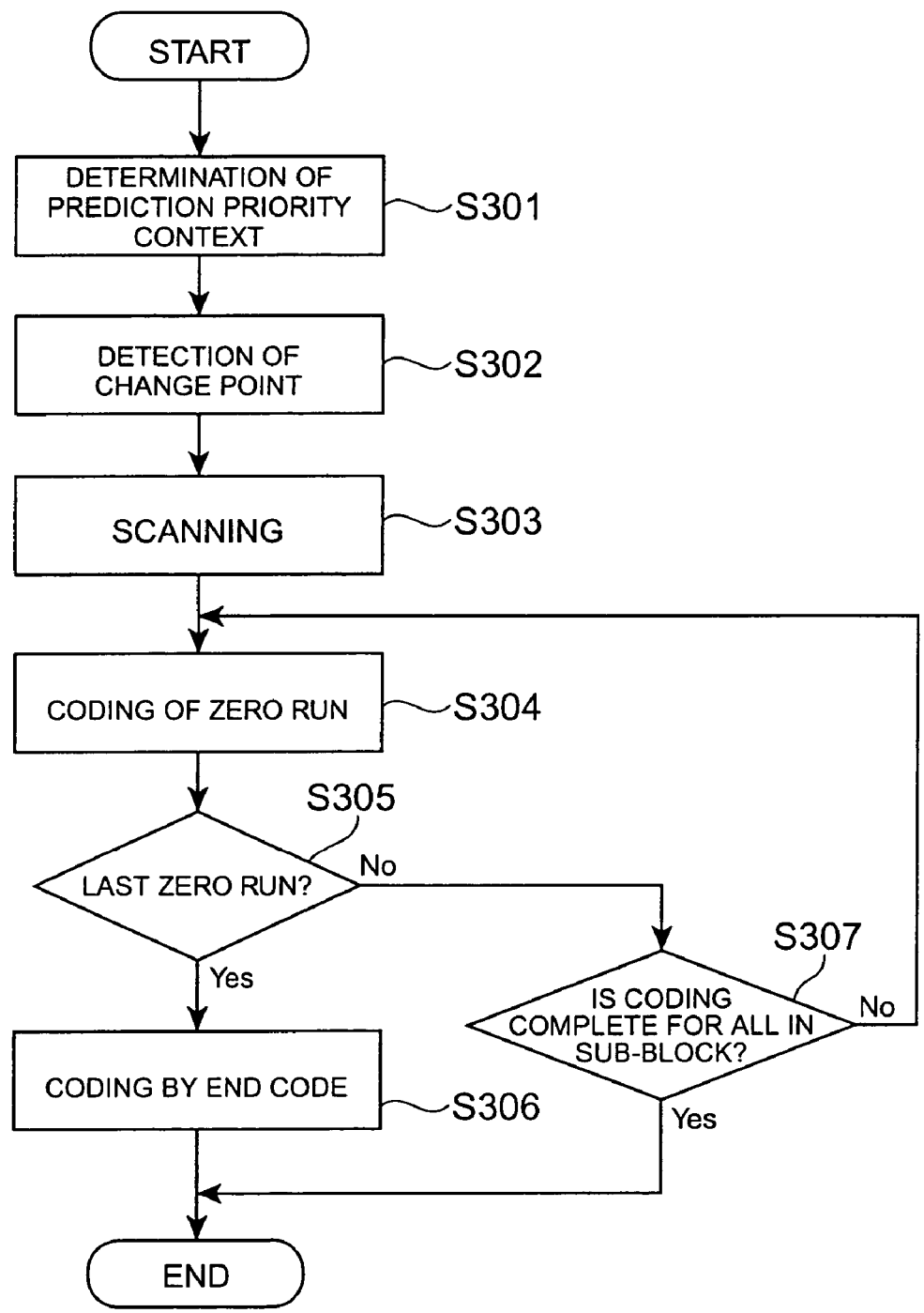
FIG. 21 is a flowchart showing the processing contents of the coding apparatus in the third embodiment.

The third embodiment will be described below. The present embodiment will describe another coding method of the prediction mode 3 of FIG. 1 to indicate the arbitrary division pattern in the second embodiment. FIG. 21 shows the processing flow of the coding method in conjunction with the specific example used in FIG. 16A, and FIG. 22 are illustrations to explain the processing. First, S301 in FIG. 21 is to determine the prediction priority context as in the second embodiment. When the vertical prediction priority context is selected herein, change points are detected as locations of change where the motion vector assignment changes with respect to the lowermost sub-block line of macroblock A (S302). For example, in the case of macroblocks A, C of FIG. 22A, bold portions are detected as change points. This results in generating a binary map of FIG. 22B with each changing point assigned 1 and with each unchanging point assigned 0. This map is scanned with a predetermined scan table (e.g., a scan table of FIG. 22C) to generate zero runs (S303).

For example, since the vertical prediction priority context is adopted herein, the binary map of FIG. 22B is scanned using the scan table for vertical scan of FIG. 22C. As a consequence, a set of zero runs {3, 1, 3, 5} is generated. This information is subjected to variable length coding (S304 to S307), thereby effecting coding of the prediction mode 3. When no change point is found in the middle of the scan (in the case of the affirmative judgment in S305), the zero run information thereafter is replaced by only one end code (EOB) (S306).

When a change point is present to the point of the end of the scan on the other hand, the code of the last zero run can be settled by making use of the fact that the total number of zero runs and change points should be 16, and the coding with the end code is not performed (S306 is skipped after the affirmative judgment in S307).

The scan table may be replaced, for example, by zigzag scan of FIG. 23A, horizontal scan of FIG. 23B, or Hilbert scan of FIG. 23C or can be any other table. The scan may be changed based on the prediction priority context (e.g., the horizontal scan is used when the horizontal prediction priority context is selected), or a specific general scan rule may be fixedly used. A dedicated flag for switching between scan tables may be coded as part of the information of the prediction mode 3. In this case, the coding apparatus can selectively use a scan table with the best coding efficiency out of a plurality of scan methods.

The syntax of the prediction mode 3 obtained by the above-stated coding method can be implemented by replacing the motion vector assignment information shown in FIGS. 19B and 19C with the coding method of the second embodiment. Concerning the configuration of the decoding apparatus, the step of S215 in FIG. 20 corresponds to the process of decoding the code encoded by the coding method described in the present embodiment to settle the prediction mode 3.

The present embodiment described the case example using the prediction priority context information, but it is also possible to employ a configuration in which the change points are detected according to a certain fixed rule, independent of the prediction priority context, so as to obviate the need for coding the information of the prediction priority context. In this configuration the scan table may be a fixed one or a flag may be provided to switch to an efficient table.

The coding apparatus and decoding apparatus described above make it feasible to capture various motions in the macroblock by arbitrary division in sub-block units and to implement efficient video transmission, recording, and playback with a small overhead.

The fourth embodiment will be described below. The present embodiment will describe the coding apparatus and decoding apparatus in which the prediction mode 3 of FIG. 1 is configured to allow change of motion vector assignment in sub-block units and provide the distinction of intra/inter prediction. Since this configuration allows intra or inter (one of plural motion vectors) to be selected and coded in each sub-block, efficient coding adapted to the property of actual images can be performed, as compared with the mode switching in macroblock units.

First, the definition of the prediction mode 3 of FIG. 1 in the present embodiment will be described using the examples of FIGS. 24A and 24B. In the H.26L coding system, two types of intra prediction are prepared: the intra 4×4 mode (INTRA_4×4) of performing the spatial prediction with switching among a plurality of prediction methods identified by the intra prediction mode information in 4×4 sub-block units; and the intra 16×16 mode (INTRA_16×16) of performing the spatial prediction with switching among a plurality of prediction methods in macroblock units.

A total of six types (1-6) of spatial prediction methods are defined for the intra prediction mode information, and these are allowed to be designated in sub-block units. Then this is extended to be integrated with the motion vector assignment information as prediction modes of 4×4 sub-blocks. Namely, supposing two motion vectors can be used, IDs of prediction methods thereof are defined by 7 and 8. FIGS. 24A and 24B show examples in which the prediction methods 1 to 8 are assigned to the sub-blocks on the basis of this definition. In FIG. 24A the distinction of intra/inter is made along the diagonal direction and two motion vectors are used in inter prediction.

FIG. 24B is an example in which the macroblock is divided into upper and lower segments and in which the prediction is performed by intra prediction for the upper segment and by inter prediction for the lower segment. In this example only one motion vector is used for the inter prediction. In the description hereinafter, this prediction assignment information of many values will be called many-valued prediction identification map information.

Since the discrimination between the intra 16×16 mode and the 16×16 pixel unit motion compensation mode (hereinafter, an inter 16×16 mode) does not require the prediction assignment information of 4×4 sub-block unit, it can be implemented by only identification based on the macroblock type information. Namely, the macroblock type information is classified under three types of the intra 16×16 mode, the inter 16×16 mode, and sub-block unit arbitrary prediction assignment. Then, in the case of the mode of sub-block unit arbitrary prediction assignment, the prediction methods for all the sub-blocks are settled by coding the above many-valued prediction identification map information.

In this example, the motion detector 2 of the coding apparatus can select a mode with the best coding efficiency by evaluating possibilities of all the intra 16×16 mode, inter 16×16 mode, and sub-block unit arbitrary prediction assignment. Of course, the apparatus may be configured to perform coding with some fixed combinations of modes. A variety of techniques can be considered for the optimal detection of sub-block unit prediction, and, for example, by extending the method shown in FIG. 14 in the second embodiment, the map information can be settled, for example, by a method of applying the intra prediction to each sub-block with a prediction evaluation value greater than that of intra prediction out of the exceptional sub-block regions.

The following will describe coding methods of the many-valued prediction identification map information shown in FIGS. 24A and 24B. This map information can be coded by much the same coding method as that of the motion vector assignment information described in the second embodiment and the third embodiment. The difference is that, while the information of the object of coding was the binary map in the second embodiment and the third embodiment, the object of coding in the present embodiment is a gray scale map.

(1) Coding Method 1

For implementation by the method of the second embodiment, individual mode information is expanded into bit planes. For example, the bit planes can be classified into a plane indicating either intra or inter, planes indicating use or nonuse of the individual intra prediction methods (a total of six planes), and a plane for assignment of motion vector. Each of these planes can be coded by the method described in the second embodiment. For example, if the many-valued prediction identification map information of FIG. 24A is decomposed into the bit planes according to the above rule, the result will be as shown in FIGS. 25A to 25C. Here the intra/inter classification plane of FIG. 25A and the motion vector assignment plane of FIG. 25C both are constructed using the prediction priority context, while the planes of the intra prediction methods are constructed as bit planes based on only the presence or absence of the prediction methods.

Figures 26A, 26B, 26C:
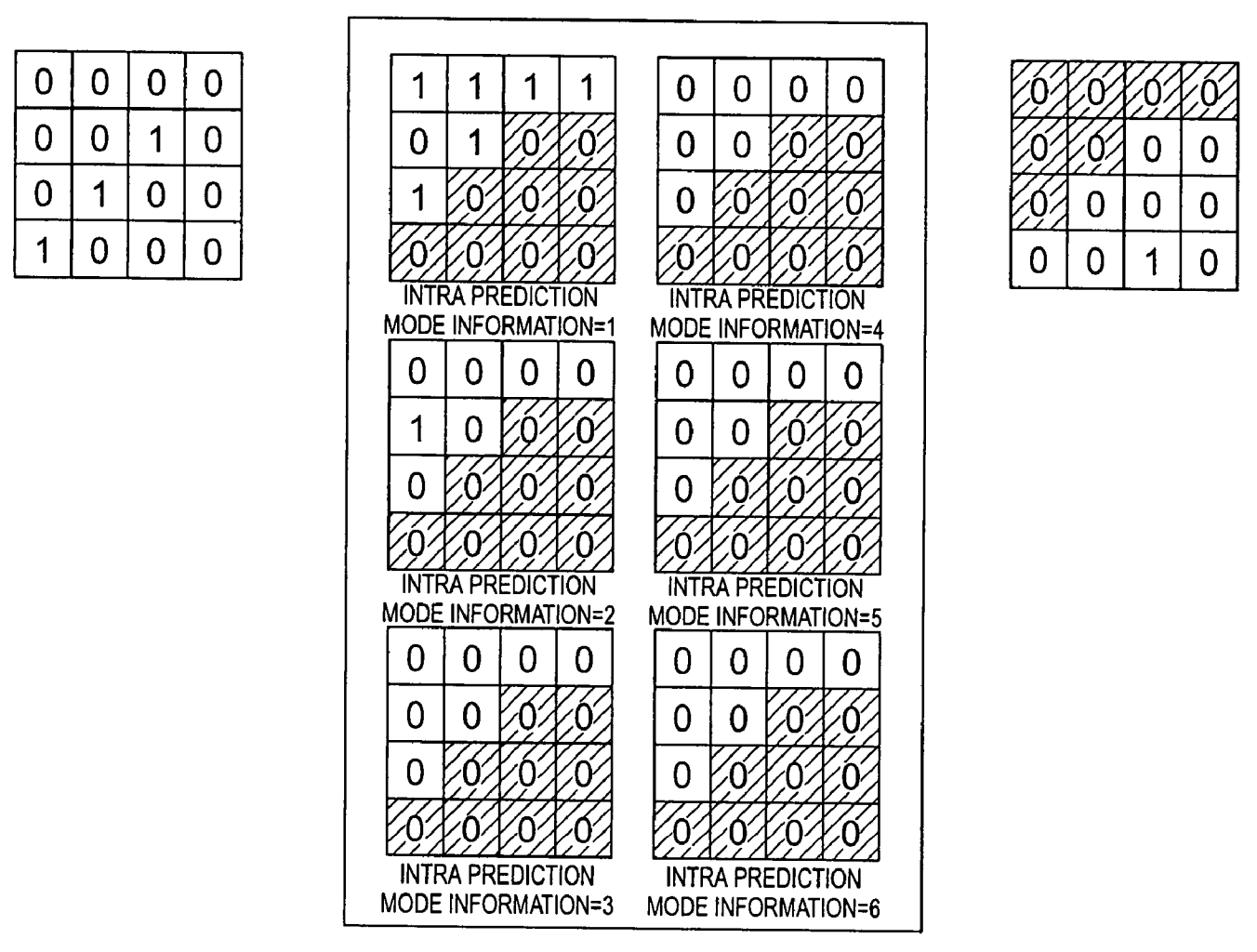

The information of the prediction mode 3 in the present embodiment can be expressed by coding the binary maps of the total of eight planes shown in FIGS. 25A to 25C, according to a predetermined order by the method of the second embodiment. It is also possible to adopt a configuration wherein discrimination of intra/inter is first transmitted and wherein as to the six planes of FIG. 25B concerning the intra prediction methods and the plane of motion vector assignment of FIG. 25C, only the sub-blocks corresponding to intra and inter, respectively, are used as bit plane data, as shown in FIGS. 26B and 26C (i.e., the gray portions in FIGS. 26B and 26C are excluded from the object of coding). This makes it feasible to efficiently reduce the amount of information to be coded. The above plane information may be arranged to be coded by the coding method of the third embodiment.

(2) Coding Method 2

Figure 27:
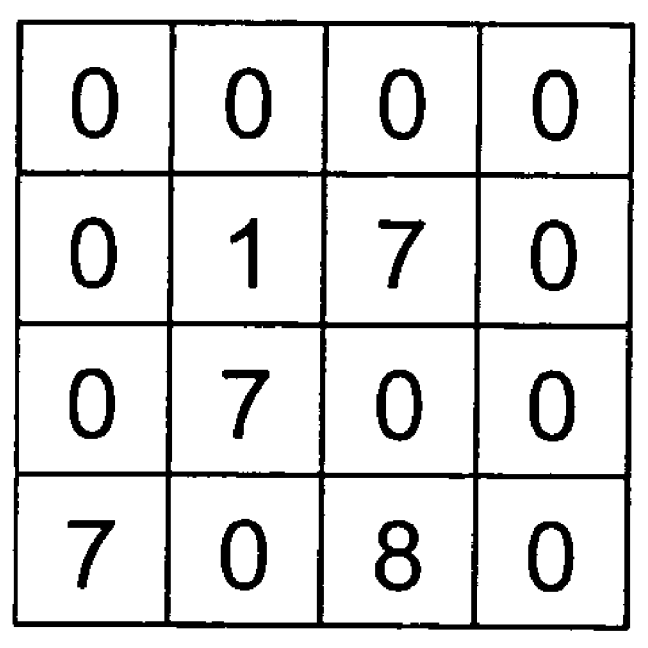

Another potential coding method as a modification of the third embodiment is a method of setting each unchanging point of a prediction method to 0 and expressing a continuous unchanging zone of the same prediction method by a run. When this method is applied to the case of FIG. 24A, it is transformed into data as shown in FIG. 27 (where each change point is detected by the horizontal prediction priority context). This information is coded in sets of zero runs and IDs of the prediction methods of change points. In this example, using the horizontal scan of FIG. 23B, the information can be expanded into sets of {(5, 7), (0, 1), (2, 7), (3, 8), (1, 7)}. These sets are assigned respective variable length codes to be coded. The scan table may be arranged so that a flag is prepared therefor and so that an efficient table is used by switching among tables.

In this case, it is also possible to adopt a configuration wherein the changes by the values of 7 and 8 indicating the inter prediction are assumed not to be changes of the prediction method and are regarded as unchanging points and wherein the plane of motion vector assignment information is separately coded.

(3) Coding Method 3

Furthermore, the coding method may be configured to expand so as to add the flag of inter prediction to the intra prediction mode information in the H.26L coding system of the conventional example and transmit only the inter prediction portions in the form of the motion vector assignment plane.

(4) Coding Method 4

Intra/inter classification patterns and motion vector assignment patterns are fixedly arranged, for example, as shown in FIGS. 6A to 6D. Since all the intra/inter division situations and motion vector assignment situations can be identified as fixed pattern IDs between encoder and decoder, the IDs of these patterns are subjected to variable length coding in the order of their frequencies of occurrence. Since it is also considered that the intra/inter division patterns and the motion vector assignment patterns (equivalent to those in the first embodiment) have high correlations with patterns selected in neighboring macroblocks, the coding method may also be arranged in such a manner that a context is defined based on the situations of the neighboring macroblocks, as in the first embodiment, for the intra/inter division patterns as well and that variable length coding tables or probability tables for arithmetic coding are arranged to be switched according to the context.

Figure 28:
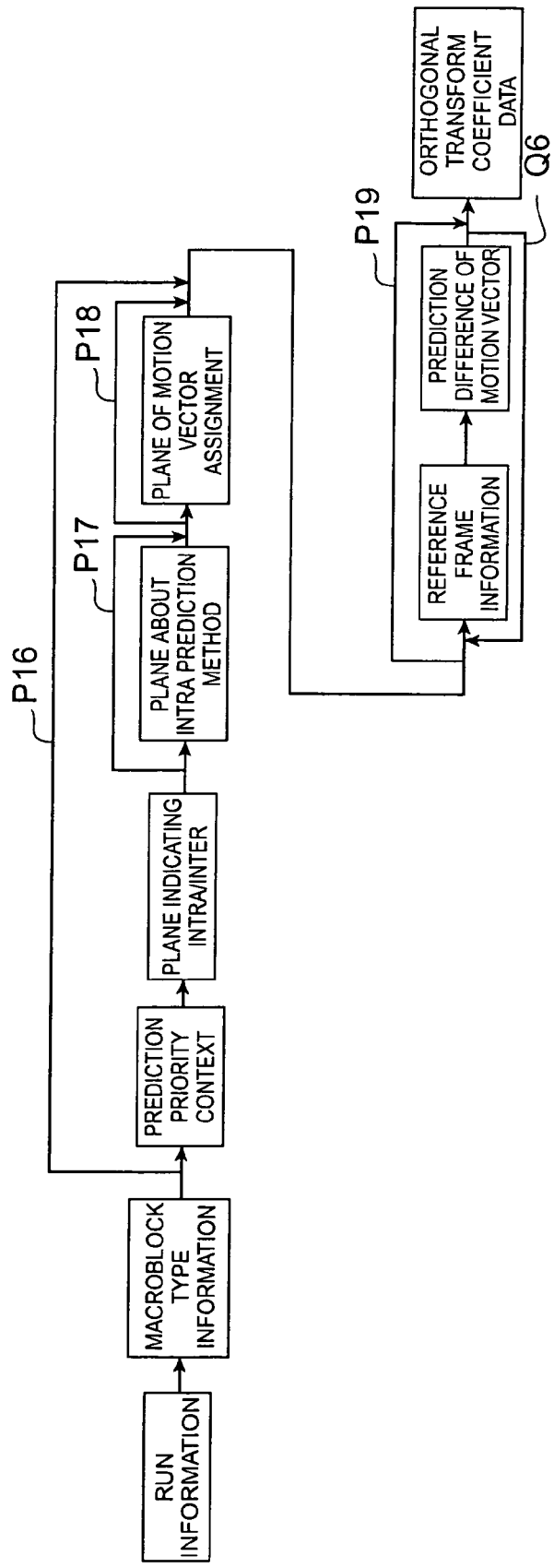
FIG. 28 is a diagram showing a syntax of macroblock data of a compressed stream corresponding to the coding method 1 in the fourth embodiment.

Syntax examples of the prediction mode 3 coded by the above methods are presented in FIG. 28 to FIG. 31. FIG. 28 to FIG. 31 correspond to the above coding methods 1 to 4, respectively. In the coding method 1, as shown in FIG. 28, the motion vector assignment information is coded on a bit plane basis. The prediction priority context may be defined in the closed form within the same macroblock, as described in the second embodiment, or may be arranged not to be used.

Figure 29:
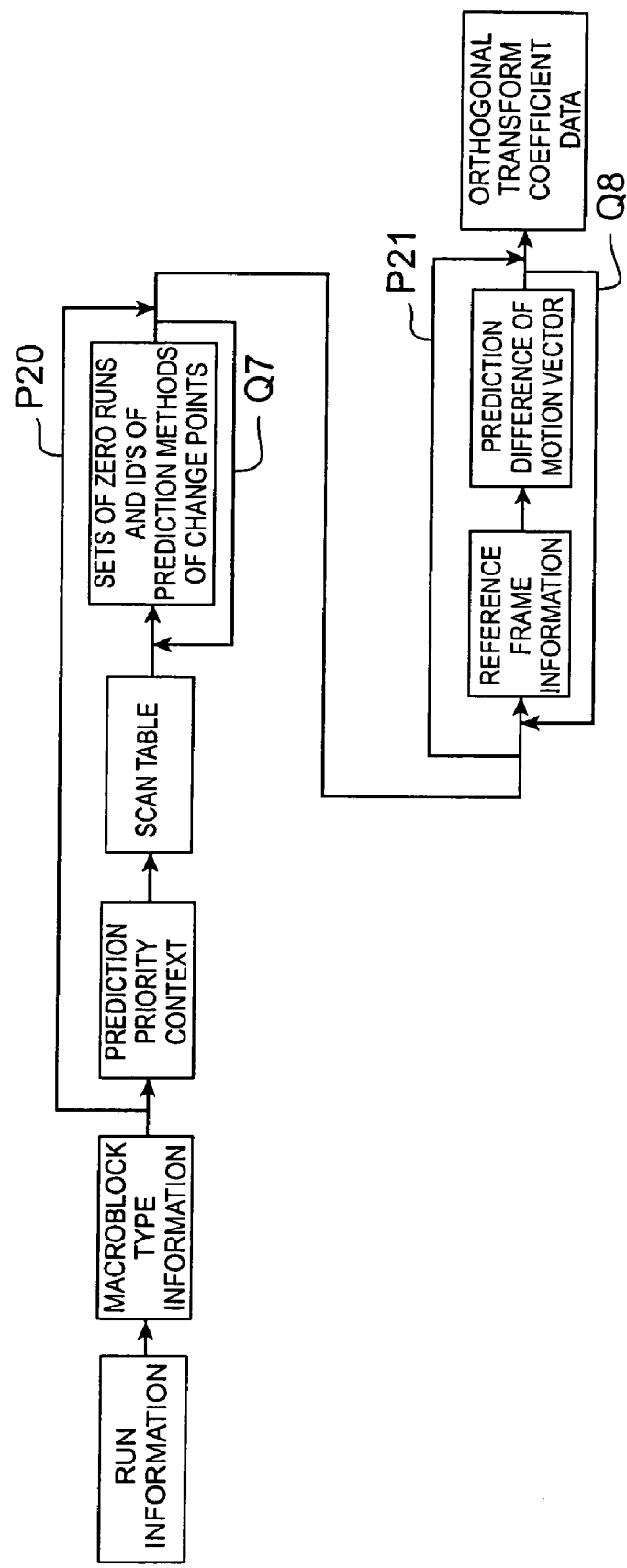
FIG. 29 is a diagram showing a syntax of macroblock data of a compressed stream corresponding to the coding method 2 in the fourth embodiment.

In the coding method 2, as shown in FIG. 29, the scan table flag information for identifying the scan table is multiplexed subsequent to the prediction priority context. This is not required in the case where the scan table is determined depending upon the prediction priority context and in the case where the scan table is fixedly determined. Subsequently, sets of zero runs and IDs of prediction methods of change points are transmitted by the number obtained as a result of the scan.

Figure 30:
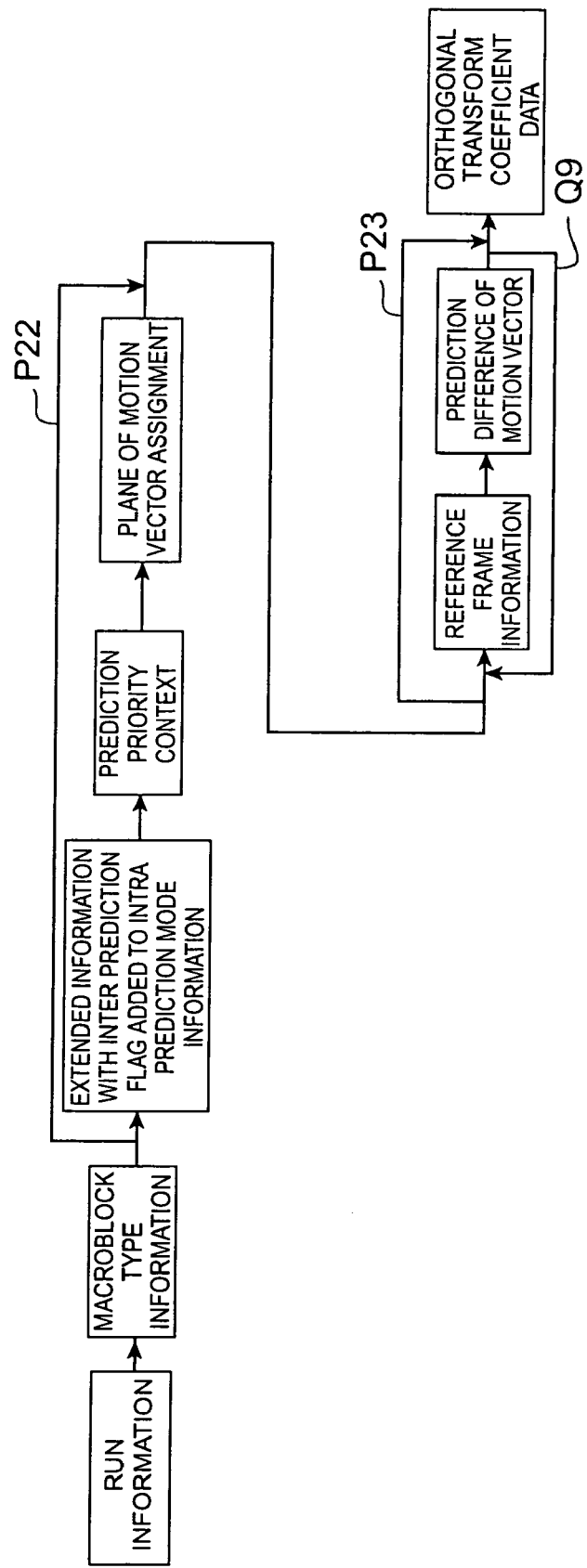
FIG. 30 is a diagram showing a syntax of macroblock data of a compressed stream corresponding to the coding method 3 in the fourth embodiment.

In the coding method 3, as shown in FIG. 30, the extended information including the inter prediction flag in addition to the intra prediction mode information implements such expansion as to be able to designate the total of seven types of methods including the six types of intra prediction methods and the inter prediction method, and the syntax is arranged to transmit this expanded information, and the motion vector assignment information for designating the motion vector assignment in the inter prediction case.

Figure 31:
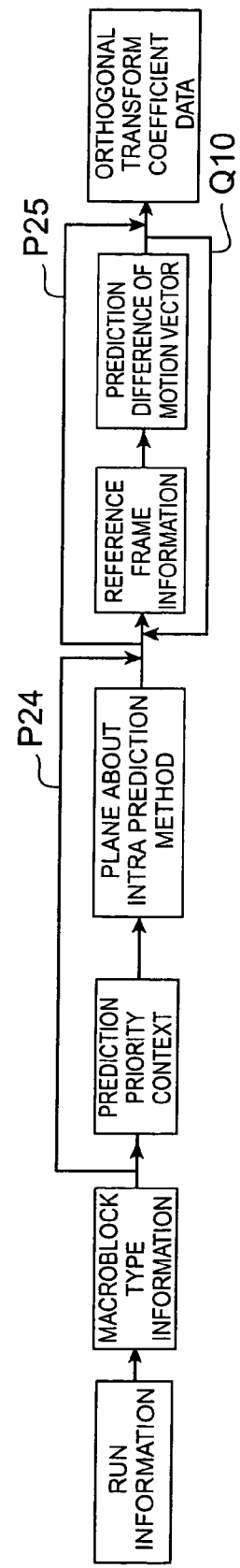
FIG. 31 is a diagram showing a syntax of macroblock data of a compressed stream corresponding to the coding method 4 in the fourth embodiment.

In the coding method 4, as shown in FIG. 31, the macroblock type information contains the fixed mode assignment patterns including the intra/inter classification pattern and the motion vector assignment pattern, and is expanded as data to uniquely identify each of the very large number of prediction mode values. Then the identification information of the intra prediction mode is separately transmitted for only 4×4 sub-blocks within each region of intra prediction designated by the macroblock type information. As in this syntax, it is also possible, for example, to employ a configuration using the intra prediction mode identification information in sub-block units (intra prediction mode information), used in the intra 4×4 mode of the H.26L coding system, as it is.

In FIGS. 28 to 31, arrows P16 to P25 represent omission of pertinent information, an arrow Q7 up to sixteen loops, and arrows Q6 and Q8 to Q10 up to two loops.

The decoding apparatus is arranged to receive the syntax in one of the above various configurations, settle the prediction mode assignment in the macroblock according to the procedure reverse to the procedure defined in the associated coding method, and decode the video signal, on the basis of the decoding operation flow of FIG. 12, FIG. 20, or the like.

The coding apparatus and decoding apparatus described above make it feasible to capture various change states in the macroblock by arbitrary division in sub-block units and to implement efficient video transmission, recording, and playback with a small overhead.

In the present embodiment, the prediction mode definition may be arranged to set the number of motion vectors to three or four and additionally assign the motion vectors respective IDs of prediction methods thereof.

The fifth embodiment will be described below. The present embodiment will describe an example in which another embodiment of the motion vector detecting processing and motion vector prediction method is implemented in the coding apparatus and decoding apparatus of the first embodiment.

When the inter prediction modes of FIGS. 6A to 6D described in the first embodiment are used, the detection method of motion vector in each mode can be any method as long as it can be interpreted by the predetermined syntax as described in the operation of the decoding apparatus in the first embodiment. However, the present embodiment will describe a motion vector detecting technique of increasing the prediction efficiency without much increase in the load of computational complexity, and the coding apparatus and decoding apparatus employing a motion vector prediction rule associated therewith. In the description below, the motion vector detection processing is carried out in the motion detector 2 of FIG. 1, and the motion vector prediction processing is carried out in the variable length encoder 23 (on the coding apparatus side) of FIG. 1 and in the variable length decoder 25 (on the decoding apparatus side) of FIG. 2. In the description hereinafter, the operations will be described according to the flowcharts of these processing.

In the case of the inter prediction mode set in the first embodiment shown in FIGS. 6A to 6D, one or two motion vectors have to be detected per macroblock. In the low rate coding, the amount of codes that can be used for expression of the orthogonal transform coefficients is decreased with increase in the number of motion vectors, and it is thus desirable to perform the detection of motion vectors in consideration of a trade-off between the cost for the amount of codes for motion vectors and the accuracy of prediction with the detected motion vectors. In the H.26L video coding system as a basis of the first embodiment, $MVi(n,j)$ (n: macroblock location and j: segment number) represents the motion vectors detected in a reference frame $RFi$ ($i \leq 1$) temporally previous by i frames, Rp represents the bit amount necessary for coding of the motion vectors $MVi(n,j)$ and the reference frame identification information $RFi$, and cost Cp is defined by Eq (1) below, using the predictive residual power Dp obtained in that case and constant $\lambda$; the motion vectors $MVi(n,j)$ and reference frame $RFi$ ($i \geq 1$) to minimize the cost Cp are determined. The constant $\lambda$ is set so as to increase with decrease in the target coding bit rate, and thus constraints due to the bit amount Rp become severer is low rate coding.

$$Cp = Dp + \lambda Rp \quad (1)$$

Since the predicted value is first determined and the prediction difference is then coded for each motion vector as described in the first embodiment, the bit amount Rp becomes smaller as the motion vector detected approaches the predicted value. For this reason, in the H.26L video coding system, it is recommended that a center point of a motion vector search range be set at the motion vector predicted value and the location of the motion vector search widow be adopted segment by segment. This decreases at least the amount of codes of motion vectors and relaxes the constraints due to the bit amount Rp on the minimization of the cost Cp in the above equation, and the motion vector detection can be performed under advantageous conditions based on the minimization of the predictive residual power Dp. Even with consideration to the continuation of motion from neighboring macroblocks, it is expected that the adaptation of the search window location for the predicted value can also lead to decrease of the predictive residual power Dp. On the other hand, there arises a problem that the adaptation of the search window increases the load of calculation processing of the predictive residual power.

Figure 36A:
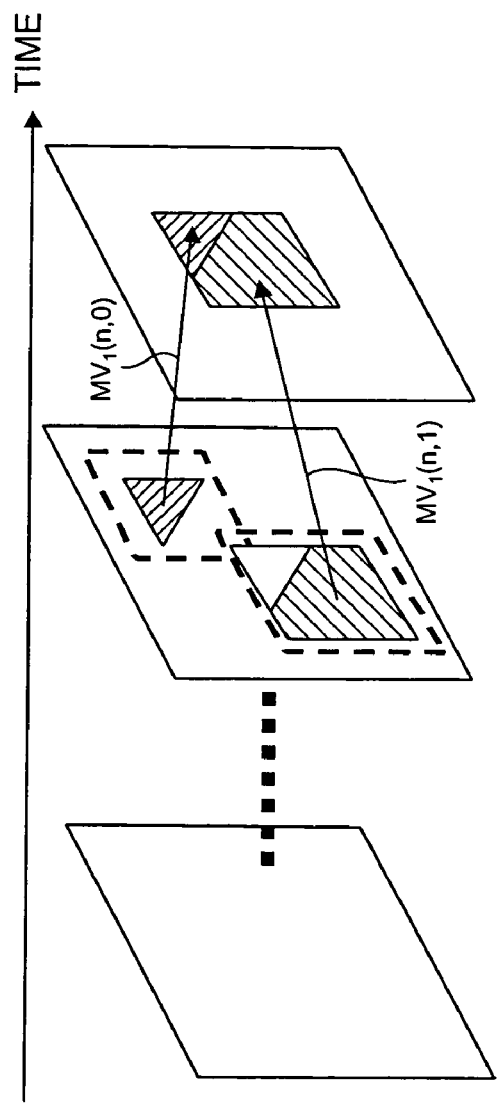
FIG. 36A is a diagram for explaining the motion vector detection processing in the case where adaptation is carried out for a motion vector search range in the fifth embodiment.
Figure 36B:
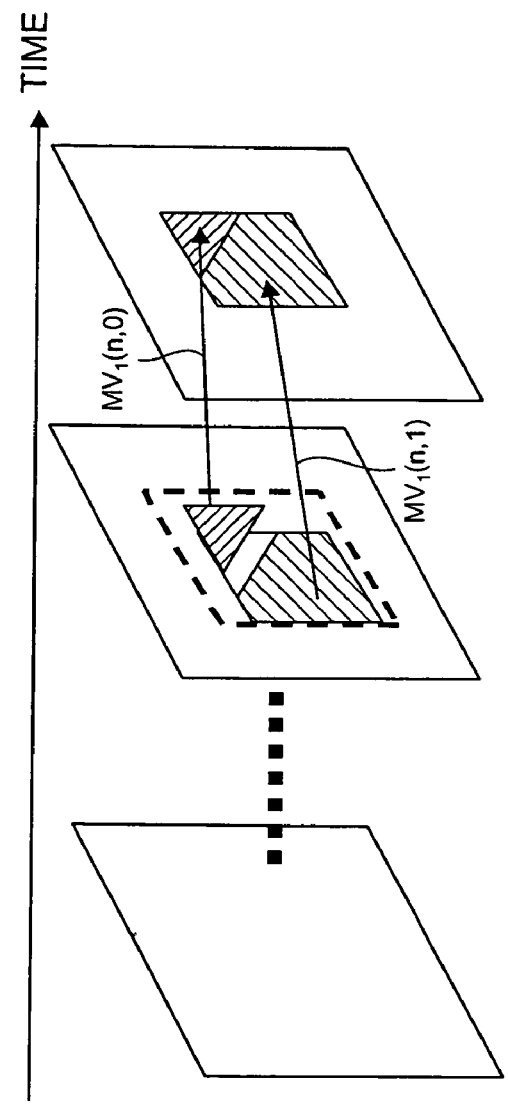
FIG. 36B is a diagram for explaining the motion vector detection processing in the case where adaptation is not carried out for the motion vector search range in the fifth embodiment.

In order to explain this problem, FIG. 36A schematically shows a case with the optimization of the motion vector search range and FIG. 36B a case without the optimization of the motion vector search range. As shown in FIG. 36B, where the search range is set constant independent of segments, it is possible to reduce the number of calculations of the predictive residual power by making use of the fact that shapes of segments are hierarchical.

For example, in FIG. 6D, if the calculation of the predictive residual power is carried out for all the motion vector candidates with the search window uniquely determined for the upper segment (white segment) of Mode 13, the predictive residual power calculation does not have to be performed again in Mode 9 as to the three sub-blocks in the upper segment of Mode 13 and the predictive residual power calculation shall be performed for the remaining three sub-blocks. In contrast to it, in FIG. 36A, assuming that the motion vector prediction rule of FIG. 10D is used, the upper segment of Mode 13 can no longer use the common search location to the same portion of Mode 9, and the result of the predictive residual power calculation thereof cannot be reused.

Therefore, the present embodiment will describe the motion vector detection processing and motion vector prediction rule to improve the prediction accuracy by effecting the adaptation of the search window in each segment while keeping down the computational complexity. The motion vector prediction rule of the present embodiment is fixedly defined as shown in FIGS. 37A to 37D. This rule includes less variations of prediction locations used than in FIGS. 10A to 10D, and roughly only four types of motion vector predictions are used.

The first type is a prediction of the upper segment in Mode 0 and Modes 9, 10, 13, and 14 (MV prediction ①), and in this case, it is the median predication using motion vectors at locations of three sub-blocks (4×4 blocks) surrounded with dotted lines.

Figure 37A:
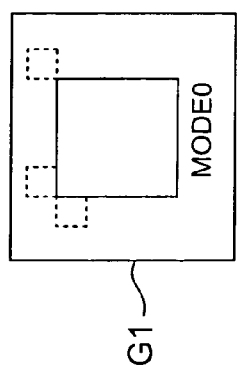
FIG. 37A is a diagram for explaining a motion vector prediction rule about the first group of fixed division patterns in the fifth embodiment.
Figure 37B:
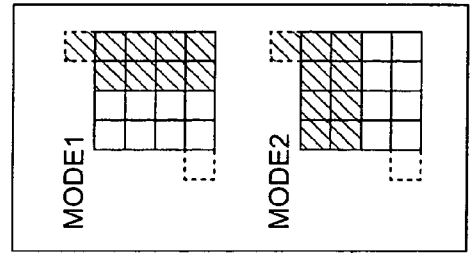
FIG. 37B is a diagram for explaining a motion vector prediction rule about the second group of fixed division patterns in the fifth embodiment.
Figure 37C:
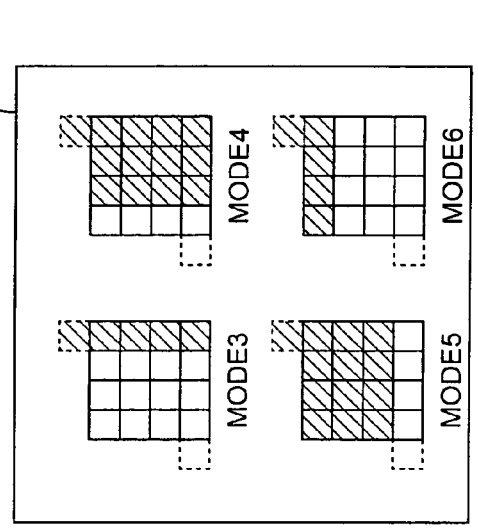
FIG. 37C is a diagram for explaining a motion vector prediction rule about the third group of fixed division patterns in the fifth embodiment.
Figure 37D:
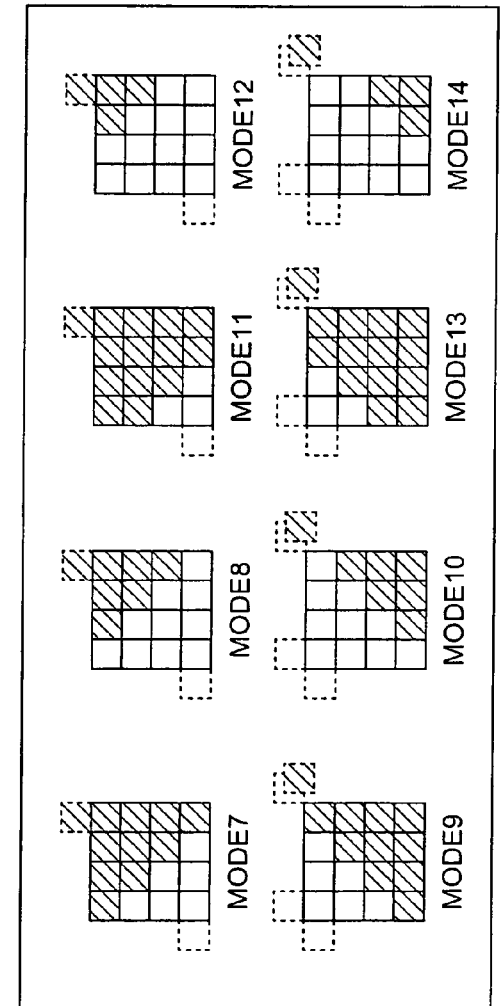
FIG. 37D is a diagram for explaining a motion vector prediction rule about the fourth group of fixed division patterns in the fifth embodiment.

The second type and the third type are predictions in Modes 1-8, 11, and 12 and, as shown in FIGS. 37B to 37D, they are defined as predictions using a motion vector of a sub-block at the left or upper fixed location according to a target segment (MV predictions ② and ③, wherein ② is a prediction from the left and ③ a prediction from above).

The fourth type is a prediction of the lower segment in Modes 9, 10, 13, and 14, and in this case, it is a prediction using a sub-block at a dotted-line location adjacent to the right upper corner sub-block in the macroblock (MV prediction ④).

In the case where a motion vector at a location used for the prediction refers to a reference frame different from that of a motion vector to be predicted at present and in the case where no motion vector is defined because of the intra coding, the median prediction used for Mode 0 and the upper segments in Modes 9, 10, 13, and 14 is applied as it is. FIGS. 10A to 10D showed the application of the individual prediction rules to the respective modes and respective segments, whereas the application of the prediction rule in the present embodiment concentrates the prediction ways to up to four types. This can largely decrease the number of calculations of the predictive residual power even if the search window adapted to the predicted value is set upon the search for the motion vector.

Figure 38:
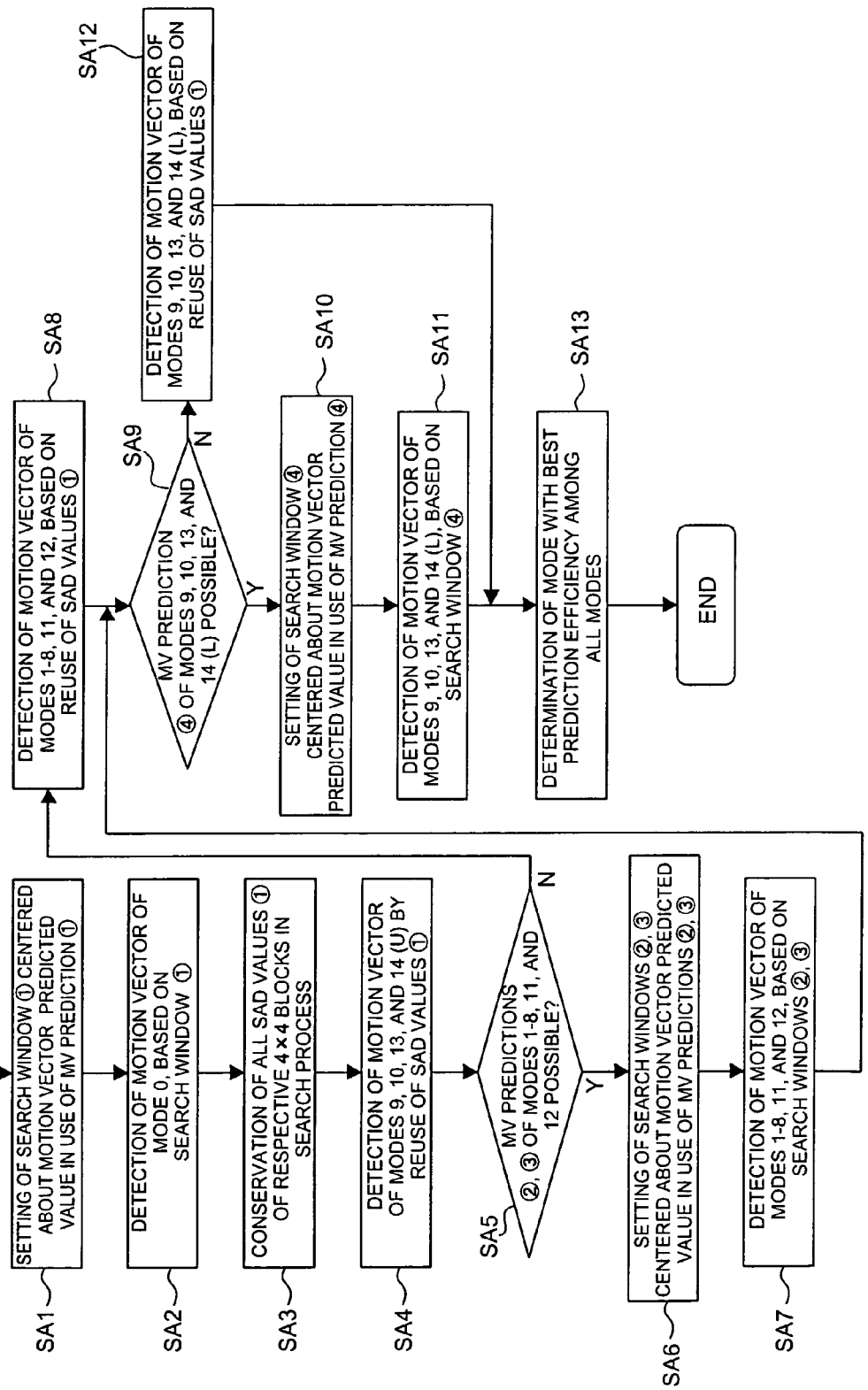
FIG. 38 is a flowchart showing the motion vector detection processing in the fifth embodiment.

FIG. 38 shows a flowchart of the motion vector detection processing carried out in the motion detector 2 of the coding apparatus by making use of the above motion vector prediction rule. The motion vector detection processing making use of the above motion vector prediction rule will be described below with reference to FIG. 38.

First, the motion vector predicted value is calculated by MV prediction ① and this is defined as a center location of search window ① (SA1). First detected in this search window ① is a motion vector (and a reference frame) to minimize the cost Cp for Mode 0 (SA2). At this time, for the respective sub-blocks in the macroblock, predictive residual powers (calculated as prediction evaluation values (SAD)) obtained for motion vector candidates in the search window ① all are retained as SAD values ① (SA3). The SAD values ① can be reused on the occasion of determining the motion vectors and reference frames in Modes 9, 10, 13, and 14 using the same MV prediction ① (SA4). Namely, the motion vectors and reference frames to minimize the cost Cp as to Modes 9, 10, 13, and 14 can be determined by selecting them from the values retained as the SAD values ① and adding them, which eliminates the need for executing the calculation of predictive residual power (SAD).

It is then determined in SA5 whether the MV predictions ② and ③ can be used for Modes 1-8, 11, and 12. If as to Modes 1-8, 11, and 12 to use the MV predictions ②, ③, the motion vectors at the prediction locations used in the MV predictions ②, ③ refer to different reference frames or the intra coding is applied, it is determined that the MV predictions ②, ③ cannot be used, and the motion vectors and reference frames are determined using the SAD values ① (SA8). If it is determined in SAS on the other hand that the MV predictions ②, ③ can be used, the motion vector predicted value obtained using the MV prediction ② or ③ is set as the center location of the search window ②, ③ (SA6), and the motion vector (and the reference frame) to minimize the cost Cp for each of Modes 1-8, 11, and 12 is detected within this search window ②, ③ (SA7). Thereafter, similar processing to SA5-SA8 is carried out in SA9-SA12 for the lower segments of Modes 9, 10, 13, and 14. In the last step SA13, a mode yielding the minimum cost Cp is selected out of all the modes.

The above motion vector detection processing allows the amount of SAD calculation to be further reduced by determining the order of the motion vector calculation according to the sizes of the segments in each of the processes of SA4, 7, 8, 11, and 12. For example, concerning the relation among Modes 9, 10, 13, and 14, there is a relation of Mode 13 ⊂ Mode 9 ⊂ Mode 10 ⊂ Mode 14 about their upper segments. Namely, the result of the SAD calculation for the upper segment of Mode 13 can be applied to the SAD calculation for the upper segment of Mode 9 as it is, which can reduce the number of addition operations as compared with the direct addition from the SAD values ①. The same also applies to Modes 1-8, 11, and 12, and it is therefore feasible to keep down the computational complexity, by implementing the motion detection processing according to the hierarchical property of the modes.

On the other hand, the decoding apparatus can be arranged to have the decoding processing of the motion vector syntax in the variable length decoder 25 to determine the predicted value while adopting the motion vector prediction rule shown in FIGS. 37A to 37D, instead of the motion vector prediction rule of FIGS. 10A to 10D, and decode the motion vector.

The sixth embodiment will be described below. The present embodiment will describe coding and decoding methods using the motion vector division patterns in the first embodiment, together with the bidirectional inter prediction using both the forward inter prediction and the backward inter prediction, and permitting one of prediction directions of the bidirectional prediction to be selected for each divisional segment in the macroblock.

Just as in the case of the first embodiment, the present embodiment can be described with the same members and operations as the coding apparatus and decoding apparatus shown in FIGS. 1 and 2 of the conventional example, except for the differences in the syntax about the prediction mode 3 and motion vector 4 included in the compressed stream 24 and in the operations of the motion detector 2 and motion compensator 5. The following will mainly describe the operation of the motion detector 2 and the syntax as well about the coding apparatus, and will mainly describe the procedure of generating the predicted image in the motion compensator 5 about the decoding apparatus.

The motion compensation models, i.e., the definition of the fixed motion vector assignment in the present embodiment is the same as in the first embodiment. Namely, in order to divide a macroblock into two segments, as shown in FIGS. 6A to 6D, the present embodiment adopts the motion vector assignment expanded to the division ways including the horizontal, vertical, oblique, and phase-added division, different from the simple horizontal division or vertical division.

In the present embodiment, for the segments resulting from the division by the motion vector assignment, a prediction direction can be selected out of those of the bidirectional inter prediction on a segment basis. This presents the following advantage: in the case where a boundary between objects of different motions exists in one macroblock, for the segments permitting various motions in the macroblock to be accurately captured with a small overhead, a prediction direction capable of yielding better coding efficiency can be selected and assigned out of the plurality of prediction directions in the bidirectional prediction on a segment basis, thereby increasing the prediction efficiency.

Figure 39:
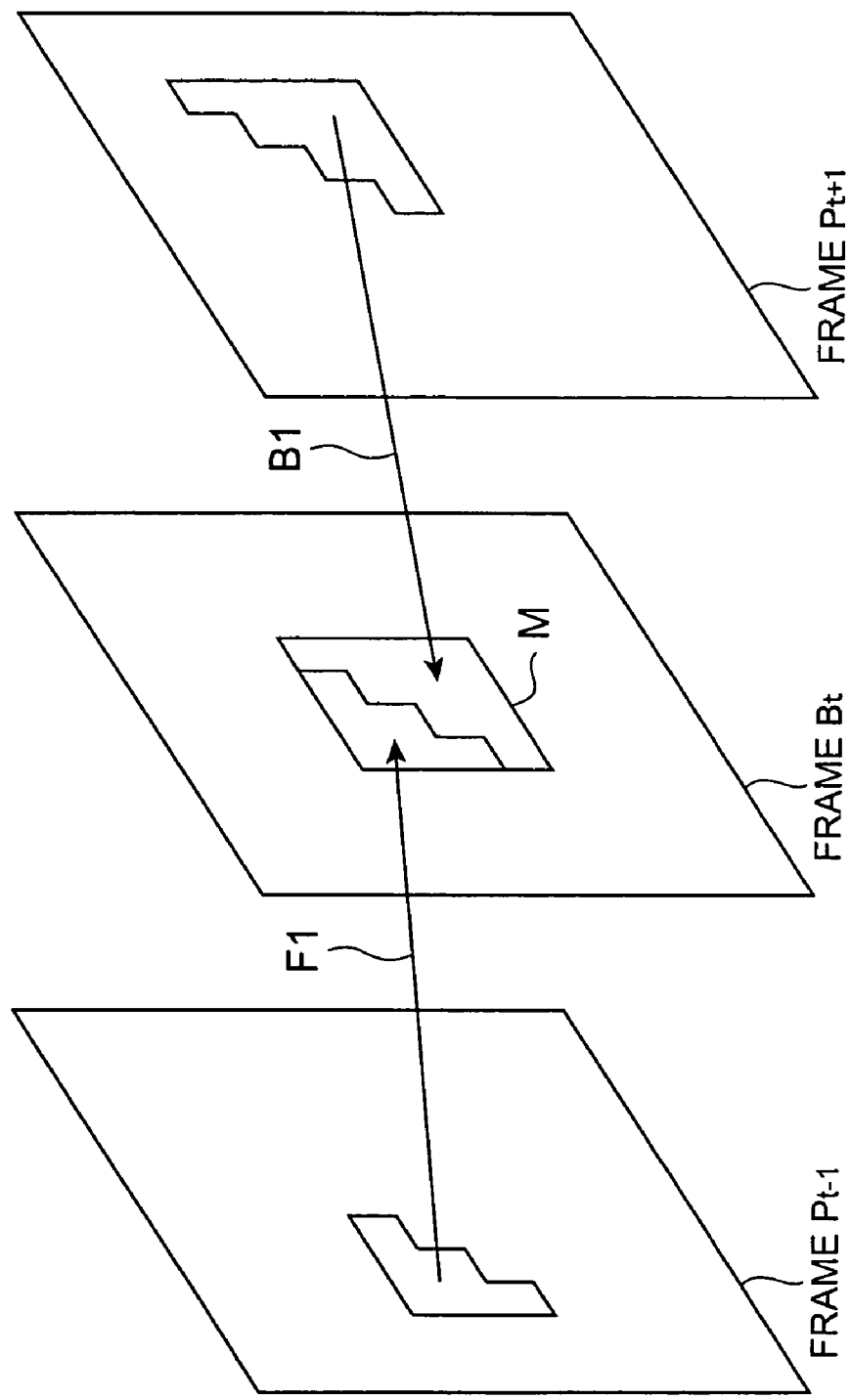
FIG. 39 is a diagram showing an example of bidirectional prediction in the sixth embodiment.

FIG. 39 shows an example of the bidirectional prediction in the present embodiment. FIG. 39 shows a case in which the division of Mode 9 in FIG. 6 is applied to a macroblock M in a bidirectional prediction frame Bt and in which the forward prediction F1 from a temporally previous reference frame Pt□1 and the backward prediction B1 from a temporally subsequent reference frame Pt+1 are applied to the respective two segments in the macroblock.

For coding the macroblock M, the motion detector 2 in FIG. 1 first evaluates and detects a prediction mode and motion vector capable of yielding better coding efficiency, as an inter prediction mode, out of the prediction modes shown in FIGS. 6A to 6D. At this time, the present embodiment is arranged to evaluate and detect a prediction direction capable of yielding better coding efficiency, out of the prediction directions in the bidirectional prediction for each of the two segments in each of the prediction modes. FIG. 39 shows the case where as a result of the evaluation and detection, Mode 9 is selected as a prediction mode in the macroblock M and the different prediction directions are selected for the respective segments. This selection result is transmitted as information in the compressed stream described below.

FIG. 40B shows a syntax of the macroblock data of the compressed stream outputted from the coding apparatus of the present embodiment, in comparison with a syntax (FIG. 40A) in the bidirectional motion compensated prediction in H.26L.

In the H.26L syntax shown in FIG. 40A, the information of the prediction direction is transmitted one per macroblock in the prediction mode macroblock type information indicating the motion vector division pattern, and is identified together with the prediction mode. A like configuration can also be adopted in the case using the syntax in the bidirectional prediction in the motion compensation models or the fixed motion vector assignment of the present invention, and the information can also be configured and transmitted as prediction mode macroblock type information also including the information about the selection situation of the prediction direction for each segment. However, the present embodiment employs a configuration different from the configuration in H.26L, thereby preventing the variable length coding table of the prediction mode from becoming massive.

FIG. 40B shows the syntax in the present embodiment. In this syntax the information of the prediction direction is arranged so that only the identification of the Direct mode as a prediction mode for the skip macroblocks in the bidirectional prediction is transmitted in the macroblock type information and so that the information of the prediction direction in the other modes is transmitted as reference frame information to be identified together with the reference frame number. The present embodiment does not use the block sizes introduced in order to identify the prediction mode in each direction in the bidirectional prediction in H.26L. In FIGS. 40A, 40B arrows P28 to P36 indicate omission of pertinent processing to jump, and arrows Q12 to Q19 loops.

FIG. 41 shows a code table of the macroblock type information in the present embodiment. The configuration of this code table may be much the same as the configuration of the macroblock type information used in the first embodiment, except that the Direct mode is placed at the head of the code table. The definitions about the intra 16×16 mode at and after the code number 17 are omitted herein, but these are assumed to be based on the definitions about the intra 16×16 mode in the code table of H.26L. The subsequent syntax-shall differ depending upon the contents of the macroblock type information, and in many prediction modes there exist two reference frame information elements, because the reference frame information is present in each segment. However, there is only one reference frame information in Mode 0 being the prediction mode without segment division, and in the intra 4×4 mode there is no reference frame information but there is the intra prediction mode information.

FIG. 42 shows a code table of the reference frame information in the present embodiment. In the configuration of the reference frame information in H.26L, numbers for identifying the reference frame numbers in the forward prediction are arranged in order, whereas the code table herein is configured to contain the information about the forward direction (Forward), the backward direction (Backward), and the two directions (Bidirectional) to use an average of predicted values in the forward direction and in the backward direction, in addition to the reference frame numbers. In addition, there exists the reference frame information of each segment. Since a reference frame can be selected from a plurality of reference frames in the case of the forward prediction, the table is configured so that codes are arranged in order with change of reference frames in the forward direction for each of the forward prediction and bidirectional prediction. Since the prediction direction is identified by the reference frame information, the subsequent syntax will differ depending upon the contents of the reference frame information: there will exist a forward motion vector difference FW in the case of the forward prediction, a backward motion vector difference BW in the case of the backward prediction, and both the motion vector difference FW and motion vector difference BW in the bidirectional prediction. The number of motion vector differences will differ depending upon the prediction mode identified by the macroblock type information.

The reference frame information code in FIG. 42 also exists for each segment even in the case where the function of plural reference frames in H.26L is not used, i.e., in the case where there exists only the reference frame number of forward prediction of 1 (one frame back of Forward), and in this case only the prediction direction in the bidirectional prediction is identified from the reference frame information.

On the other hand, the decoding apparatus performs the decoding processing on the basis of these information obtained from the compressed stream, and the processing is much the same as the flow shown in the first embodiment. Therefore, the detailed description thereof is omitted herein. The decoding apparatus of the present embodiment is different from the decoding apparatus of the first embodiment in that the information obtained from the compressed stream contains the information about the selection situation of the prediction direction in the bidirectional prediction differing depending upon segments in the prediction mode and in that in accordance therewith the motion compensator 5 in FIG. 2 performs the motion compensation and generation of the predicted image by use of the prediction direction in the bidirectional prediction differing segment by segment. This makes it feasible to generate the predicted image obtained by assigning the prediction direction capable of yielding better prediction efficiency to each segment and to obtain a decoded picture with better coding efficiency from the compressed stream.

The present embodiment was adapted to use the motion compensation models as shown in FIGS. 6A to 6D, but the system may also be adapted to simultaneously use the motion compensation models permitting a number of motion vectors as shown in FIGS. 4A to 4G, or to use them while being changed over from or to the compensation models of FIGS. 6A to 6D. In that case, it is also feasible to improve the prediction efficiency in such a way that the change of prediction is allowed for each segmental block, the number of divisions is assumed to become not less than 2, the syntax and coding and decoding methods presented in the present embodiment are also applied in similar fashion, and the prediction direction capable of yielding better coding efficiency is selected and assigned to each block in the macroblock. When the number of divisions becomes greater than 2 in this case, the overhead of the information about the selection situation becomes large in the case where the selection of the prediction direction is performed for each block. For this reason, it is possible to adopt a configuration wherein the selection of the prediction direction is allowed only in the case where the prediction mode with the number of divisions being 2 is used and wherein whether the information about the selection situation in each block is transmitted is switched depending upon the prediction mode used in each individual macroblock.

Since the information about the selection situation of the prediction direction for each segment is transmitted as additional information, in the case of a simple picture without need for such switching, it is possible to employ a configuration wherein a rule of keeping the prediction direction constant within each macroblock can be selected. In this case, for example, it is conceivable to use a method of multiplexing flag information for identifying whether the change of prediction direction in the macroblock is permitted, in units of frames or frame groups. This permits the decoding apparatus to operate on the assumption that there exists only one syntax including the selection situation of the prediction direction, per macroblock if the prediction direction is unchanged in the macroblock.

The present embodiment described the coding and decoding methods of performing the motion compensated prediction by selecting the prediction direction used in the bidirectional inter prediction for each segment in the macroblock, but the same methods can also apply to construction of coding and decoding methods of performing the inter prediction or the intra prediction by selecting the inter prediction or the intra prediction for each segment in the macroblock. When this configuration is adopted, the intra prediction can be selectively assigned to only segments for which effective prediction cannot be achieved by the inter prediction, which can further improve the prediction efficiency.

The coding method and decoding method according to the present embodiment described above make it feasible to accurately capture various motions in the macroblock with a small overhead, to apply the appropriate bidirectional inter prediction or intra prediction to each of segments representing respective different motions, and to implement efficient video transmission, recording, and playback.

Incidentally, in order to achieve the aforementioned object of the present invention, image processing systems according to the present invention can be embodied by employing a variety of configuration forms below.

Namely, an image processing system according to the present invention can be constructed by adopting a configuration wherein in a coding apparatus motion compensated prediction means is configured to select one of a plurality of pattern groups obtained by preliminarily grouping motion vector assignment patterns to second blocks defined in each first block unit and to perform motion compensated prediction while assigning a motion vector to second blocks on the basis of an assignment pattern included in the selected pattern group and assignment information coding means is configured to output information about a motion vector assignment situation coded in each first block unit, as identification information of the motion vector assignment pattern specified out of the selected pattern group; and wherein in a decoding apparatus assignment information decoding means is configured to decode motion vector assignment information, as information to identify a motion vector assignment pattern to second blocks preliminarily determined in each first block unit, to, on the occasion of specifying an assignment pattern from the assignment pattern identification information, decode information to identity a pattern group to which the assignment pattern belongs, and to determine motion vector assignment to the second blocks from the assignment pattern identification information in accordance with a definition of the pattern group specified by the pattern group identification information.

Another image processing system according to the present invention can be constructed by adopting a configuration wherein in a coding apparatus assignment information coding means is configured to determine a predicted value of a motion vector according to a shape of a motion vector assignment pattern for a first block as an object of coding and to code a prediction difference based on the predicted value, as motion vector information; and wherein in a decoding apparatus assignment information decoding means is configured to decode motion vector information obtained by coding a prediction difference based on a predicted value of a motion vector determined according to a shape of a motion vector assignment pattern for a first block as an object of decoding.

Another image processing system according to the present invention can be constructed by adopting a configuration wherein in a coding apparatus assignment information coding means is configured to determine a prediction candidate location of a motion vector according to a shape of a motion vector assignment pattern for a first block as an object of coding to determine as a predicted value one of prediction candidate locations according to a shape of an assignment pattern for a first block located in the vicinity of the first block as the object of coding, and to code a prediction difference of the predicted value as motion vector information; and wherein in a decoding apparatus assignment information decoding means is configured to decode motion vector information obtained by determining one of prediction candidate locations for a motion vector determined according to a shape of a motion vector assignment pattern for a first block as an object of decoding, as a predicted value according to a shape of an assignment pattern for a first block located in the vicinity and coding a prediction difference of the predicted value.

Another image processing system according to the present invention can be constructed by adopting a configuration wherein in a coding apparatus motion compensated prediction means is configured to perform motion compensated prediction while assigning a motion vector to second blocks on the basis of a condition that the maximum number of motion vectors that can be assigned in second block units is 2 and on the basis of one of a plurality of predetermined assignment patterns determined in each first block unit and indicating an assignment state to second blocks included in the first block and assignment information coding means is configured to output information about a motion vector assignment situation determined in each first block unit, as identification information of the assignment pattern; and wherein in a decoding apparatus the maximum number of motion vectors decoded in each first block unit is set to 2 and motion vector assignment information is decoded as information to identify a plurality of predetermined assignment patterns determined in each first block unit and indicating assignment states of motion vectors to second blocks included in the first block.

Another image processing system according to the present invention can be constructed by adopting a configuration wherein a coding apparatus comprises compensated prediction means for performing motion compensated prediction while selecting one reference frame out of a plurality of reference frames retained for the motion compensated prediction, in a unit consisting of one or more second blocks obtained by sub-dividing each of first blocks resulting from division of a frame of a moving picture; and reference frame information coding means for outputting information about a selection situation of a reference frame for one or more second blocks in a multiplexed state on a bitstream; and wherein a decoding apparatus comprises reference frame information decoding means for decoding information about a selection situation of a reference frame used for the motion compensated prediction, assigned in a unit consisting of one or more second blocks obtained by sub-dividing each of first blocks resulting from division of a frame of a moving picture; compensating means for generating a predicted image by performing motion compensation while selecting one reference frame out of a plurality of reference frames retained for the motion compensation, on the basis of the reference frame information.

Another image processing system according to the present invention can be constructed by adopting a configuration wherein a coding apparatus comprises motion compensated prediction means for performing motion compensated prediction while selecting a prediction direction used in bidirectional inter prediction, in a unit consisting of one or more second blocks obtained by sub-dividing each of first blocks resulting from division of a frame of a moving picture; and prediction information coding means for outputting information about a selection situation of the prediction direction for the one or more second blocks in a multiplexed form on a bitstream; and wherein a decoding apparatus comprises prediction information decoding means for decoding information about a selection situation of a prediction direction used in bidirectional inter prediction, assigned in a unit consisting of one or more second blocks obtained by sub-dividing each of first blocks resulting from division of a frame of a moving picture; and motion compensation means for generating a predicted image by performing motion compensation while selecting a prediction direction used in bidirectional inter-frame motion compensation out of reference frames retained in both a forward direction and a backward direction, based on the prediction information.

Another image processing system according to the present invention can be constructed by adopting a configuration wherein a coding apparatus comprises predicting means for performing inter prediction or intra prediction while selecting an inter prediction mode or an intra prediction mode in a unit consisting of one or more second blocks obtained by sub-dividing each of first blocks resulting from division of a frame of a moving picture; and prediction mode information coding means for outputting information about a selection situation of the inter prediction mode or the intra prediction mode for the one or more second blocks in a multiplexed form on a bitstream; and wherein a decoding apparatus comprises prediction mode information decoding means for decoding information about a selection situation of the inter prediction mode or the intra prediction mode assigned in a unit consisting of one or more second blocks obtained by sub-dividing each of first blocks resulting from division of a frame of a moving picture; and predicted image generating means for generating a predicted image by performing the inter prediction or the intra prediction while selecting the inter prediction mode or the intra prediction mode, based on the prediction information.

INDUSTRIAL APPLICABILITY

As described above, the present invention made it feasible to accurately capture various motions in the first block with a small overhead and to implement efficient video transmission, recording, and playback.

The invention claimed is:

1. A coding method of performing compression coding of a moving picture by motion compensated prediction performed by a coding apparatus, said coding method comprising:
a motion compensated prediction step of performing, at a motion detector of said coding apparatus, the motion compensated prediction while assigning one or more motion vectors in units of second blocks in accordance with an assignment pattern preliminarily determined by grouping one or more second blocks obtained by sub-dividing each of first blocks resulting from division of a frame of the moving picture; and
an assignment information coding step of outputting information about an assignment situation of the one or more motion vectors to the second blocks in a multiplexed form on a bitstream by using identification information of the assignment pattern as the information about the assignment situation of the one or more motion vectors,
wherein said assignment information coding step includes assigning a variable length code to the assignment pattern based on at least one of a number of divisions, a division direction, and an area ratio of divided regions of the assignment pattern, and coding, at a variable length encoder of said coding apparatus, identification information of the assignment pattern using the assigned variable length code.

2. The coding method according to claim 1, wherein said motion compensated prediction step is configured to select one of a plurality of pattern groups obtained by preliminarily grouping motion vector assignment patterns to second blocks defined in each first block unit and to perform the motion compensated prediction while assigning the one or more motion vectors to the second blocks on the basis of an assignment pattern included in the selected pattern group, and
wherein said assignment information coding step is configured to output the information about the assignment situation of the one or more motion vectors coded in each first block unit, as identification information of the motion vector assignment pattern specified out of the selected pattern group.

3. The coding method according to claim 1, wherein said assignment information coding step is configured to determine a predicted value of a motion vector according to a shape of a motion vector assignment pattern for a first block as an object of coding and to code a prediction difference based on the predicted value, as motion vector information.

4. The coding method according to claim 1, wherein said motion compensated prediction step is configured to set the maximum number of motion vectors assignable in units of second blocks to two, and to perform the motion compensated prediction while assigning the one or more motion vectors to the second blocks, on the basis of one of predetermined assignment patterns determined in each first block unit and indicating an assignment situation to second blocks included in the first block, and
said assignment information coding step is configured to output information about the assignment situation of the one or more motion vectors determined in each first block unit, as identification information of the assignment pattern.

5. The coding method according to claim 4, wherein said assignment patterns include a pattern in which the first block is unevenly divided horizontally or vertically, and a pattern in which the first block is divided obliquely.

6. The coding method according to claim 4, wherein said assignment information coding step is configured to, on the basis of a situation of an assignment pattern for a first block located in the vicinity of a first block as an object of coding, assign a variable length code to each assignment pattern for the first block as an object of coding and to code identification information of the assignment pattern.

7. The coding method according to claim 4, wherein said assignment information coding step is configured to assign a variable length code to each assignment pattern, based on video contents, and to code identification information of the assignment pattern.

8. A decoding method of performing decompression and decoding of compressed moving picture data by motion compensated prediction performed by a decoding apparatus, said decoding method comprising:
an assignment information decoding step, performed at a variable length decoder of said decoding apparatus, of decoding motion vector assignment information that is in a multiplexed form on a bitstream, said assignment information indicating which of one or more motion vectors decoded in each unit of a first block, a motion vector assigned in units of second blocks obtained by sub-dividing each of first blocks resulting from division of a frame of the moving picture corresponds to; and
a motion compensation step of performing motion compensation using motion vectors specified in units of the second blocks on the basis of the motion vector assignment information and generating a predicted image,
wherein said assignment information decoding step includes decoding said motion vector assignment information as identification information of an assignment pattern preliminarily determined by grouping one or more second blocks, and decoding a variable length code assigned to the assignment pattern on the basis of at least one of a number of divisions, a division direction, and an area ratio of divided regions of the assignment pattern, as identification information of the assignment pattern.

9. The decoding method according to claim 8, wherein said assignment information decoding step is configured to decode motion vector information obtained by coding a prediction difference based on a predicted value of a motion vector determined according to a shape of a motion vector assignment pattern for a first block as an object of decoding.

10. The decoding method according to claim 8, wherein the maximum number of motion vectors to be decoded in each first block unit is set to two, and wherein said motion vector assignment information is decoded as information to identify one of predetermined assignment patterns defined in each first block unit and indicating an assignment state of one or more motion vectors to the second blocks included in the first block.

11. The decoding method according to claim 10, wherein said assignment patterns include a pattern in which the first block is unevenly divided horizontally or vertically, and a pattern in which the first block is divided obliquely.

12. The decoding method according to claim 10, wherein said assignment information decoding step is configured to decode a variable length code assigned to each assignment pattern on the basis of a situation of an assignment pattern for a first block located in the vicinity of a first block as an object of decoding, as identification information of each assignment pattern for the first block as an object of decoding.

13. The decoding method according to claim 10, wherein said assignment information decoding step is configured to decode a variable length code assigned to each assignment pattern on the basis of video contents, as identification information of each assignment pattern.

14. A coding apparatus for performing compression coding of a moving picture by motion compensated prediction, said coding apparatus comprising:

means for performing the motion compensated prediction while assigning one or more motion vectors in units of second blocks in accordance with an assignment pattern preliminarily determined by grouping one or more second blocks obtained by sub-dividing each of first blocks resulting from division of a frame of the moving picture; and means for outputting information about an assignment situation of the one or more motion vectors to the second blocks in a multiplexed form on a bitstream by using identification information of the assignment pattern as the information about the assignment situation of the one or more motion vectors, wherein said means for outputting assigns a variable length code to the assignment pattern based on at least one of a number of divisions, a division direction, and an area ratio of divided regions of the assignment pattern, and codes identification information of the assignment pattern using the assigned variable length code.

15. A decoding apparatus for performing decompression and decoding of compressed moving picture data by motion compensated prediction, said decoding apparatus comprising:

means for decoding motion vector assignment information that is in a multiplexed form on a bitstream, said assignment information indicating which of one or more motion vectors decoded in each unit of a first block, a motion vector assigned in units of second blocks obtained by sub-dividing each of first blocks resulting from division of a frame of the moving picture corresponds to; and means for performing motion compensation using motion vectors specified in units of the second blocks on the basis of the motion vector assignment information and generating a predicted image, wherein said means for decoding decodes said motion vector assignment information as identification information of an assignment pattern preliminarily determined by grouping one or more second blocks, and decodes a variable length code assigned to the assignment pattern on the basis of at least one of a number of divisions, a division direction, and an area ratio of divided regions of the assignment pattern, as identification information of the assignment pattern.

16. An image processing system comprising a coding apparatus for performing compression coding of a moving picture by motion compensated prediction, and a decoding apparatus for performing decompression and decoding of compressed moving picture data by the motion compensated prediction, wherein said coding apparatus comprises:

means for performing the motion compensated prediction while assigning one or more motion vectors in units of second blocks in accordance with an assignment pattern preliminarily determined by grouping one or more second blocks obtained by sub-dividing each of first blocks resulting from division of a frame of the moving picture; and means for outputting information about an assignment situation of the one or more motion vectors to the second blocks in a multiplexed form on a bitstream by using identification information of the assignment pattern as the information about the assignment situation of the one or more motion vectors, wherein said means for outputting assigns a variable length code to the assignment pattern based on at least one of a number of divisions, a division direction, and an area ratio of divided regions of the assignment pattern, and codes identification information of the assignment pattern using the assigned variable length code; and wherein said decoding apparatus comprises:

means for decoding motion vector assignment information that is in a multiplexed form on a bitstream, said assignment information indicating which of one or more motion vectors decoded in each unit of the first block, a motion vector assigned in units of second blocks obtained by sub-dividing each of first blocks resulting from division of a frame of the moving picture corresponds to; and means for performing motion compensation using motion vectors specified in units of the second blocks on the basis of the motion vector assignment information and generating a predicted image, wherein said means for decoding decodes said motion vector assignment information as identification information of an assignment pattern preliminarily determined by grouping one or more second blocks, and decodes a variable length code assigned to the assignment pattern on the basis of at least one of a number of divisions, a division direction, and an area ratio of divided regions of the assignment pattern, as identification information of the assignment pattern.

17. A computer-readable recording medium including a coding program for causing a computer, which is incorporated in a coding apparatus for performing compression coding of a moving picture by motion compensated prediction, to execute each of the steps in the coding method as set forth in claim 1.

18. A computer-readable recording medium including a decoding program for causing a computer, which is incorporated in a decoding apparatus for performing decompression and decoding of compressed moving picture data by motion compensated prediction, to execute each of the steps in the decoding method as set forth in claim 8.

19. The coding method according to claim 1, further comprising:
coding a predictive residual signal obtained in said motion compensated prediction step, in block units of the same size as that of the second blocks.

20. The coding method according to claim 1, wherein said assignment information coding step is configured to code information to identify whether there is a predictive residual signal to be coded in a motion vector assignment region consisting of one or more second blocks, based on the assignment situation of the one or more motion vectors.

21. The decoding method according to claim 8, further comprising:
decoding a predictive residual signal of the motion compensated prediction obtained by coding processing in block units of the same size as that of the second blocks.

22. The decoding method according to claim 8, wherein said assignment information decoding step is configured to decode information to identify whether there is a predictive residual signal to be decoded in a motion vector assignment region consisting of one or more second blocks, on the basis of a shape of a motion vector assignment pattern for a first block as an object of decoding.

23. The coding method according to claim 5, wherein among said assignment patterns, said pattern in which the first block is unevenly divided horizontally or vertically is used at portions where a new image pattern gradually appears at the screen edge.

24. The decoding method according to claim 11, wherein among said assignment patterns, said pattern in which the first block is unevenly divided horizontally or vertically is used at portions where a new image pattern gradually appears at the screen edge.

25. The decoding method according to claim 8, wherein said decoding includes decoding said motion vector assignment information as information to identify a motion vector assignment pattern to second blocks preliminarily determined in each first block unit, to, on the occasion of specifying the assignment pattern from the assignment pattern identification information, decode information to identify a pattern group to which said assignment pattern belongs, and determine motion vector assignment to the second blocks from the assignment pattern identification information in accordance with a definition of the pattern group specified by said pattern group identification information.

26. The decoding apparatus of claim 15, wherein said means for decoding decodes said motion vector assignment information as information to identify a motion vector assignment pattern to second blocks preliminarily determined in each first block unit, to, on the occasion of specifying the assignment pattern from the assignment pattern identification information, decodes information to identify a pattern group to which said assignment pattern belongs, and determines motion vector assignment to the second blocks from the assignment pattern identification information in accordance with a definition of the pattern group specified by said pattern group identification information.

27. The image processing system of claim 16, wherein said means for decoding decodes said motion vector assignment information as information to identify a motion vector assignment pattern to second blocks preliminarily determined in each first block unit, to, on the occasion of specifying the assignment pattern from the assignment pattern identification information, decodes information to identify a pattern group to which said assignment pattern belongs, and determines motion vector assignment to the second blocks from the assignment pattern identification information in accordance with a definition of the pattern group specified by said pattern group identification information.

* * * * *

UNITED STATES PATENT AND TRADEMARK OFFICE
CERTIFICATE OF CORRECTION

PATENT NO. : 7,643,559 B2  Page 1 of 1
APPLICATION NO. : 10/432044
DATED : January 5, 2010
INVENTOR(S) : Kato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1185 days.

Signed and Sealed this

Twenty-first Day of December, 2010

David J. Kappos
*Director of the United States Patent and Trademark Office*